(12) United States Patent
Chen et al.

(10) Patent No.: US 7,994,079 B2
(45) Date of Patent: Aug. 9, 2011

(54) MELTBLOWN SCRUBBING PRODUCT

(75) Inventors: Fung-Jou Chen, Appleton, WI (US);
Jeffrey D. Lindsay, Appleton, WI (US);
Julie Bednarz, Neenah, WI (US);
Peiguang Zhou, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 960 days.

(21) Appl. No.: 10/321,831

(22) Filed: Dec. 17, 2002

(65) Prior Publication Data

US 2004/0115431 A1    Jun. 17, 2004

(51) Int. Cl.
*D04H 3/00* (2006.01)

(52) U.S. Cl. ........ 442/362; 442/334; 442/335; 442/337; 442/381

(58) Field of Classification Search ............. 428/373, 428/304.4; 442/337, 350, 352, 353, 366, 442/400, 409, 415, 417, 334, 335, 362, 381
See application file for complete search history.

(56) References Cited

U.S. PATENT DOCUMENTS

| | | |
|---|---|---|
| 1,786,513 A | 12/1930 | Zuckerman |
| 2,496,270 A | 2/1950 | Coler |
| 3,116,574 A | 1/1964 | Ciesielski |
| 3,121,249 A | 2/1964 | Affleck et al. |
| 3,169,264 A | 2/1965 | Walker |
| 3,324,609 A | 6/1967 | Stein et al. |
| 3,338,992 A | 8/1967 | Kinney |
| 3,341,394 A | 9/1967 | Kinney |
| 3,382,058 A | 5/1968 | Wise et al. |
| 3,418,199 A | 12/1968 | Anton et al. |
| 3,454,460 A | 7/1969 | Bosley |
| 3,494,821 A | 2/1970 | Evans |
| 3,502,763 A | 3/1970 | Hartmann |
| 3,542,615 A | 11/1970 | Dobo et al. |
| 3,547,763 A | 12/1970 | Hoffman, Jr. |
| 3,556,932 A | 1/1971 | Coscia et al. |
| 3,556,933 A | 1/1971 | Williams et al. |
| 3,585,104 A | 6/1971 | Kleinert |
| 3,629,047 A | 12/1971 | Davison |
| 3,692,618 A | 9/1972 | Dorschner et al. |
| 3,700,623 A | 10/1972 | Keim |

(Continued)

FOREIGN PATENT DOCUMENTS

DE    3546101 A1    6/1987

(Continued)

OTHER PUBLICATIONS

Dictionary definition of "absorb", The American Heritage® Dictionary of the English Language, Fourth Edition Copyright © 2004, 2000 by Houghton Mifflin Company. (no month).*

(Continued)

*Primary Examiner* — Andrew T Piziali

(74) *Attorney, Agent, or Firm* — Dority & Manning, P.A.

(57) ABSTRACT

The present invention discloses a disposable meltblown scrubbing product for use in household cleaning or personal care applications and an abrasive aggregate fiber which may be utilized in the scrubbing product. The meltblown web is formed primarily of polymeric fibers in a disordered or random distribution as is typical of fibers deposited in meltblown processes so as to form an open, porous structure. The aggregate fibers of the present invention generally are formed of two or more separate abrasive polymer fibers or strands which are adhered together along at least about 5 mm of the fiber length. The abrasive fibers of the meltblown web are generally greater than about 15 microns in diameter.

85 Claims, 23 Drawing Sheets

U.S. PATENT DOCUMENTS

| | | | |
|---|---|---|---|
| 3,703,739 A | 11/1972 | Young et al. | |
| 3,772,076 A | 11/1973 | Keim | |
| 3,802,817 A | 4/1974 | Matsuki et al. | |
| 3,844,880 A | 10/1974 | Meisel, Jr. et al. | |
| 3,849,241 A | 11/1974 | Butin et al. | |
| 3,855,158 A | 12/1974 | Petrovich et al. | |
| 3,872,536 A | 3/1975 | Siemund | |
| 3,885,158 A | 5/1975 | Flutie et al. | |
| 3,899,388 A | 8/1975 | Petrovich et al. | |
| 3,911,173 A | 10/1975 | Sprague, Jr. | |
| 4,100,324 A | 7/1978 | Anderson et al. | |
| 4,129,528 A | 12/1978 | Petrovich et al. | |
| 4,129,722 A | 12/1978 | Iovine | |
| 4,144,370 A | 3/1979 | Boulton | |
| 4,147,586 A | 4/1979 | Petrovich et al. | |
| 4,152,807 A | 5/1979 | Smahlik | |
| 4,204,295 A | 5/1980 | O'Connor | |
| 4,210,489 A | 7/1980 | Markofsky | |
| 4,222,921 A | 9/1980 | Van Eenam | |
| 4,234,775 A | 11/1980 | Wolfberg et al. | |
| 4,239,720 A | 12/1980 | Gerlach et al. | |
| 4,239,792 A | 12/1980 | Ludwa | |
| 4,242,408 A | 12/1980 | Evani et al. | |
| 4,278,634 A | 7/1981 | Zwick et al. | |
| 4,297,860 A | 11/1981 | Pacifici et al. | |
| 4,340,563 A | 7/1982 | Appel et al. | |
| 4,381,575 A | 5/1983 | Wendt | |
| 4,436,780 A | 3/1984 | Hotchkiss et al. | |
| 4,437,271 A | 3/1984 | McAvoy | |
| 4,440,597 A | 4/1984 | Wells et al. | |
| 4,475,835 A | 10/1984 | Verboom et al. | |
| 4,491,998 A | 1/1985 | Wilson et al. | |
| 4,510,641 A | 4/1985 | Morris | |
| 4,514,345 A | 4/1985 | Johnson et al. | |
| 4,515,703 A | 5/1985 | Haq | |
| 4,522,863 A | 6/1985 | Keck et al. | |
| 4,528,239 A | 7/1985 | Trokhan | |
| 4,529,480 A | 7/1985 | Trokhan | |
| 4,552,603 A | 11/1985 | Harris, Jr. et al. | |
| 4,556,450 A | 12/1985 | Chuang et al. | |
| 4,573,986 A | 3/1986 | Minetola et al. | |
| 4,594,130 A | 6/1986 | Chang et al. | |
| 4,606,782 A | 8/1986 | Demetriades | |
| 4,617,124 A | 10/1986 | Pall et al. | |
| 4,659,609 A | 4/1987 | Lamers et al. | |
| 4,665,580 A | 5/1987 | Morris | |
| 4,675,226 A | 6/1987 | Ott | |
| 4,675,394 A | 6/1987 | Solarek et al. | |
| 4,724,567 A | 2/1988 | Rones | |
| 4,758,297 A | 7/1988 | Calligarich | |
| 4,773,110 A | 9/1988 | Hopkins | |
| 4,780,361 A | 10/1988 | Schlein | |
| 4,785,996 A | 11/1988 | Ziecker et al. | |
| 4,793,898 A | 12/1988 | Laamanen et al. | |
| 4,808,467 A | 2/1989 | Suskind et al. | |
| 4,820,307 A | 4/1989 | Welch et al. | |
| 4,833,003 A | 5/1989 | Win et al. | |
| 4,842,666 A | 6/1989 | Werenicz | |
| 4,852,210 A | 8/1989 | Krajicek | |
| 4,880,497 A | 11/1989 | Pfohl et al. | |
| 4,885,202 A | 12/1989 | Lloyd et al. | |
| 4,886,632 A | 12/1989 | Van Iten et al. | |
| 4,971,471 A | 11/1990 | Sloan | |
| 4,978,427 A | 12/1990 | Pfohl et al. | |
| 4,979,255 A | 12/1990 | Buchnag | |
| 4,981,557 A | 1/1991 | Bjorkquist | |
| 5,008,344 A | 4/1991 | Bjorkquist | |
| 5,019,211 A | 5/1991 | Sauer | |
| 5,042,986 A | 8/1991 | Kitchens et al. | |
| 5,054,945 A | 10/1991 | Iggulden et al. | |
| 5,057,368 A | 10/1991 | Largman et al. | |
| 5,064,635 A | 11/1991 | Casey | |
| 5,069,548 A | 12/1991 | Boehnlein | |
| 5,069,970 A | 12/1991 | Largman et al. | |
| 5,085,736 A | 2/1992 | Bjorkquist | |
| 5,098,522 A | 3/1992 | Smurkoski et al. | |
| 5,108,820 A | 4/1992 | Kaneko et al. | |
| 5,130,023 A * | 7/1992 | Feint | 210/493.2 |
| 5,141,803 A | 8/1992 | Pregozen | |
| 5,144,729 A | 9/1992 | Austin et al. | |
| 5,152,890 A * | 10/1992 | Linnersten | 210/315 |
| 5,169,571 A | 12/1992 | Buckley | |
| 5,178,729 A | 1/1993 | Janda | |
| 5,213,588 A | 5/1993 | Wong et al. | |
| 5,219,656 A | 6/1993 | Klett et al. | |
| 5,227,242 A | 7/1993 | Walter et al. | |
| 5,228,947 A | 7/1993 | Churchland | |
| 5,230,776 A | 7/1993 | Andersson et al. | |
| 5,260,171 A | 11/1993 | Smurkoski et al. | |
| 5,271,883 A | 12/1993 | Timmons et al. | |
| 5,275,700 A | 1/1994 | Trokhan | |
| 5,277,976 A | 1/1994 | Hogle et al. | |
| 5,284,703 A | 2/1994 | Everhart et al. | |
| 5,284,704 A * | 2/1994 | Kochesky et al. | 442/364 |
| 5,316,836 A | 5/1994 | Heindel et al. | |
| 5,328,565 A | 7/1994 | Rasch et al. | |
| 5,334,289 A | 8/1994 | Trokhan et al. | |
| 5,336,552 A | 8/1994 | Strack et al. | |
| 5,338,169 A | 8/1994 | Buckley | |
| 5,343,586 A | 9/1994 | Vosbikian | |
| 5,351,640 A | 10/1994 | Attaway et al. | |
| 5,353,521 A | 10/1994 | Orloff | |
| 5,382,400 A | 1/1995 | Pike et al. | |
| 5,425,725 A | 6/1995 | Tanzer et al. | |
| 5,429,545 A | 7/1995 | Meyer | |
| 5,429,686 A | 7/1995 | Chiu et al. | |
| 5,429,854 A | 7/1995 | Currie et al. | |
| 5,431,706 A * | 7/1995 | Paas | 55/342 |
| 5,431,786 A | 7/1995 | Rasch et al. | |
| 5,433,715 A | 7/1995 | Tanzer et al. | |
| 5,443,691 A | 8/1995 | Phan et al. | |
| 5,472,719 A * | 12/1995 | Favre | 426/77 |
| 5,477,579 A | 12/1995 | Rones | |
| 5,494,554 A | 2/1996 | Edwards et al. | |
| 5,496,624 A | 3/1996 | Stelljes, Jr. et al. | |
| 5,500,277 A | 3/1996 | Trokhan et al. | |
| 5,514,270 A * | 5/1996 | Barzuza | 210/356 |
| 5,514,523 A | 5/1996 | Trokhan et al. | |
| 5,536,921 A | 7/1996 | Hedrick et al. | |
| 5,548,862 A | 8/1996 | Curtis | |
| 5,554,467 A | 9/1996 | Trokhan et al. | |
| 5,560,794 A | 10/1996 | Currie et al. | |
| 5,566,724 A | 10/1996 | Trokhan et al. | |
| 5,573,637 A | 11/1996 | Ampulski et al. | |
| 5,582,907 A * | 12/1996 | Pall | 442/351 |
| 5,591,149 A | 1/1997 | Cree et al. | |
| 5,592,713 A | 1/1997 | Rones | |
| 5,593,399 A | 1/1997 | Tanzer et al. | |
| 5,595,628 A | 1/1997 | Gordon et al. | |
| 5,598,642 A | 2/1997 | Orloff et al. | |
| 5,607,980 A | 3/1997 | McAtee et al. | |
| 5,609,727 A | 3/1997 | Hansen et al. | |
| 5,614,293 A | 3/1997 | Krzysik et al. | |
| 5,620,694 A | 4/1997 | Giradot | |
| 5,624,790 A | 4/1997 | Trokhan et al. | |
| 5,628,876 A | 5/1997 | Ayers et al. | |
| 5,637,194 A | 6/1997 | Ampulski et al. | |
| 5,639,541 A | 6/1997 | Adam | |
| 5,643,588 A | 7/1997 | Roe et al. | |
| 5,650,218 A | 7/1997 | Krzysik et al. | |
| 5,652,048 A | 7/1997 | Haynes et al. | |
| 5,656,132 A | 8/1997 | Farrington, Jr. et al. | |
| 5,663,213 A | 9/1997 | Jones et al. | |
| 5,672,248 A | 9/1997 | Wendt et al. | |
| 5,683,794 A | 11/1997 | Wadsworth et al. | |
| 5,716,692 A | 2/1998 | Warner et al. | |
| 5,759,926 A | 6/1998 | Pike et al. | |
| 5,772,845 A | 6/1998 | Farrington, Jr. et al. | |
| 5,775,984 A | 7/1998 | Olson et al. | |
| 5,786,065 A | 7/1998 | Annis et al. | |
| 5,798,078 A * | 8/1998 | Myers | 264/446 |
| 5,804,279 A | 9/1998 | Pluth | |
| 5,817,585 A | 10/1998 | Rose et al. | |
| 5,830,317 A | 11/1998 | Vinson et al. | |
| 5,849,000 A | 12/1998 | Anjur et al. | |
| 5,855,739 A | 1/1999 | Ampulski et al. | |
| 5,864,913 A | 2/1999 | Robertson et al. | |

| | | | | | | | |
|---|---|---|---|---|---|---|---|
| 5,865,824 | A | | 2/1999 | Chen et al. | EP | 0597224 A2 | 5/1994 |
| 5,868,933 | A | * | 2/1999 | Patrick et al. ............... 210/484 | EP | 0716903 A1 | 6/1996 |
| 5,871,763 | A | | 2/1999 | Luu et al. | EP | 0945251 A1 | 9/1999 |
| 5,897,745 | A | | 4/1999 | Ampulski et al. | EP | 0983014 B1 | 3/2000 |
| 5,916,203 | A | | 6/1999 | Brandon et al. | EP | 1076121 A1 | 2/2001 |
| 5,916,678 | A | | 6/1999 | Jackson et al. | EP | 1147734 B1 | 10/2001 |
| 5,920,942 | A | | 7/1999 | Footer | EP | 1212974 A1 | 6/2002 |
| 5,925,026 | A | | 7/1999 | Arteman et al. | EP | 1314390 B1 | 5/2003 |
| 5,941,378 | A | | 8/1999 | Rose et al. | FR | 2070822 | 9/1971 |
| 5,948,528 | A | | 9/1999 | Helms, Jr. et al. | GB | 2293611 A | 4/1996 |
| 5,948,710 | A | | 9/1999 | Pomplun et al. | WO | WO 9523539 A1 | 9/1995 |
| 5,951,535 | A | | 9/1999 | Fujiwara et al. | WO | WO 9721865 A1 | 6/1997 |
| 5,958,178 | A | | 9/1999 | Bartsch et al. | WO | WO 9727363 A1 | 7/1997 |
| 5,958,275 | A | | 9/1999 | Joines et al. | WO | WO 9829590 | 7/1998 |
| 5,958,558 | A | | 9/1999 | Giesfeldt et al. | WO | WO 9842246 A1 | 10/1998 |
| 5,960,506 | A | | 10/1999 | Reuven | WO | WO 9852458 A1 | 11/1998 |
| 5,962,112 | A | | 10/1999 | Haynes et al. | WO | WO 9852459 A1 | 11/1998 |
| 5,987,685 | A | | 11/1999 | Lambert | WO | 2241820 | 2/1999 |
| 5,989,478 | A | * | 11/1999 | Ouellette et al. ............... 264/468 | WO | WO 9922686 | 5/1999 |
| 5,990,377 | A | | 11/1999 | Chen et al. | WO | WO 9967216 A1 | 12/1999 |
| 6,000,089 | A | | 12/1999 | Renken | WO | WO 0000148 A1 | 1/2000 |
| 6,001,300 | A | | 12/1999 | Buckley | WO | WO 0009806 A2 | 2/2000 |
| 6,010,598 | A | | 1/2000 | Boutilier et al. | WO | WO 0009806 A3 | 2/2000 |
| 6,013,349 | A | | 1/2000 | Takeuchi et al. | WO | 0986322 B1 | 3/2000 |
| 6,020,580 | A | | 2/2000 | Lewis et al. | WO | WO 0011046 A1 | 3/2000 |
| 6,044,513 | A | | 4/2000 | Penn | WO | WO 0027271 A2 | 5/2000 |
| 6,082,915 | A | | 7/2000 | Kimmel | WO | WO 0027271 A3 | 5/2000 |
| 6,096,169 | A | | 8/2000 | Hermans et al. | WO | WO 0034583 A1 | 6/2000 |
| 6,103,060 | A | | 8/2000 | Munerelle et al. | WO | WO 0043428 A1 | 7/2000 |
| 6,103,063 | A | | 8/2000 | Oriaran et al. | WO | WO 0050462 | 8/2000 |
| 6,103,953 | A | | 8/2000 | Cree et al. | WO | WO 0056972 | 9/2000 |
| 6,120,642 | A | | 9/2000 | Lindsay et al. | WO | WO 0065083 A2 | 11/2000 |
| 6,143,135 | A | | 11/2000 | Hada et al. | WO | WO 0065083 A3 | 11/2000 |
| 6,163,943 | A | | 12/2000 | Johansson et al. | WO | WO 0065084 A2 | 11/2000 |
| 6,197,154 | B1 | | 3/2001 | Chen et al. | WO | WO 0065096 A1 | 11/2000 |
| 6,200,354 | B1 | | 3/2001 | Collins et al. | WO | WO 0065347 A2 | 11/2000 |
| 6,200,669 | B1 | | 3/2001 | Marmon et al. | WO | WO 0065348 A2 | 11/2000 |
| 6,207,246 | B1 | | 3/2001 | Moren et al. | WO | WO 0100917 A1 | 1/2001 |
| 6,207,600 | B1 | * | 3/2001 | Nakajima et al. ............... 442/311 | WO | WO 0111004 A1 | 2/2001 |
| 6,224,714 | B1 | | 5/2001 | Schroeder et al. | WO | WO 0112414 A1 | 2/2001 |
| 6,241,850 | B1 | | 6/2001 | Kelly | WO | WO 0112526 A1 | 2/2001 |
| 6,264,791 | B1 | | 7/2001 | Sun et al. | WO | WO 0141622 A2 | 6/2001 |
| 6,274,667 | B1 | | 8/2001 | Shannon et al. | WO | WO 0149937 | 7/2001 |
| 6,299,520 | B1 | | 10/2001 | Cheyne, III | WO | WO 0154552 A1 | 8/2001 |
| 6,322,665 | B1 | | 11/2001 | Sun et al. | WO | WO 0155552 A1 | 8/2001 |
| 6,328,850 | B1 | | 12/2001 | Phan et al. | WO | WO 0162132 A2 | 8/2001 |
| 6,340,663 | B1 | | 1/2002 | Deleo et al. | WO | WO 0162132 A3 | 8/2001 |
| 6,342,283 | B1 | * | 1/2002 | Mozelack et al. ............ 428/36.9 | WO | WO 0183887 A1 | 11/2001 |
| 6,387,471 | B1 | | 5/2002 | Taylor et al. | WO | WO 0200151 A2 | 1/2002 |
| 6,395,957 | B1 | | 5/2002 | Chen et al. | WO | WO 0209491 A2 | 2/2002 |
| 6,399,295 | B1 | | 6/2002 | Kaylor et al. | WO | WO 02/41815 A2 | 5/2002 |
| 6,433,244 | B1 | | 8/2002 | Roe et al. | WO | WO 0241747 A1 | 5/2002 |
| 6,436,234 | B1 | | 8/2002 | Chen et al. | WO | WO 0241748 A1 | 5/2002 |
| 6,501,002 | B1 | | 12/2002 | Roe et al. | WO | WO 02083834 A1 | 10/2002 |
| 6,506,803 | B1 | | 1/2003 | Baker, Jr. et al. | WO | WO 03000104 A1 | 1/2003 |
| 6,534,174 | B1 | | 3/2003 | Ouellette et al. | WO | WO 03000105 A1 | 1/2003 |
| 6,561,354 | B1 | | 5/2003 | Fereshtehkhou et al. | WO | WO 03004748 A1 | 1/2003 |
| 6,565,749 | B1 | * | 5/2003 | Hou et al. ............... 210/500.38 | WO | WO 03011102 A1 | 2/2003 |
| 6,570,053 | B2 | | 5/2003 | Roe et al. | WO | WO 03024295 A1 | 3/2003 |
| 6,635,676 | B2 | | 10/2003 | Baker, Jr. et al. | WO | WO 03/043480 A1 | 5/2003 |
| 6,673,982 | B1 | | 1/2004 | Chen et al. | | | |
| 6,700,034 | B1 | | 3/2004 | Lindsay et al. | | | |
| 2002/0132747 | A1 | | 9/2002 | Huyhn et al. | | | |
| 2003/0028985 | A1 | | 2/2003 | Prodoehl et al. | | | |
| 2003/0118816 | A1 | | 6/2003 | Polanco et al. | | | |
| 2003/0121380 | A1 | | 7/2003 | Cowell et al. | | | |
| 2003/0121530 | A1 | | 7/2003 | Borgonjon et al. | | | |
| 2003/0135181 | A1 | | 7/2003 | Chen et al. | | | |
| 2003/0162684 | A1 | | 8/2003 | Huyhn et al. | | | |
| 2003/0164175 | A1 | | 9/2003 | Linzell | | | |
| 2003/0217516 | A1 | | 11/2003 | Smith | | | |
| 2004/0023014 | A1 | | 2/2004 | Williamson et al. | | | |
| 2004/0077247 | A1 | | 4/2004 | Schmidt et al. | | | |
| 2005/0026527 | A1 | | 2/2005 | Schmidt et al. | | | |

FOREIGN PATENT DOCUMENTS

| | | |
|---|---|---|
| EP | 0205242 A2 | 12/1986 |
| EP | 0264676 A1 | 4/1988 |
| EP | 0301962 B1 | 2/1989 |

OTHER PUBLICATIONS

Dictionary definition of "absorbent", Answers Corporation, Answers.com, 1999. (no month).*
PCT Search Report and Written Opinion for PCT/US2004/018877, Oct. 6, 2004.
PCT Search Report and Written Opinion for PCT/US2004/017637, Oct. 6, 2004.
U.S. Appl. No. 10/745,327, filed Dec. 23, 2003, Chen, et al, Composite Structures Containing Tissue Webs and Other Nonwovens.
Product Data Sheet—Polyvinylamin—Innovation Award 2000 from BASF Group, 2 pages.
Article—*Copolyester Polymer for Binder Fibers*, William Haile, Leron Dean, and Dale Gregory, Nonwovens World, Apr.-May 1999, pp. 120-124.
Optics, Illumination and Image Sensing for Machine Vision VI—Punlication in the International Society for Optical Engineering—vol. 1614—by Donald J. Svetkoff—Chair/Editor—Nov. 14-15, 1991 Boston, Mass.

C. W. Aurich, "Uniqueness in Foam Application," *Proc. 1992 Tappi Nonwovens Conference*, Tappi Press, Atlanta, Georgia, 1992, pp. 15-19.

F. Clifford, "Foam Finishing Technology: The Controlled Application of Chemicals to a Moving Substrate," *Textile Chemist and Colorist*, VO. 10, No. 12, 1978, pp. 37-40.

J. D. Linsday, "Displacement Dewatering to Maintain Bulk," *Paperi Ja Puu*, vol. 74, No. 3, 1992, pp. 232-242.

M. Foulger and J. Parisian in "New Developments in Hot Pressing," *Pulp and Paper Canada*, vol. 101, No. 2, Feb. 2000, pp. 47-49.

R. James in "Squeezing More Out of Pressing and Drying," *Pulp and Paper International*, vol. 41, No. 12, Dec. 1999, pp. 13-17.

R. C. Mextaxas and R. J. Meredith in *Industrial Microwave Heating*, Peter Peregrinus, LTD, London, 1983, pp. 183-195.

Technical Manual of the American Association of Textile Chemists and Colorists (1992), pp. 99-100.

W. Hartmann in "Application Techniques for Foam Dyeing & Finishing," *Canadian Textile Journal*, Apr. 1980, pp. 55-58.

PCT Search Report for PCT/US02/41118, May 15, 2003.

PCT Search Report for PCT/US03/28240, Apr. 6, 2004.

U.S. Appl. No. 10/733,162, filed Dec. 11, 2003, Siebers, et al., Disposable Scrubbing Product.

U.S. Appl. No. 10/733,169, filed Dec. 11, 2003, Zhou, et al., Disposable Scrubbing Product.

PCT Search Report dated Feb. 26, 2004.

Article—*Non-contact drying and turning—the 'on machine' technology of the nineties*, Edward V. Bowden, Appita J., 44(1): 41(1991).

Product Data Sheet—ScourWipe™ Wipers by Texwipe®, 2 pages.

Article—Griffin, Rowland A., *Paper and Meltblown Composites—A Review*, INTC 200 International Nonwovens Technical Conference, Sep. 26-28, 2000, Dallas, Texas, published by INDA, Cary, North Carolina, 1998, pp. 7.1-7.5.

Article—Sustic, Andres, Lindquist, Jeff, and Severson, David, *New Construction Hot Melt Adhesives Based On Single Site Technology Polyethylene*, INDA-TEC 1998, Sep. 15-17, 1998, Atlantic City, New Jersey, published by INDA, Cary, North Carolina, 2998, pp. 19.0-19.9.

Article—Büchsel, Martin, Brink, Jean, and Kaussen, Manfred, *On Both Sides Abrasive Single Layer Melt Blown Nonwoven for Cleaning Purposes IN Consumer and Industrial Applications*, 10$^{th}$ Annual International TANDEC Nonwovens Conference, Nov. 7-10, 2001, Knoxville, Tennessee, 14 pages.

U.S. Appl. No. 10/321,277, filed Dec. 17, 2002, Chen, et al., Disposable Scrubbing Product.

Article—*What's New In Highloft Production?*, Radko Krema, Oldrich Jirsak, Jaroslav Hanus, and Terry Saunders, Nonwovens Industry, Oct. 1997, pp. 74-78.

Article—*Stretching the Value of Meltblown with Cellulose Microfibers and Elastic Resins*. Ron Zhao, Biax Fiberfilm Corp., Oct. 10-14, 2004, p. 12.

U.S. Appl. No. 10/744,238, filed Dec. 22, 2003, Lindsay, et al., Multi Purpose Cleaning Product Including A Foam and a Web.

U.S. Appl. No. 11/022,323, filed Dec. 22, 2004, Arendt, et al., Composite Cleaning Products Having Shape Resilient Layer.

U.S. Appl. No. 10/479,805, filed Dec. 31, 2003, Polanco, et al., High Loft Low Density Nonwoven Webs of Crimped Filament Filaments and Methods of Making Same.

U.S. Appl. No. 10/938,294, filed Sep. 10, 2004, Polanco, et al., High Loft Low Density Nonwoven Webs of Crimped Filaments and Methods of Making Same.

JP 8134763—Japanese Patent Abstract, May 1996.

Int'l Search Report and Written Opinion for PCT/US2004/022440, Dec. 21, 2004.

\* cited by examiner

MELTBLOWN SCRUBBING PRODUCT

BACKGROUND OF THE INVENTION

Abrasive scrubbing pads are commonly used for many cleaning and personal care practices. In general, scrubbing pads include a naturally occurring or manufactured abrasive material. Examples of typical abrasive materials commonly used in the past include pumice, loofah, steel wool, and a wide variety of plastic materials. A non-absorbent abrasive material is often combined with an absorbent sponge-like backing material in these products. For example, the abrasive material often forms a layer on a multi-layer product which also includes an absorbent layer of natural sponge, regenerated cellulose, or some other type of absorbent foamed product.

These scrubbing pads tend to be expensive, making them unsuitable for a disposable or single-use product. Due to the nature of the product use, however, the products can become fouled with dirt, grease, bacteria, and other contaminants after only one or two uses. As a result, consumers must replace these expensive scrubbing pads quite often in order to feel secure in the knowledge that they are using an uncontaminated cleaning pad.

Examples of abrasive cleaning articles have been described in the past. See, for example, International Published Application Number WO 02/41748, U.S. Pat. No. 5,213,588, and U.S. Pat. No. 6,013,349.

The present invention addresses these and other problems encountered with scrubbing pads in the past and is directed to disposable scrubbing pads which can provide a wide variety in level of abrasiveness, may be thin, comfortable and easy to hold, may have good absorbency, and may provide benefits not previously supplied in abrasive cleaning articles of the past.

SUMMARY OF THE INVENTION

The present invention is directed to a disposable scrubbing product for use in household cleaning or personal care applications, as well as industrial cleaning and other applications. In one embodiment, the present invention is directed to a cleaning tool including a handle and a rigid base to which the scrubbing product of the present invention may be removably attached to form a convenient cleaning tool.

The scrubbing product of the invention is a multi-layer product and generally includes at least two distinct layers, an abrasive layer and an absorbent fibrous layer such as a layer of tissue made from papermaking fibers, a layer of coform, an airlaid web, or combinations thereof or other known cellulosic webs. The abrasive layer is formed primarily of coarse polymeric fibers in a disordered or random distribution as is typical of fibers deposited in meltblown or spunbond processes. In one embodiment, the abrasive layer comprises multifilamentary aggregate fibers formed by the partial coalescence of a plurality of polymer strands (i.e. the individual fibers produced by the process) during a meltblown process or other fiber-forming process to form an integral, fiber-like, generally non-circular structure in which substantially parallel polymeric filaments are joined along their sides. Such multifilamentary aggregates may have an effective diameter much greater than the individual strands normally obtained in meltblown or spunbond processes, and a complex cross-sectional shape more suitable for providing abrasion than can be achieved with conventional circular fibers, and can contribute to effective cleaning and abrasion.

The polymeric fibers in the abrasive layer generally form an open, porous structure. For instance, the open void space within the abrasive layer may be greater than about 10%, particularly greater than about 50% more particularly greater than about 60% of the total volume of the abrasive layer. Further, a significant percentage of the superficial surface area of the abrasive layer (that is, the total area defined by the surface of the abrasive layer) may be occupied by openings through which the underlying absorbent layer can be seen. For example, about 10% or greater, specifically about 20% or greater, more specifically about 40% or greater, and most specifically about 55% or greater of the superficial surface area of the abrasive layer (the area seen in plan view from above) may be occupied by openings through which the underlying absorbent layer can be seen. The absorbent layer of the scrubbing product may include a paper web, for instance, the absorbent layer may include an uncreped, throughdried paper web.

The abrasive layer may be formed of polymeric materials, such as synthetic thermoplastic polymers suitable for fiber formation in a meltblown or spunbond process. Thermosetting polymers may also be used, as well as photocurable polymers and other curable polymers. In one embodiment, the fibers may be formed of thermoplastic polymers such as polyolefins, polyesters, polyetheresters, nylons, polyamides, or any suitable copolymers. In one particular embodiment, the abrasive fibers may be formed of a polypropylene. Optionally, the fibers may be bicomponent or multi-component fibers. If desired, the abrasive layer may be formed of two or more different types of abrasive fibers. For example, the abrasive layer may include different fiber types mixed together heterogeneously throughout the layer. Alternatively, the abrasive layer may include different fiber types laid down in a more homogeneous fashion, such as in sublayers across the cross section of the abrasive layer. In one embodiment, the polymeric fibers of the abrasive layer are substantially free of plasticizers, or may have 33 weight percent plasticizer or less, more specifically about 20 weight percent plasticizer or less, more specifically still about 10 weight percent plasticizer or less, and most specifically about 3 weight percent plasticizer or less. The dominant polymer in the polymeric fibers may have a molecular weight of any of the following: about 100,000 or greater, about 500,000 or greater, about 1,000,000 or greater, about 3,000,000 or greater, and about 5,000,000 or greater In general, thermoplastic polymer fibers in the abrasive layer may be greater than about 30 microns in mean diameter. More specifically, thermoplastic fibers may be between about 40 microns and about 800 microns in mean diameter, such as from about 40 microns to 600 microns, more specifically from about 50 microns to 400 microns, more specifically still from about 60 microns to 300 microns, and most specifically from about 70 microns to about 250 microns. Such fibers are substantially coarser than the fibers of conventional meltblown webs, and the added coarseness is generally helpful in increasing the abrasive characteristics of the web. The values of the mean fiber diameters previously specified may also refer to the width of non-circular multifilamentary aggregates, described more fully hereafter. For example, a multifilamentary aggregates of two or more polymer strands fused along their sides may have a width nearly two or more times that of the individual unfused strands, such as a width of about 50 microns to about 800 microns, or any other previously specified range. In addition, other widths may be achieved with multifilamentary aggregates, such as widths of about 100 microns of greater, about 250 microns or greater, about 400 microns or greater, about 600 microns or greater, and about 800 microns or greater.

The polymeric fibers in the abrasive layer may also be longer than about 1 cm, specifically longer than about 2 cm, in the abrasive layer of the scrubbing pad.

Other factors may contribute to the abrasive characteristics of the abrasive layer. In addition to being coarse, the fibers of the abrasive layer may have a high elastic modulus, such as an elastic modulus roughly equal to or greater than that of polypropylene such as about 1000 MPa or greater, specifically about 2000 MPa or greater, more specifically about 3000 MPa or greater, and most specifically about 5000 MPa or greater. By way of example, phenol plastics may have elastic moduli of about 8000 MPa, and a polyamide (nylon 6,6) reinforced with 15% glass fiber has a reported elastic modulus of 4,400 MPa (whereas the elastic modulus is about 1,800 MPa without the glass reinforcement).

For some polymer groups, an increased melting point may correlate with improved abrasive features. Thus, in one embodiment, the abrasive fibers may have a melting point greater than 120° C., such as about 140° C. or greater, about 160° C. or greater, about 170° C. or greater, about 180° C. or greater, or about 200° C. or greater, exemplified by the following ranges: from about 120° C. to about 350° C., from about 150° C. to about 250° C., or from about 160° C. to about 210° C.

In some embodiments, polymers with relatively high viscosity or low melt flow rates may be useful in producing coarse webs for effective cleaning. The melt flow rate of the polymer is measured according to ASTM D1238. While polymers typically used in meltblowing operations may have melt flow rates of about 1000 g/10 min or greater and may be considered in some embodiments of the present invention, in some embodiments the polymers used to produce an abrasive layer may have a melt flow rate according to ASTM D1238 less than 3000 g/10 min or 2000 g/10 min, such as less than about 1000 g/10 min or less than about 500 g/10 min, specifically less than 200 g/10 min, more specifically less than 100 g/10 min, and most specifically less than 80 g/10 min, such as from about 15 g/10 min to about 250 g/10 min, or from about 20 g/10 min to about 400 g/10 min.

The abrasiveness of the abrasive layer may further be enhanced by the topography of the abrasive layer. For example, the abrasive layer may have a plurality of elevated and depressed regions due to nonuniform basis weight, nonuniform thickness, or due to the three-dimensional topography of an underlying fibrous web such as a textured wetlaid tissue web. The elevated and depressed regions may be spaced apart substantially periodically in at least one direction such as the machine direction or the cross direction with a characteristic wavelength of about 2 mm or greater, more specifically about 4 mm or greater, and having a characteristic height difference between the elevated and depressed regions of at least 0.3 mm or greater, more specifically about 0.6 mm or greater, more specifically still about 1 mm or greater, and most specifically about 1.2 mm or greater.

In one embodiment, the abrasive layer consists essentially of meltblown or spunbond polymeric fibers and optional adhesive or other bonding means. In another embodiment, the abrasive layer is not a scrim or does not comprise scrim. In a related embodiment, the abrasive layer is substantially free of ordered rectilinearly arranged fibers or polymeric rubs on the surface (such as a scrim with extruded or molded polymeric rubs in an orderly pattern with one or more sets of parallel ribs extending at least 3 cm or longer).

In some embodiments, the abrasive layer may formed directly on a tissue layer, or may first be formed and then joined to the tissue by adhesive means, thermal bonding, and the like. When the abrasive layer is formed first, it may be provided with a three-dimensional topography by formation on or molding on a suitable three-dimensional surface. For example, a meltblown web may be formed on a coarse carrier wire. If the meltblown fibers are still molten or partially molten when they impinge upon the wire, the texture of the wire may be imparted to the web, particularly with the assistance of hydraulic pressure across the wire to further press the meltblown fibers against the wire before they have fully solidified. Improved molding of meltblown fibers against a wire may be achieved by using a suitably high temperature of the polymer or of the temperature of the air jets, and/or by adjusting the distance between the meltblown die and the carrier wire. The carrier wire may have a repeating series of depressions which may correspond to elevated regions on the meltblown web useful for cleaning. A three-dimensional carrier wire may impart elevated structures to the meltblown that rise about 0.2 mm or greater from the surrounding meltblown fabric, more specifically about 0.4 mm or greater, depending upon the desired level of abrasiveness. A spectrum of scrubby pads from mildly abrasive to aggressively abrasive may be produced.

The repeating structures may be represented as the minimum characteristic unit cell of the carrier wire, and the unit cell may have a minimum in-plane length scale (e.g., for a unit cell that is a parallelogram, the length of the shorter side, or for more complex shapes such as a hexagon, smaller of the machine direction width and cross-direction width) of about 1 mm or greater, such as about 2 mm or greater, or may have an area of about 5 square millimeters or greater (e.g., a unit cell of dimensions 1 mm by 5 mm), or about 20 square millimeters or greater. A carrier wire may be treated with a release agent such as a silicone liquid or coated with Teflon® or other release agents to enhance removal of the textured meltblown web from the carrier wire.

The abrasive layer of the scrubbing pad may usually be greater than about 10 grams per square meter (gsm) in basis weight. More specifically, the abrasive layer may be between about 25 and about 200 gsm in basis weight, more specifically still between about 30 and 150 gsm, and most specifically between about 40 gsm and 130 gsm. The abrasive layer may be joined to the underlying fibrous web directly due to thermal bonding or other interactions of the abrasive material with the fibrous web (e.g., hydroentangling, needling, etc.), wherein there is substantially no added adhesive joining the fibers of the abrasive layer to the absorbent fibrous web. In another embodiment, hot melt or cured adhesive is applied joining the two layers, wherein the basis weight of the adhesive is about 5 gsm or greater, such as from about 10 gsm to about 50 gsm, more specifically from about 15 gsm to about 40 gsm. Alternatively, the basis weight of the added adhesive may be less than about 5 gsm.

If desired, the abrasive layer may be somewhat translucent. For example, the superficial area covered by the abrasive layer may include open voids or pores which extend through the axial depth of the abrasive layer, allowing light to pass through the layer at the pores unhindered. In one embodiment, about 30% of the superficial area of the abrasive layer surface may include such pores. More specifically, about 50% of the superficial area defined by the surface of the abrasive layer may include such pores, making the layer somewhat translucent. Further, the entire laminate of the abrasive layer and a fibrous web may be translucent, particularly when wet.

While suitable translucency may be obtained by adjusting fiber diameter and other structural properties of the abrasive layer (e.g. basis weight, pore size, etc.), steps may be taken, if desired, to decrease the opacity of the polymeric material in the abrasive layer through the addition of clarifying agents. In one embodiment, clarifying agents are added to the polymers used in the abrasive layer, preferably prior to formation of the abrasive layer. Clarifying agents for polypropylene may include MoldPro 931 of Crompton Corporation (Greenwich, Conn.), benzylidene sorbitols, CAP20 of Polyvel, Inc. (Hammonton, N.J.), Millad® 3988 clarifying agent from Milliken Chemical (Spartanburg, S.C.), and other agents known in the art. Clarifying agents generally will cause the polymer to have a substantial increase in light transmittance as measured according to ASTM D1003, such as at least a 20% increase in light transmittance relative to substantially identical polymer without the presence of the clarifying agent. (Nucleating agents are often synonymous with clarifying agents and may also be used to modify the mechanical properties of the polymer, whether clarification occurs or not.) Other additives, fillers, and pigments known in the art may also be combined with the polymers in the abrasive layers of the present invention. Polymeric fibers reinforced with glass or other minerals, in either fiber or particle form, are within the scope of the present invention. For example, mineral or glass-containing fibers or other composite fiber forms may comprise about 50 weight % or more synthetic polymer, more specifically about 60 weight % or more synthetic polymer, more specifically still about 80 weight % or more synthetic polymer, and most specifically from about 90 weight % to about 99 weight % synthetic polymer.

The abrasive layer may have a relatively open structure that provides high permeability, allowing gas or liquid to readily pass through the abrasive layer. Permeability can be expressed in terms of Air Permeability measured with the FX 3300 Air Permeability device manufactured by Textest AG (Zürich, Switzerland), set to a pressure of 125 Pa (0.5 inches of water) with the normal 7-cm diameter opening (38 square centimeters), operating in a Tappi conditioning room (73° F., 50% relative humidity). The abrasive layer may have an Air Permeability of any of the following: about 100 CFM (cubic feet per minute) or greater, about 200 CFM or greater, about 300 CFM or greater, about 500 CFM or greater, or about 700 CFM or greater, such as from about 250 CFM to about 1500 CFM, or from about 150 CFM to about 1000 CFM, or from about 100 CFM to about 800 CFM, or from about 100 CFM to about 500 CFM. Alternatively, the Air Permeability of the abrasive layer can be less than about 400 CFM. In cases wherein the abrasive layer has a basis weight less than 150 gsm, multiple plies of the abrasive layer having a combined basis weight of at least 150 may display an Air Permeability of about 70 CFM or greater, or any of the aforementioned values or ranges given for a single abrasive layer.

The dry absorbent layer may have an Air Permeability value greater than 30 cubic feet per minute (CFM), such as about 40 CFM or greater, about 60 CFM or greater, and about 80 CFM or greater. Alternatively, the absorbent layer may have an Air Permeability between about 15 and 30 CFM, or from about 20 CFM to about 80 CFM. Much higher values are also possible. For example the Air Permeability of the absorbent layer may be about 150 CFM or greater, 200 CFM or greater, 300 CFM or greater, or 400 CFM or greater. By way of example, uncreped through-air dried tissue comprising high-yield fibers has been measured to have 615 CFM in a 20 gsm web; a sample of Scott® Towel (Kimberly-Clark Corp., Dallas, Tex.) was measured to have a permeability of 140 CFM; a sample of VIVA® paper towel (Kimberly-Clark Corp., Dallas, Tex.) was measured to have a permeability of 113 CFM.

A dry scrubbing product comprising an abrasive layer and an absorbent layer need not be substantially gas permeable, but nevertheless may have an Air Permeability of any of the following: about 10 CFM or greater, about 50 CFM or greater, about 80 CFM or greater, about 100 CFM or greater, about 200 CFM or greater, about 300 CFM or greater, and about 350 CFM or greater, such as from about 10 CFM to about 500 CFM, or from about 20 CFM to about 350 CFM, or from about 30 CFM to about 250 CFM, or from about 40 CFM to about 400 CFM.

In one embodiment, a paper web forming the absorbent layer of the product may be an uncreped, throughdried paper web and may generally have a basis weight greater than about 10 gsm. More specifically, the basis weight may be between about 20 and about 150 gsm, more specifically between about 40 gsm and 120 gsm. In addition, the paper web may comprise high yield pulp fibers. For example, the paper web may comprise more than about 5 dry weight percent high yield pulp fibers. In one embodiment, the paper web may comprise between about 15 and about 30 dry weight percent high yield pulp fibers. In other embodiments, the percentage of high-yield fibers in the web may be greater than any of the following: about 30%, about 50%, about 60%, about 70%, and about 90%. In one embodiment, the absorbent layer of the scrubbing article may be a multi-ply paper web product. For example, a laminate of two or more tissue layers or a laminate of an airlaid web and a wetlaid tissue may be formed using adhesives or other means known in the art.

If desired, the paper web may exhibit translucence when wet. For instance, the paper web may have a wet opacity of less than about 98%, specifically less than about 80%, more specifically less than about 60%. In one embodiment, the absorbent layer may be translucent when wet and may be attached to a translucent abrasive layer for viewing a surface which is being cleaned by the scrubbing product.

The two primary layers of the scrubbing pad may be attached by any suitable method. For example, the layers may be adhesively or thermally bonded together. In one embodiment, the layers may be bonded together with a hotmelt adhesive.

In addition to the two primary layers of the product, the scrubbing pad may optionally contain other layers or additives. For example, the abrasive layer may be made even more abrasive through various possible additives, such as particulate matter like pumice or microspheres, included in the layer. Also, the pad may include additional layers, such as a hydrophobic barrier layer on the absorbent layer. A hydrophobic barrier layer may be a permanent layer, such as a film, applied to the product, or a removable layer, such as a hydrophobic sheet. The hydrophobic barrier may be between the absorbent layer and the abrasive layer, so as to prevent wetting of part or all of the absorbent layer, or optionally may be on the external surface of the absorbent layer, so as to prevent the hand from getting wet during use. Additionally, the scrubbing product may contain other additives associated with either of the primary layers such as soaps, detergents, buffering agents, antimicrobial agents, skin wellness agents, lotions, medications, polishing agents, and the like.

The scrubbing product of the present invention may be useful in many different applications. For instance, a scrubbing pad could be useful as a dishcloth, a scouring pad, a polishing pad, a sanding pad, or a personal cleansing pad, such as an exfoliating pad. In addition, the scrubbing product can be part of a cleaning tool useful for cleaning floors, walls, windows, toilets, and the like. In certain embodiments, the product of the present invention may include the abrasive layer alone, without any absorbent layer. For example, a meltblown or spunbond abrasive layer alone may be utilized as a scouring pad, a polishing pad, a sanding pad, or a personal cleansing pad such as an exfoliating pad, for instance either with or without the attached absorbent layer.

DEFINITIONS

As used herein the term "meltblown fibers" means fibers of a polymeric material which are generally formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter. Thereafter, the meltblown fibers may be carried by the high velocity gas stream and are deposited on a collecting surface to form a web of randomly dispersed meltblown fibers. Meltblown fibers may be continuous or discontinuous and are generally tacky when deposited onto a collecting surface. In some embodiments, however, low or minimal air flow is used to reduce fiber attenuation and, in some embodiments, to permit neighboring filaments of molten polymer to coalesce (e.g., to adhere along the respective sides of the strands), becoming joined at least in part along the proximate sides of the neighboring strands to form fibers that are multifilamentary aggregate fibers (i.e. an aggregate fiber formed of two or more polymer strands further defined herein).

"Papermaking fibers," as used herein, include all known cellulosic fibers or fiber mixes comprising cellulosic fibers. Fibers suitable for making the webs of this invention comprise any natural or synthetic cellulosic fibers including, but not limited to nonwoody fibers, such as cotton, abaca, kenaf, sabai grass, flax, esparto grass, straw, jute hemp, bagasse, milkweed floss fibers, and pineapple leaf fibers; and woody fibers such as those obtained from deciduous and coniferous trees, including softwood fibers, such as northern and southern softwood kraft fibers; hardwood fibers, such as eucalyptus, maple, birch, and aspen. Woody fibers may be prepared in high-yield or low-yield forms and may be pulped in any known method, including kraft, sulfite, high-yield pulping methods and other known pulping methods. Fibers prepared from organosolv pulping methods may also be used. A portion of the fibers, such as up to 50% or less by dry weight, or from about 5% to about 30% by dry weight, may be synthetic fibers such as rayon, polyolefin fibers, polyester fibers, bicomponent sheath-core fibers, multi-component binder fibers, and the like. An exemplary polyethylene fiber is Pulpex®, available from Hercules, Inc. (Wilmington, Del.). Any known bleaching method may be used. Synthetic cellulose fiber types include rayon in all its varieties and other fibers derived from viscose or chemically modified cellulose. Chemically treated natural cellulosic fibers may be used such as mercerized pulps, chemically stiffened or crosslinked fibers, or sulfonated fibers. For good mechanical properties in using papermaking fibers, it may be desirable that the fibers be relatively undamaged and largely unrefined or only lightly refined. While recycled fibers may be used, virgin fibers are generally useful for their mechanical properties and lack of contaminants. Mercerized fibers, regenerated cellulosic fibers, cellulose produced by microbes, rayon, and other cellulosic material or cellulosic derivatives may be used. Suitable papermaking fibers may also include recycled fibers, virgin fibers, or mixes thereof. In certain embodiments capable of high bulk and good compressive properties, the fibers may have a Canadian Standard Freeness of at least 200, more specifically at least 300, more specifically still at least 400, and most specifically at least 500.

As used herein, "high yield pulp fibers" are those papermaking fibers produced by pulping processes providing a yield of about 65 percent or greater, more specifically about 75 percent or greater, and still more specifically from about 75 to about 95 percent. Yield is the resulting amount of processed fiber expressed as a percentage of the initial wood mass. Such pulping processes include bleached chemithermomechanical pulp (BCTMP), chemithermomechanical pulp (CTMP) pressure/pressure thermomechanical pulp (PTMP), thermomechanical pulp (TMP), thermomechanical chemical pulp (TMCP), high yield sulfite pulps, and high yield kraft pulps, all of which leave the resulting fibers with high levels of lignin. High yield fibers are well known for their stiffness (in both dry and wet states) relative to typical chemically pulped fibers. The cell wall of kraft and other non-high yield fibers tends to be more flexible because lignin, the "mortar" or "glue" on and in part of the cell wall, has been largely removed. Lignin is also nonswelling in water and hydrophobic, and resists the softening effect of water on the fiber, maintaining the stiffness of the cell wall in wetted high yield fibers relative to kraft fibers. The preferred high yield pulp fibers may also be characterized by being comprised of comparatively whole, relatively undamaged fibers, high freeness (250 Canadian Standard Freeness (CSF) or greater, more specifically 350 CSF or greater, and still more specifically 400 CSF or greater, such as from about 500 to 750 CSF), and low fines content (less than 25 percent, more specifically less than 20 percent, still more specifically less that 15 percent, and still more specifically less than 10 percent by the Britt jar test). In addition to common papermaking fibers listed above, high yield pulp fibers also include other natural fibers such as milkweed seed floss fibers, abaca, hemp, cotton and the like.

As used herein, the term "cellulosic" is meant to include any material having cellulose as a significant constituent, and specifically comprising about 20 percent or more by weight of cellulose or cellulose derivatives, and more specifically about 50 percent or more by weight of cellulose or cellulose derivatives. Thus, the term includes cotton, typical wood pulps, nonwoody cellulosic fibers, cellulose acetate, cellulose triacetate, rayon, viscose fibers, thermomechanical wood pulp, chemical wood pulp, debonded chemical wood pulp, lyocell and other fibers formed from solutions of cellulose in NMMO, milkweed, or bacterial cellulose, lyocell, and may be viscose, rayon, and the like. Fibers that have not been spun or regenerated from solution may be used exclusively, if desired, or at least about 80% of the web may be free of spun fibers or fibers generated from a cellulose solution. Examples of cellulosic webs may include known tissue material or related fibrous web, such as wet-laid creped tissue, wet-laid uncreped tissue, pattern-densified or imprinted tissue such as Bounty® paper towels or Charmin® toilet paper made by Procter and Gamble (Cincinnati, Ohio), facial tissue, toilet paper, dry-laid cellulosic webs such as airlaid webs comprising binder fibers, coform webs comprising at least 20% papermaking fibers or at least 50% papermaking fibers, foam-formed tissue, wipes for home and industrial use, hydroentangled webs such as spunbond webs hydroentangled with papermaking fibers, exemplified by the webs of U.S. Pat. No. 5,284,703, issued Feb. 8, 1994 to Everhart et al., and U.S. Pat. No. 4,808,467, issued Feb. 28, 1989 to Suskind et al., and the like. In one embodiment, the cellulosic web can be a reinforced cellulosic webs comprising a synthetic polymer network such as a spunbond web to which papermaking fibers are added by lamination, adhesive bonding, or hydroentangling, or to which an adhesive such as latex has been impregnated into the web (e.g., by gravure printing or other known means, exemplified by the VIVA® paper towel of Kimberly-Clark Corp., Dallas, Tex.) to provide high wet or dry tensile strength to the web. The reinforcing polymer (including adhesive) may comprise at about 1% or greater of the mass of the cellulosic web, or any of the following: about 5% or greater, about 10% or greater, about 20% or greater, about 30% or greater, or about 40% or greater, of the mass of the cellulosic web, such as from about 1% to about 50% or from about 3% to about 35% of the mass of the cellulosic web.

As used herein, "void volume" refers to the volume of space occupied by a sample that does not comprise solid matter. When expressed as a percentage, it refers to the percentage of the overall volume occupied by the sample that does not comprise solid matter.

As used herein, "Strength Synergy" and "Stretch Synergy" refer to measurements of synergistic improvements in the material properties of a combination of an abrasive layer and a tissue layer when the layers are bonded relative to the unbonded state. When laminates according to the present invention are used for scrubbing or other demanding tasks, the durability of the product may be surprisingly high. At least part of the excellent performance may be due to a synergy in the material properties of the laminate, which may be superior to what one would expect based on the material properties of the individual components. For example, the tensile strength and stretch properties of an abrasive laminate comprising a meltblown layer bonded to a tissue web may have a substantially higher tensile strength than an unbonded combination of the same meltblown layer and tissue web together. The ratio of the tensile strength of the bonded laminate relative to the tensile strength of the unbonded combination of the two or more layers is called the "Strength Synergy." The tensile measurements are taken with a 3-inch jaw width, a 4-inch gauge length, in a tensile testing machine with a crosshead speed of 10 inches per minute. Tensile strength is taken as the maximum load prior to failure, and stretch is the percentage increase in length at the point of maximum load. The stretch of the laminate (stretch at the point of failure in tensile testing) may also be higher than the stretch of the two or more unbonded layers together. The ratio of the stretch of the bonded laminate relative to the stretch of the unbonded combination of the two or more layers together is called the "Stretch Synergy." Unless otherwise specified, the tensile testing used to determine Strength Synergy and Stretch Synergy is done in the machine direction of the components, or, when the abrasive layer does not have a clearly discernible machine direction or has a machine direction that is not aligned with the machine direction of the tissue in the laminated product, then the tensile testing of the tissue component is taken in the machine direction, which is generally the direction having the highest tensile strength in a tissue web.

For some embodiments, the Strength Synergy may be about 1.05 or greater, more specifically about 1.1 or greater, more specifically still about 1.2 or greater, and most specifically about 1.5 or greater, with exemplary ranges of about 1.05 to about 3, about 1.1 to about 2.5, and about 1.5 to about 4. For some embodiments, the Stretch Synergy may be about 1.1 or greater, more specifically about 1.3 or greater, more specifically still about 1.5 or greater, and most specifically about 1.8 or greater, with exemplary ranges of about 1.3 to about 3, about 1.5 to about 2.5, and about 1.5 to about 2. A laminate with a Stretch Synergy substantially greater than 1 may have but need not have a Strength Synergy substantially greater than 1. Likewise, a laminate with a Strength Synergy substantially greater than 1 may have but need not have a Stretch Synergy substantially greater than 1.

"Overall Surface Depth" is a measure of the topography of a surface, indicative of a characteristic height different between elevated and depressed portions of the surface. The optical technique used for measuring Overall Surface Depth is described hereafter.

BRIEF DESCRIPTION OF THE FIGURES

A full and enabling disclosure of the present invention, including the best mode thereof to one of ordinary skill in the art, is set forth more particularly in the remainder of the specification, including reference to the accompanying figures in which.

Figure 1:
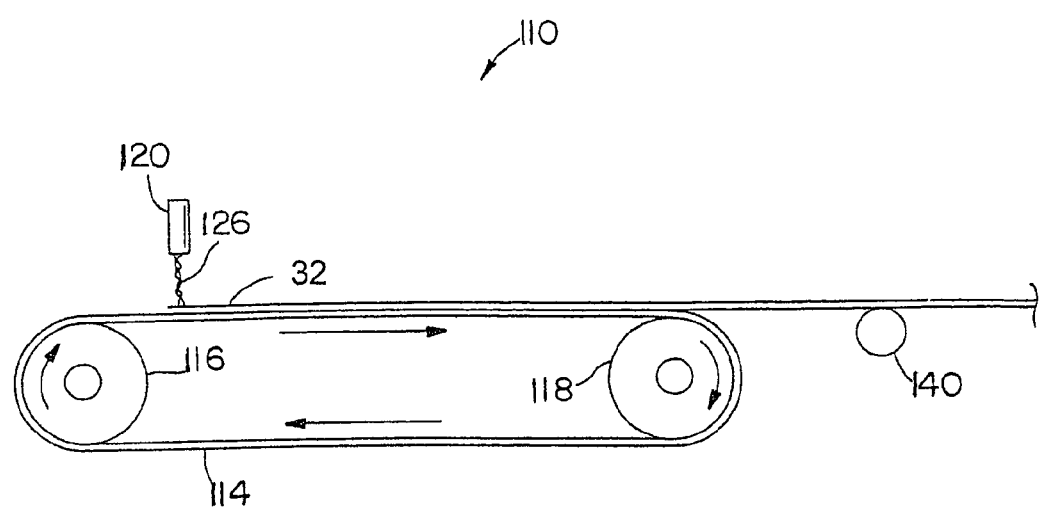
FIG. 1 is a schematic diagram of one embodiment of a process line for making the abrasive layer of the present invention.

Repeat use of reference characters in the present specification and drawings is intended to represent same or analogous features or elements of the present invention.

DETAILED DESCRIPTION OF PREFERRED EMBODIMENTS

Reference now will be made in detail to the embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention cover such modifications and variations as come within the scope of the appended claims and their equivalents.

In general, the present invention is directed to disposable scrubbing pads which are suitable for use in a wide variety of applications, including household cleaning and personal care applications. For example, the scrubbing products of the present invention may be suitable for use as a dishcloth, a general purpose cleaning cloth, a scouring or polishing pad, or a personal care product, such as an exfoliating pad, for instance. In certain embodiments, the scrubbing products of the present invention can be used to remove layers of a surface, for example in a sanding or polishing application.

The scrubbing pads of the present invention are generally of a multi-layer construction and include a nonwoven abrasive layer secured to an absorbent layer which includes a nonwoven paper web. For instance, the abrasive layer may be a porous, flexible, meltblown web and may be thermally bonded to a high bulk, absorbent paper web, such as an uncreped, through-air dried (UCTAD) paper web.

The two distinct layers of the composite scrubbing pad may offer cleaning advantages beyond those known in other composite scrubbing articles, and may do so at a much lower cost. Other advantages are gained by the disposable scrubbing pads as well. For instance, the soft paper web and flexibility of the pad may make the article much more comfortable to hold during cleaning than previously known composite scrubbing articles. Additionally, the pads may be shaped so as to be attachable to a rigid gripping device, forming a convenient cleaning tool for either heavy or light scrubbing, as desired by the user. For example, a cleaning tool capable of holding the scrubbing product of the present invention could be used for cleaning floors, walls, windows, toilets, ceiling fans, and the like as well as for cleaning surfaces by polishing or sanding a surface.

If desired, the scrubbing pads may optionally include various additives, such as cleaning agents or medications, which may enhance the performance of the pads. Moreover, the scrubbing pads may exhibit translucence when wet, such that the user may see the surface being cleaned while scrubbing continues. Of particular advantage, it has been discovered that a synergy may occur between the component layers of the composite structure of the present invention, and the scrubbing pads may exhibit mechanical properties greater than the sum of the mechanical properties of the individual layers. For example, the tensile strength and the durability, among other mechanical properties, may be greater in the composite structure than the sum of the same properties in the individual layers. Similarly, the abrasiveness of the pad at the abrasive surface may be enhanced due to the texture of the attached absorbent layer.

In general, the abrasive layer of the scrubbing pads of the present invention may include a material which is formed into an open, porous structure and has enough strength and hardness to form a rough, scratchy surface on the pad. Suitable materials are abundant and may be either natural or synthetic materials. Possible exemplary materials may include any known abrasive materials formed into the desired open structure. Possible synthetic materials may be polymeric materials, such as, for instance, meltspun nonwoven webs formed of molten or uncured polymer which may then harden to form the desired abrasive layer.

Other materials may optionally be used as the abrasive layer of the present invention. For example, other materials used as abrasives in known commercial scrubbing products could be used, such as apertured nylon covers, nylon networks, and materials similar to those found in other abrasive products such as, for instance, SCOTCHBRITE pads of 3M Corp. (Minneapolis, Minn.).

The materials and processes used to form the abrasive layer of the scrubbing pad may be chosen and designed with the desired end use of the product in mind. For example, a scrubbing pad designed as a personal care product, such as a face-washing pad, may include an abrasive layer which is softer and less abrasive than a scrubbing pad for use in household cleaning applications. Thus, the raw materials, additives, fiber diameter, layer density and stiffness, etc. may all vary depending on the desired characteristics of the final product.

In one embodiment, the abrasive layer of the scrubbing pad may include a nonwoven meltblown web, such as may be formed using a thermoplastic polymer material. Generally, any suitable thermoplastic polymer that may be used to form meltblown nonwoven webs may be used for the abrasive layer of the scrubbing pads. A non-exhaustive list of possible thermoplastic polymers suitable for use include polymers or copolymers of polyolefins, polyesters, polypropylene, high density polypropylene, polyvinyl chloride, vinylidene chloride, nylons, polytetrafluoroethylene, polycarbonate, poly (methyl) acrylates, polyoxymethylene, polystyrenes, ABS, polyetheresters, or polyamides, polycaprolactan, thermoplastic starch, polyvinyl alcohol, polylactic acid, such as for example polyesteramide (optionally with glycerin as a plasticizer), poluphenylsulfide (PPS), poly ether ether ketone (PEEK), polyvinylidenes, polyurethane, and polyurea. For instance, in one embodiment, the abrasive layer may include meltblown nonwoven webs formed with a polyethylene or a polypropylene thermoplastic polymer. Polymer alloys may also be used in the abrasive layer, such as alloy fibers of polypropylene and other polymers such as PET. Compatibilizers may be needed for some polymer combinations to provide an effective blend. In one embodiment, the abrasive polymer is substantially free of halogenated compounds. In another embodiment, the abrasive polymer is not a polyolefin, but comprises a material that is more abrasive than say, polypropylene or polyethylene (e.g. having flexural modulus of about 1200 MPa and greater, or a Shore D hardness of 85 or greater).I In addition to being coarse, the fibers of the abrasive layer may have a high elastic modulus, such as an elastic modulus roughly equal to or greater than that of polypropylene such as about 1,000 MPa or greater, specifically about 2,000 MPa or greater, more specifically about 3,000 MPa or greater, and most specifically about 5,000 MPa or greater. By way of example, phenol plastics may have elastic moduli of about 8000 MPa, and apolyamide (nylon 6,6) reinforced with 15% glass fiber has a reported elastic modulus of about 4,400 MPa (whereas the elastic modulus is about 1,800 MPa without the glass reinforcement).

For some polymer groups, an increased melting point may correlate with improved abrasive features. Thus, in one embodiment, the abrasive fibers may have a melting point greater than 120° C., such as about 140° C. or greater, about 160° C. or greater, about 170° C. or greater, about 180° C. or greater, or about 200° C. or greater, exemplified by the following ranges: from about 120° C. to about 350° C., from about 150° C. to about 250° C., or from about 160° C. to about 210° C.

Another measure that may be indicative of good abrasive properties is Shore Hardness D, as measured with standard test method ASTM D 1706. In general, suitable polymeric material of the abrasive layer may have a Shore Hardness D of about 50 or greater, such as about 65 or greater, or more specifically, about 70 or greater, or most specifically about 80 or greater. Polypropylene, for example, typically has Shore D hardness values from about 70 to about 80.

In one embodiment, the polymeric material in the abrasive layer may have a flexural modulus of about 500 MPa or greater and a Shore D hardness of about 50 or greater. In an alternative embodiment, the polymeric material may have a flexural modulus of about 800 MPa or greater and a Shore D hardness of about 50 or greater.

In one embodiment, the abrasive layer of the scrubbing pad may include a nonwoven meltblown web, such as may be formed using a thermoplastic polymer material. Generally, any suitable thermoplastic polymer that may be used to form meltblown nonwoven webs may be used for the abrasive layer of the scrubbing pads. A non-exhaustive list of possible thermoplastic polymers suitable for use include polymers or copolymers of polyolefins, polyesters, polyetheresters, nylons, or polyamides, polycaprolactan, thermoplastic starch, polyvinyl alcohol, polyactic acid, such as for example polyesteramide (optionally with glycerin as a plasticizer). For instance, in one embodiment, the abrasive layer may include meltblown nonwoven webs formed with a polyethylene or a polypropylene thermoplastic polymer.

In one embodiment, the polymeric fibers of the abrasive layer are substantially free of plasticizers, or may have 33 weight percent plasticizer or less, more specifically about 20 weight percent plasticizer or less, more specifically about 3 weight percent plasticizer or less. The dominant polymer in the polymeric fibers may have a molecular weight of any of the following: about 100,000 or greater, about 500,000 or greater, about 1,000,000 or greater, about 3,000,000 or greater, and about 5,000,000 or greater.

The abrasive layer may comprise fibers of any suitable cross-section. For example, the fibers of the abrasive layer may include coarse fibers with circular or non-circular cross-sections. Moreover, non-circular cross-sectional fibers may include grooved fibers or multi-lobal fibers such as, for example, "4DG" fibers (specialty PET deep grooved fibers, with an eight-legged cross-section shape). Additionally, the fibers may be single component fibers, formed of a single polymer or copolymer, or may be multi-component fibers.

In an effort to produce an abrasive layer having desirable combinations of physical properties, in one embodiment, nonwoven polymeric fabrics made from multi-component or bicomponent filaments and fibers may be used. Bicomponent or multi-component polymeric fibers or filaments include two or more polymeric components which remain distinct. The various components of multi-component filaments are arranged in substantially distinct zones across the cross-section of the filaments and extend continuously along the length of the filaments. For example, bicomponent filaments may have a side-by-side or core and sheath arrangement. Typically, one component exhibits different properties than the other so that the filaments exhibit properties of the two components. For example, one component may be polypropylene which is relatively strong and the other component may be polyethylene which is relatively soft. The end result is a strong yet soft nonwoven fabric.

In one embodiment, the abrasive layer comprises metallocene polypropylene or "single site" polyolefins for improved strength and abrasiveness. Exemplary single-site materials are available from H.B. Fuller Company, Vadnais Heights, Minn.

In another embodiment, the abrasive layer includes a precursor web comprising a planar nonwoven substrate having a distribution of attenuated meltable thermoplastic fibers such as polypropylene fibers thereon. The precursor web may be heated to cause the thermoplastic fibers to shrink and form nodulated fiber remnants that impart an abrasive character to the resultant web material. The nodulated fiber remnants may comprise between about 10% and about 50% by weight of the total fiber content of the web and may have an average particle size of about 100 micrometers or greater. In addition to the fibers that are used to form nodulated remnants, the precursor web may contain cellulosic fibers and synthetic fibers having at least one component with a higher melting point than polypropylene to provide strength. The precursor web may be wet laid, air laid, or made by other methods. In one embodiment, the precursor web is substantially free of papermaking fibers. For example, the precursor web may be a fibrous nylon web containing polypropylene fibers (e.g., a bonded carded web comprising both nylon fibers and polypropylene fibers).

The abrasive layer may also be apertured to improve fluid access to the absorbent layer of the article. Pin apertured meltblown webs, for example, may have increased abrasiveness due to the presence of apertures.

The material used to form the abrasive layer may also contain various additives as desired. For example, various stabilizers may be added to a polymer, such as light stabilizers, heat stabilizers, processing aides, and additives that increase the thermal aging stability of the polymer. Further, auxiliary wetting agents, such as hexanol, antistatic agents such as a potassium alkyl phosphate, and alcohol repellants such as various fluoropolymers (e.g., DuPont Repellent 9356H) may also be present. Desired additives may be included in the abrasive layer either through inclusion of the additive to a polymer in the die or alternatively through addition to the abrasive layer after formation, such as through a spraying process.

For exemplary purposes, one embodiment of a system for forming a meltblown nonwoven web as may be used in the abrasive layer of the scrubbing pad is illustrated in FIG. 1. As shown, the system includes a forming machine generally 110 which may be used to produce a meltblown web 32 in accordance with the present invention. Particularly, the forming machine 110 includes an endless foraminous-forming belt 114 wrapped around rollers 116 and 118 so that the belt 114 is driven in the direction shown by the arrows.

Figure 8:
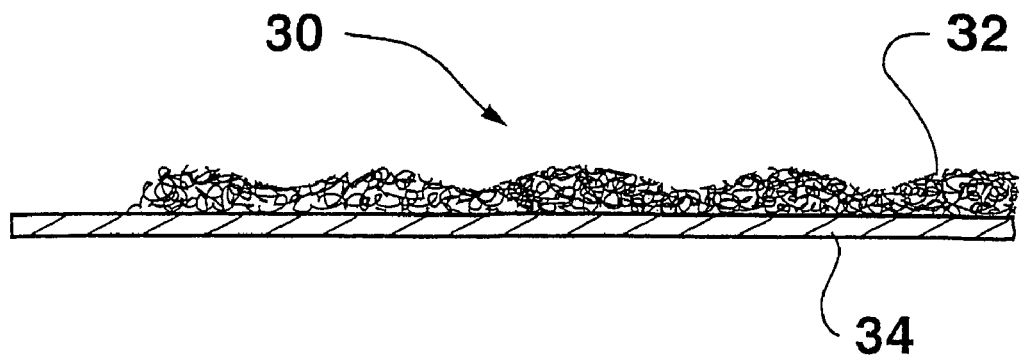
FIG. 8 is a cross-sectional view of another embodiment of the scrubbing pad of the present invention.

The forming belt 114 may be any suitable forming belt and, if desired, may provide additional three-dimensional texture to the meltblown layer. Added texture may affect the abrasiveness of the layer. For example, a high degree of surface texture in the meltblown layer may be achieved by forming a meltblown layer on a high dimension forming fabric, such as those available from Lindsay Wire Company. FIG. 8 is a cross section of one embodiment of the present invention illustrating a highly texture meltblown layer 32 such as could be formed on a highly textured forming fabric. The highly texture meltblown layer may then be attached to an absorbent layer 34 in forming the scrubbing pad of the present invention.

The forming machine system of FIG. 1 may also include a die 120 which is used to form fibers 126. The throughput of the die 120 is specified in pounds of polymer melt per inch of die width per hour (PIH). As a thermoplastic polymer exits the die 120, high-pressure fluid, usually air, attenuates and spreads the polymer stream to form fibers 126. The fibers 126 may be randomly deposited on the forming belt 114 and form a meltblown layer 32.

In the manufacture of conventional meltblown materials, high velocity air is usually used to attenuate the polymeric strands to create fine, thin fibers. In the present invention, by adjusting the air flow system, such as by increasing the air flow area or otherwise decreasing the velocity of the air stream immediately adjacent the molten polymeric strands as they emerge from the meltblown die head, it is possible to prevent substantial attenuation of the fiber diameter (or reduce the degree of fiber attenuation). Limiting the attenuation of the fiber diameter may increase fiber coarseness, which may increase the abrasiveness of the layer formed by the fibers.

Additionally, the airflow near the die exit may be used to agitate and spread the polymeric fibers in a manner than may be highly non-uniform on the forming belt. The large degree of non-uniformity of the lay-down of coarse meltblown fibers on the belt may be manifest in a web which may display variations in thickness and variations in basis weight across the surface of the web, i.e., an uneven surface may be created on the web, which may increase the abrasiveness of the layer formed by the fibers.

In addition, non-uniform spread of the fibers during formation of the web may create a web with increased void space within the web. For example, an open network of fibers may be formed which may have open voids that occupy a substantial portion of the layer. For instance, the void volume of the abrasive layer may be greater than about 10%, particularly greater than about 50%, and more particularly greater than about 60% of the volume of the material. These open void materials may inherently have good scrubbing properties.

The void space, or pores, created in the web may also produce variations in opacity across the web such that the abrasive layer formed by the web may be somewhat translucent. Due to the random lay down of the fibers and the resulting open structure of the abrasive layer, many of the pores formed in the web may extend across the entire depth of the layer, permitting light to pass through the layer unhindered and providing a degree of translucence to the abrasive layer. In certain embodiments, more than about 30% of the surface area of the abrasive layer may include open void space which extends across the axial depth of the layer. More specifically, more than about 50% of the surface area of the abrasive layer may include open void space extending across the axial depth of the layer, providing a high degree of translucence to the abrasive layer. As such, a significant percentage of the superficial area of the abrasive layer may be occupied by openings or pores through which the underlying absorbent layer may be seen. For example, about 10% or greater, specifically about 20% or greater, more specifically about 40% or greater, and most specifically about 55% or greater of the superficial area of the abrasive layer (the surface area seen in plan view from above) may be occupied by openings through which the underlying absorbent layer may be seen. Additionally, the abrasive layer may be formed of a translucent polymer, which may increase the translucence of the layer.

Expressed on a percentage basis, the standard deviation of opacity for data points averaged over 5-mm square sections, may be about 5% of greater, more specifically about 10% or greater, more specifically about 20% or greater, and most specifically about 30% or greater, such as from about 8% to about 60%, or from 12% to about 50%.

While suitable translucency may be obtained by adjusting fiber diameter and other structural properties of the abrasive layer (e.g. basis weight, pore size, etc.), steps may be taken, if desired, to decrease the opacity of the polymer material in the abrasive layer through the addition of clarifying agents. In one embodiment, clarifying agents are added to the polymers used in the abrasive layer, preferably prior to formation of the abrasive layer. Clarifying agents for polypropylene may include MoldPro 931 of Crompton Corporation (Greenwich, Conn.), benzylidene sorbitols, CAP20 of Polyvel, Inc. (Hammonton, N.J.), Millad® 3988 clarifying agent from Milliken Chemical (Spartanburg, S.C.), and other agents known in the art. Clarifying agents generally will cause the polymer to have a substantial increase in light transmittance as measured according to ASTM D1003, such as at least a 20% increase in light transmittance relative to substantially identical polymer without the presence of the clarifying agent. (Nucleating agents are often synonymous with clarifying agents and may also be used to modify the mechanical properties of the polymer, whether clarification occurs or not.) Other additives, fillers, and pigments known in the art may also be combined with the polymers in the abrasive layers of the present invention. Polymeric fibers reinforced with glass or other minerals, in either five or particle form, are within the scope of the present invention. For example, mineral or glass-containing fibers or other composite fiber forms may comprise about 50 weight % or more synthetic polymer, more specifically about 60 weight % or more synthetic polymer, more specifically still about 80 weight % or more synthetic polymer, and most specifically from about 90 weight % to add 99 weight % synthetic polymer.

In general, thermoplastic polymer fibers in the abrasive layer may be greater than about 30 microns in mean diameter. More specifically, thermoplastic fibers may be between about 40 microns and about 800 microns in mean diameter, such as from about 50 microns to 400 microns, more specifically still from about 60 microns to 300 microns, and most specifically from about 70 microns to about 250 microns. Such fibers are substantially coarser than the fibers of conventional meltblown webs, and the added coarseness is generally helpful in increasing the abrasive characteristics of the web.

The fibers forming the meltblown web may be long enough so as to support the open network of the layer. For example, the fibers may have a fiber length of at least about one centimeter. More specifically, the fibers may have a characteristic fiber length of greater than about 2 cm.

If desired, the fibers may optionally be formed to include abrasion enhancing features, such as inclusion of filler particles, for example microspheres, granules of pumice or metal, treatment with meltblown "shot", and the like.

Microspheres may be from about 10 microns to about 1 mm in diameter and typically have a shell thickness of from about 1 to about 5 microns, while macrospheres (which may also be used in some embodiments) may have diameters greater than about 1 mm. Such materials may include microbeads of metal, glass, carbon, mica, quartz or other minerals, plastic such as acrylic or phenolic, including acrylic microspheres known as PM 6545 available from PQ Corporation of Pennsylvania, and hollow microspheres such as the crosslinked acrylate SunSpheres™ of ISP Corporation (Wayne, N.J.) and similar hollow spheres as well as expandable spheres such as Expancel® microspheres (Expancel, Stockviksverken, Sweden, a division of Akzo Nobel, Netherlands), and the like.

In one embodiment of the present invention, the abrasive layer may be made from a nonwoven meltspun web, such as a meltblown web treated with a meltblown "shot". Meltblown shot is a coarse nonuniform layer applied in a meltblown process deliberately operated to generate random globules of the polymer (typically polypropylene or another thermoplastic) interconnected with strands. If desired, the shot may be distinctly colored to make the abrasive element readily visible.

Optionally, the abrasive layer of the present invention may be formed from two or more different fiber types. For instance, the abrasive layer may be formed of different fiber types formed of different polymers or different combinations of polymers. Additionally, the abrasive layer may be formed of different fiber types including fibers of different orientations, i.e. curled or straight fibers, or fibers having different lengths or cross sectional diameters from each other. For example, die 120 may be a multi-section die and include different polymer material in different sections which may be fed through the die 120 and form distinctly different fibers which may then be mixed and heterogeneously distributed on forming belt 114. Alternatively, two or more different meltblown sub-layers may be formed and bonded together to form an abrasive layer with a fairly uniform, homogeneous distribution of different fiber types.

In one embodiment, the abrasive layer of the present invention may include multifilamentary aggregates of individual polymeric strands.

As used herein, the term "multifilamentary aggregate" refers to a meltblown fiber that is actually an aggregate of two or more polymer strands formed by at least the partial coalescence (adhesion) of adjacent molten polymer strands ejected from adjacent holes on a meltblown die, which may be achieved, for example, under circumstances in which the turbulence created by air jets is substantially lower than in normal meltblown operation, thereby allowing two or more adjacent strands to come into contact and become joined together along at least a portion of the length of the strands. For instance, the individual strands forming the multifilamentary aggregate fiber may be joined side by side for a distance greater than about 5 mm, along the length of the fiber. As such, bicomponent fibers, multi-lobal fibers, and the like, which are extruded as a single fiber with multiple polymers or complex shapes are not to be confused with the mitifilamentary aggregate fibers of the present invention, which include adjacent polymer strands extruded or ejected from adjacent holes in a meltblown die and only adhere together after exiting the die.

Figure 14A:
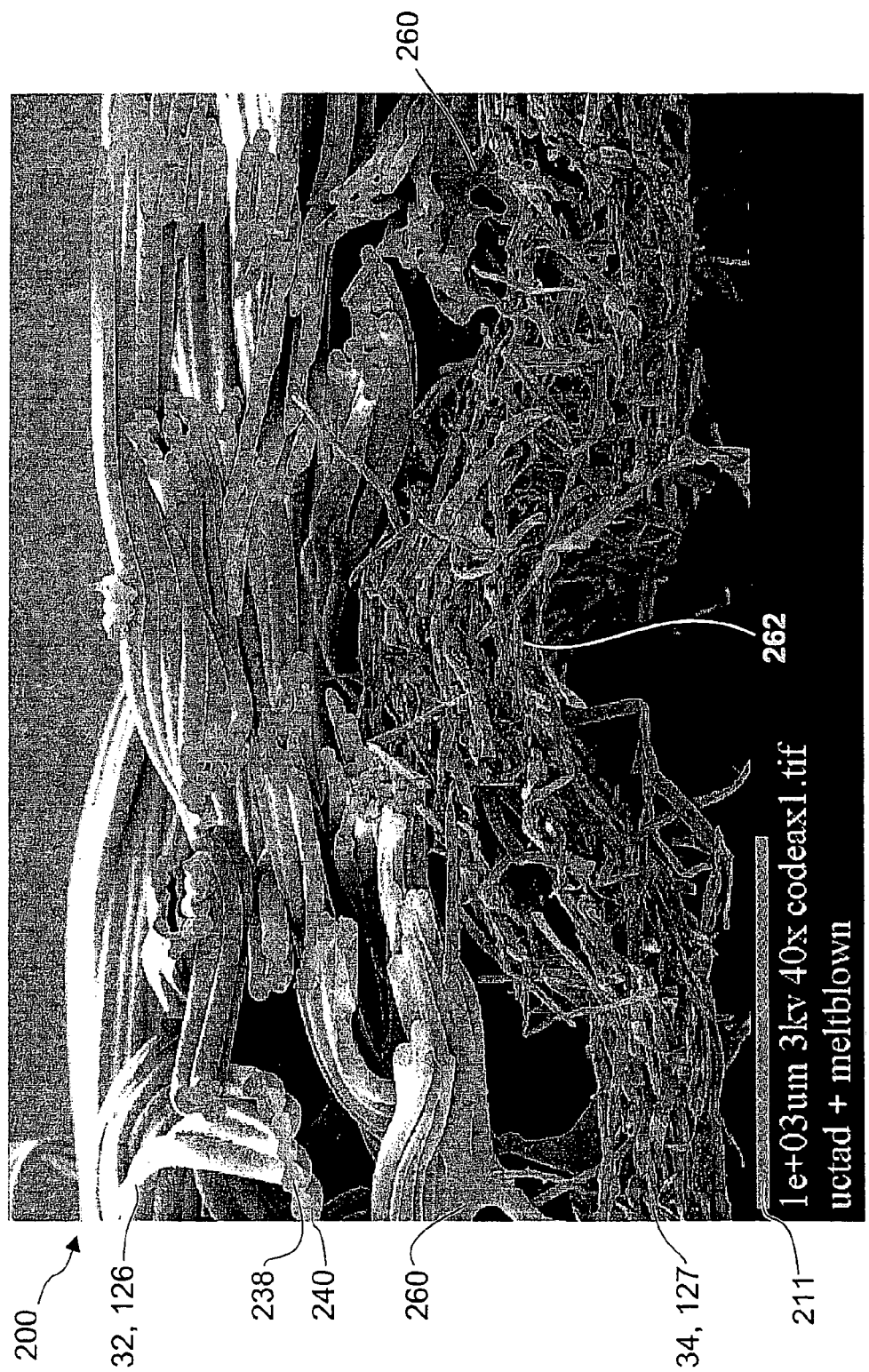
FIGS. 14A and 14B are cross-sectional micrographs of a meltblown-tissue laminate showing multifilamentary aggregates.
Figure 14B:
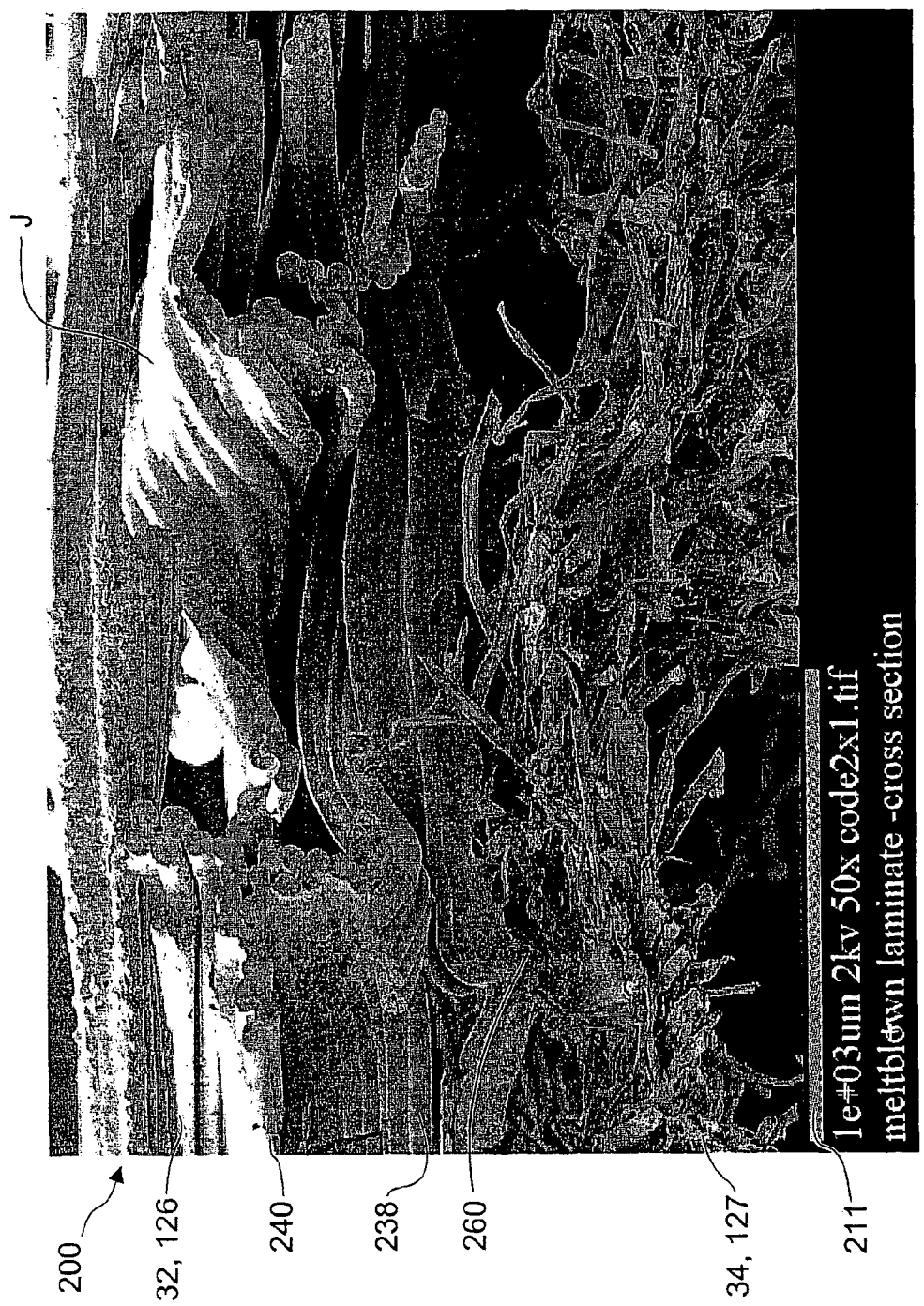

The holes of the meltblown die may be in one or more rows. When more than one row of holes is present in a die, the holes may be staggered or aligned, or distributed in other ways known in the art. The die holes may be any desired shape in order to form individual strands of a desired cross sectional shape. In one embodiment, the die holes may be circular such that the polymer strands, before aggregation to form the aggregate fibers of the present invention are substantially circular in cross section. Even after adhesion together, the substantially circular individual polymer strands may retain elements of their individual circular cross sections, as can be seen in FIGS. 14A and 14B.

Figure 11:
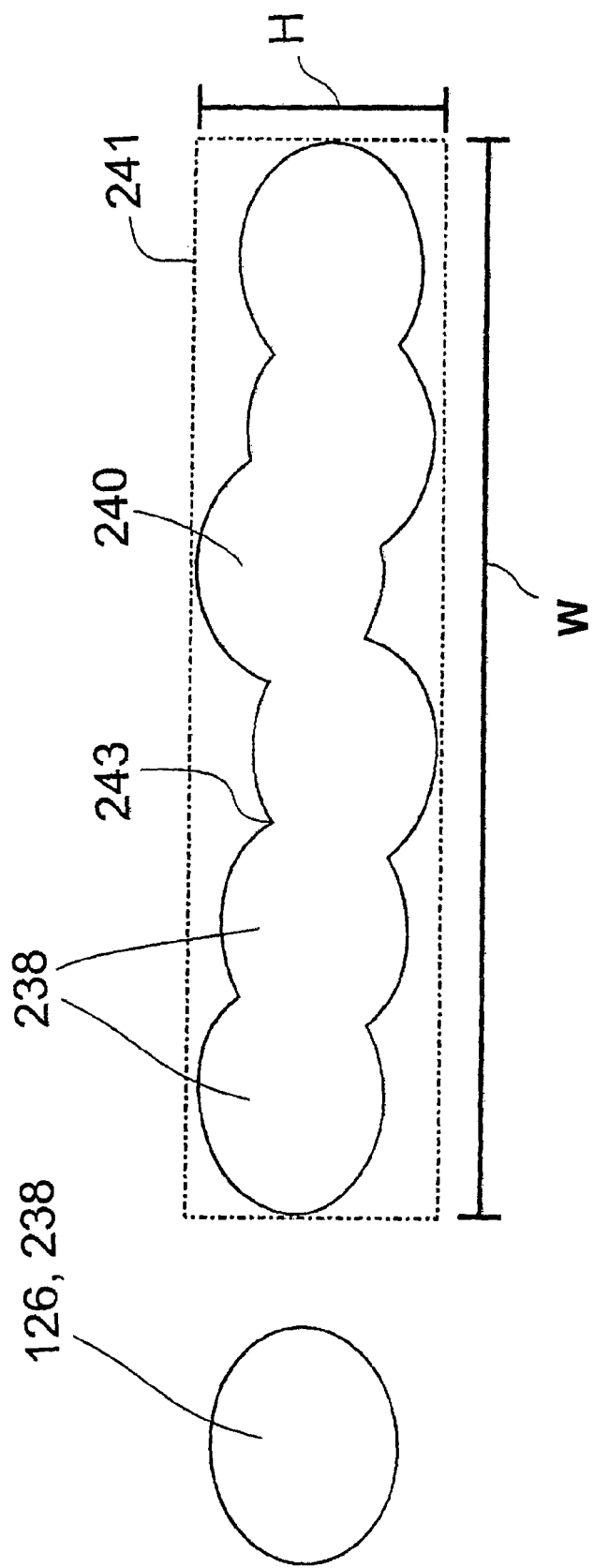
FIG. 11 depicts cross-sections of a fiber formed from a single polymeric strand and a multifilamentary aggregate formed from six coalesced strands.

Multifilamentary aggregates may be substantially ribbon-like in character, particularly when three or more strands from adjacent meltblown holes aligned in a line adhere to each other in a substantially parallel array (i.e., parallel to each other with the line formed by connecting the center points of consecutive strands being an approximately straight line). For example, FIG. 11 illustrates a multifilamentary aggregate formed of six individual polymer strands adhered in a substantially parallel array. The width of the multifilamentary aggregate may be nearly as great as the number of strands in the multifilamentary aggregates multiplied by the diameter of a single strand, though due to the fusion of portions of the joined strands and due to staggering of the strands in some cases, the width is generally a fraction of the product of the number of strands and the single strand diameter (or average single strand diameter). This fraction may be from about 0.2 to about 0.99, specifically from about 0.4 to about 0.97, more specifically from about 0.6 to about 0.95, and most specifically from about 0.7 to about 0.95. In one embodiment, the major axis of the non-circular multifilament aggregate fiber cross section can be greater than about 30 microns.

The number of strands in the multifilamentary aggregates may range from 2 to about 50, specifically from 2 to about 30, more specifically from 2 to about 20, and most specifically from about 3 to about 12. Multifilamentary aggregates may have a number-weighted average strand count of 3 or more, 4 or more, 5 or more, or 6 or more. A meltblown web comprising multifilamentary aggregates may have multifilamentary aggregates comprising 5% or greater of the mass of the web (such as multifilamentary aggregates with three strands or more comprising 5% or greater of the mass of the web). For example, the mass fraction of the web consisting of multifilamentary aggregates may be about 10% or greater, about 20% or greater, about 30% or greater, about 40% or greater, about 50% or greater, about 60% or greater, about 70% or greater, about 80% or greater, about 90% or greater, or substantially 100%. These ranges may apply to multifilamentary aggregates in general, or to multifilamentary aggregates having at least 3 strands, 4 strands, 5 strands, or 6 strands.

FIG. 11 depicts cross-sections of a polymeric fiber 126 formed from a single polymeric strand 238 in an operation such as meltblown, and for comparison depicts a cross-section of a multifilamentary aggregate 240 formed by the partial coalescence of six strands 238 to yield a ribbon-like structure. The region where two strands 238 are joined together may comprise a cusp 243.

The smallest rectangle 241 that may completely enclose the cross-section of the multifilamentary aggregate 240 has a width W and a height H. The width W is the width of the multifilamentary aggregate and the height H is the height of multifilamentary aggregate. The aspect ratio of the multifilamentary aggregate is the ratio W/H. The aspect ratio of multifilamentary aggregates in the present invention may be about 2 or greater, about 3 or greater, about 4 or greater, about 5 or greater, or about 6 or greater, such as from about 3 to about 12.

The strands 238 of the multifilamentary aggregate 240 may remain substantially parallel throughout the length of the fiber (a multifilamentary aggregate 240), or may persist for a distance and then split into two or more groups of smaller multifilamentary aggregates or individual strands 238. The strands 238 of the multifilamentary aggregate 240 may remain joined to one another along their sides for a distance of about 1 mm or greater, 5 mm or greater, 10 mm of greater, 20 mm or greater, or 50 mm or greater.

Figure 7:
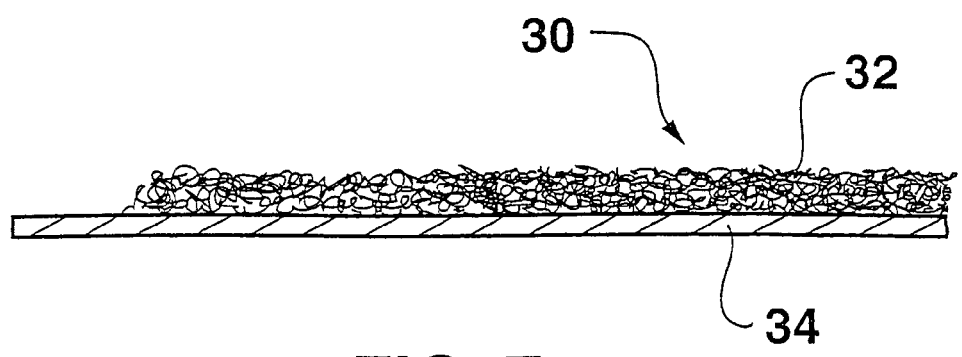
FIG. 7 is a cross-sectional view of one embodiment of the scrubbing pad of the present invention.

The forming belt 114 may be any suitable forming belt and, if desired, may provide texture to the meltblown layer, which may also affect the abrasiveness of the layer. For example, a high degree of surface texture in the meltblown layer may be achieved by forming the meltblown layer on a high dimension forming fabric, such as those available from the Lindsay Wire Company. In another embodiment, the abrasive layer may be formed directly on the fibrous absorbent web (not shown), such as a textured tissue web or other cellulosic web, which may be carried by a fabric. FIG. 8 is a cross section of one embodiment of the present invention with a highly textured meltblown layer 32 attached to a relatively flat absorbent layer 34. Alternatively, the forming belt 114 may be relatively flat and produce a flat meltblown layer 32, as is illustrated in FIG. 7.

The abrasive layer may have a suitable fiber basis weight and formation so as to provide good scrubbing characteristics to the composite pad structure while remaining flexible. For example, a meltblown web forming the abrasive layer may have a basis weight of greater than about 10 gsm. More specifically, the meltblown web may have a basis weight of between about 25 gsm and about 400 gsm, more specifically between about 30 gsm and about 200 gsm, and most specifically between about 40 gsm and 160 gsm The meltblown web may have a density ranging from any of about 0.02 grams/cubic centimeter (g/cc), 0.04 g/cc, 0.06 g/cc, 0.1 g/cc, 0.2 g/cc, 0.4 g/cc, 0.6 g/cc, and 0.8 g/cc to any of about 0.1 g/cc, 0.3 g/cc, 0.5 g/cc, and 1 g/cc (other values and ranges known in the art may also be within the scope of the present invention). In one embodiment, the abrasive layer may be formed such that when the pad is put under pressure, as when a surface is being scrubbed by contact with the abrasive layer, the surface may be substantially in contact with only the meltblown layer of the pad.

As previously discussed, the web may be formed with variations in thickness and basis weight across the web so as to produce a web with an uneven, more abrasive surface. Thickness variations across the surface of the web may be measured with a platen 0.6 inches in diameter that is pressed against the sample with a load of 7.3 psi (applied pressure of 50 kPa) as it resides on a solid surface, wherein the displacement of the platen relative to the solid surface indicates the local thickness of the sample. Repeated measurements at different locations on the sample may be used to obtain a distribution of local thickness measurements from which a standard deviation may be calculated. Abrasive layers of the present invention may have a standard deviation in this thickness measurement of at least about 0.2 mm, specifically at least about 0.6 mm, more specifically at least about 0.8 mm, an most specifically at least 1.0 mm. Expressed on a percentage basis, the standard deviation of basis weight for data points averaged over 5-mm square sections, may be about 5% or greater, more specifically about 10% or greater, more specifically still about 20% or greater, and most specifically about 30% or greater, such as from about 8% to about 60%, or from 12% to about 50%.

The abrasiveness of the abrasive layer may further be enhanced by the topography of the abrasive layer. For example, the abrasive layer may have a plurality of elevated and depressed regions due to nonuniform basis weight, non-uniform thickness, or due to the three-dimensional topography of an underlying fibrous web such as a textured wetlaid tissue web. The elevated and depressed regions may be spaced apart substantially periodically in at least one direction such as the machine direction or the cross direction with a characteristic wavelength of about 2 mm or greater, more specifically about 4 mm or greater, and having a characteristic height difference between the elevated and depressed regions of at least 0.3 mm or greater, more specifically about 0.6 mm or greater, more specifically still about 1 mm or greater, and most specifically about 1.2 mm ore greater.

In another embodiment, the abrasive layer may include a precursor web comprising a planar nonwoven substrate having a distribution of attenuated meltable thermoplastic fibers such as polypropylene fibers thereon. The precursor web may be heated to cause the thermoplastic fibers to shrink and form nodulated fiber remnants that impart an abrasive character to the resultant web material. The nodulated fiber remnants may comprise between about 10% and about 50% by weight of the total fiber content of the web and may have an average particle size of about 100 micrometers or greater. In addition to the fibers that are used to form nodulated remnants, the precursor web may contain cellulosic fibers and synthetic fibers having at least one component with a higher melting point than polypropylene to provide strength. The precursor web may be wet laid, air laid, or made by other methods. In one embodiment, the precursor web is substantially free of papermaking fibers. For example, the precursor may be a fibrous nylon web containing polypropylene fibers (e.g., a bonded carded web comprising both nylon fibers and polyroylene fibers).

The abrasive layer may also be apertured to improve fluid access to the absorbent layer of the article. Pin apertured meltblown webs, for example, may have increased abrasiveness due to the presence of the apertures.

Other materials may optionally be used as the abrasive layer of the present invention. For example, other materials used as abrasives in known commercial scrubbing products could be used, such as apertured nylon covers, nylon networks, and materials similar to those found in other abrasive products such as, for instance, SCOTCHBRITE pads of 3M Corp. (Minneapolis, Minn.).

In accordance with the present invention, an abrasive layer may be secured to one or more absorbent layers, such as that formed by a nonwoven paper web, to form a disposable scrubbing pad. When laminates according to the present invention are used for scrubbing or other demanding tasks, the durability of the product may be surprisingly high. At least part of the excellent performance may be due to a synergy in the material properties of the laminate, which may be superior to what one would expect based on the material properties of the individual components. For example, the tensile strength and stretch properties of an abrasive laminate comprising a meltblown layer bonded to a tissue web may have a substantially higher tensile strength than an unbonded combination of the same meltblown layer and tissue web together.

For some embodiments, the Strength Synergy may be about 1.05 or greater, more specifically about 1.1 or greater, more specifically still about 1.2 or greater, and most specifically about 1.5 or greater, with exemplary ranges of about 1.05 to about 3, about 1.1 to about 2.5, and about 1.5 to about 4. For some embodiments the Stretch Synergy may be about 1.1 or greater, more specifically about 1.3 or greater, more specifically still about 1.5 or greater, and most specifically about 1.8 or greater, with exemplary ranges of about 1.3 to about 3, about 1.5 to about 2.5, and about 1.5 to about 2. A laminate with a Stretch Synergy substantially greater than 1 may have but need not have a Strength Synergy substantially greater than 1. Likewise, a laminate with a Strength Synergy substantially greater than 1 may have but need not have a Stretch Synergy substantially greater than 1.

The paper web of the absorbent layer is generally a web that contains high levels of bulk. Further, the web may have a substantial amount of wet strength and wet resilience for use in wet environments. The paper web, if desired, may also be highly textured and have a three-dimensional structure, similar to the abrasive layer, as previously discussed. For instance, the paper web may have an Overall Surface Depth of greater than about 0.2 mm, and particularly greater than about 0.4 mm. In one embodiment, the paper web may be a commercial paper towel, such as a SCOTT® Towel or a VIVA® Towel, for instance. SCOTT® Towel, for example, has a wet:dry tensile strength ratio (ratio of the wet tensile strength to the dry tensile strength, taken in the cross direction) typically greater than 30% (e.g., one set of measurements gave a value of 38%), and VIVA® Towel has a wet:dry tensile strength ratio typically greater than 60% (e.g., one set of measurements gave a value of 71%). Wet:dry tensile strength ratios may also be greater than 10%, 20%, 40%, or 50%.

In one embodiment, the paper web may be a textured web which has been dried in a three-dimensional state such that the hydrogen bonds joining fibers were substantially formed while the web was not in a flat, planar state. For instance, the web may be formed while the web is on a highly textured through drying fabric or other three-dimensional substrate.

In general, the uncreped throughdried paper web may have a basis weight of greater than about 25 gsm. Specifically, the paper web may have a basis weight greater than about 40 gsm, more specifically greater than about 50 gsm. If desired, the web may include a wet strength agent and/or at least about five percent (5%) by weight of high-yield pulp fibers, such as thermomechanical pulp. In addition to high-yield pulp fibers, the web may contain papermaking fibers, such as softwood fibers and/or hardwood fibers. In one embodiment, the web is made entirely from high-yield pulp fibers and softwood fibers. The softwood fibers may be present in an amount from about 95% to about 70% by weight.

Figure 2:
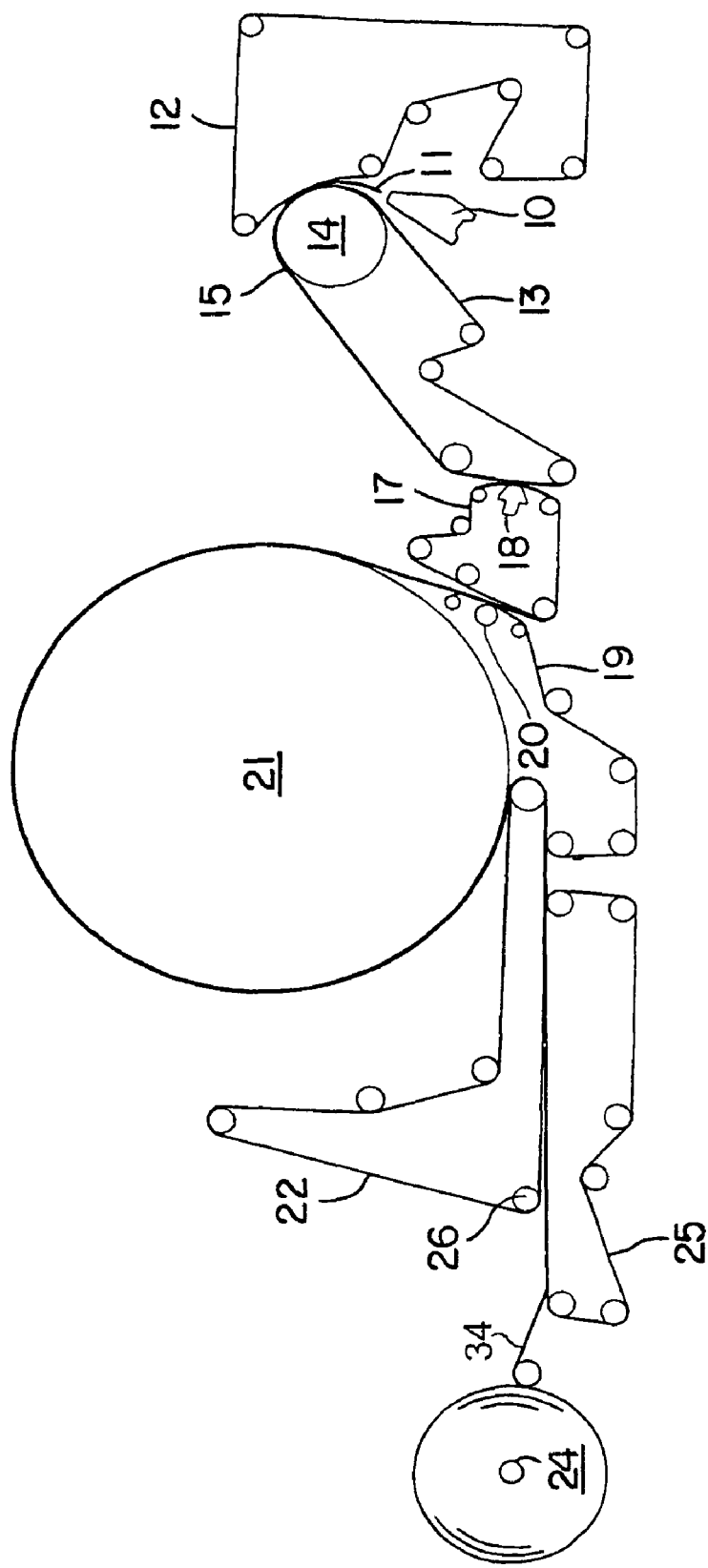
FIG. 2 is a diagram of one embodiment of a process for forming uncreped throughdried paper webs as may be used in the present invention.

Referring to FIG. 2, a method is shown for making throughdried paper sheets in accordance with this invention. (For simplicity, the various tensioning rolls schematically used to define the several fabric runs are shown but not numbered. It will be appreciated that variations from the apparatus and method illustrated in FIG. 2 may be made without departing from the scope of the invention). Shown is a twin wire former having a layered papermaking headbox 10 which injects or deposits a stream 11 of an aqueous suspension of papermaking fibers onto the forming fabric 13 which serves to support and carry the newly-formed wet web downstream in the process as the web is partially dewatered to a consistency of about 10 dry weight percent. Additional dewatering of the wet web may be carried out, such as by vacuum suction, while the wet web is supported by the forming fabric.

The wet web is then transferred from the forming fabric to a transfer fabric 17 traveling at a slower speed than the forming fabric in order to impart increased stretch into the web. This is commonly referred to as a "rush" transfer. Preferably the transfer fabric may have a void volume that is equal to or less than that of the forming fabric. The relative speed difference between the two fabrics may be from 0-60 percent, more specifically from about 10-40 percent. Transfer is preferably carried out with the assistance of a vacuum shoe 18 such that the forming fabric and the transfer fabric simultaneously converge and diverge at the leading edge of the vacuum slot.

The web is then transferred from the transfer fabric to the through drying fabric 19 with the aid of a vacuum transfer roll 20 or a vacuum transfer shoe, optionally again using a fixed gap transfer as previously described. The through drying fabric may be traveling at about the same speed or a different speed relative to the transfer fabric. If desired, the through drying fabric may be run at a slower speed to further enhance stretch. Transfer is preferably carried out with vacuum assistance to ensure deformation of the sheet to conform to the through drying fabric, thus yielding desired bulk and appearance.

In one embodiment, the through drying fabric contains high and long impression knuckles. For example, the through drying fabric may have about from about 5 to about 300 impression knuckles per square inch which are raised at least about 0.005 inches above the plane of the fabric. During drying, the web is macroscopically arranged to conform to the surface of the through drying fabric.

The level of vacuum used for the web transfers may be from about 3 to about 15 inches of mercury (75 to about 380 millimeters of mercury), preferably about 5 inches (125 millimeters) of mercury. The vacuum shoe (negative pressure) may be supplemented or replaced by the use of positive pressure from the opposite side of the web to blow the web onto the next fabric in addition to or as a replacement for sucking it onto the next fabric with vacuum. Also, a vacuum roll or rolls may be used to replace the vacuum shoe(s).

While supported by the through drying fabric, the web is final dried to a consistency of about 94 percent or greater by the through dryer 21 and thereafter transferred to a carrier fabric 22. The dried basesheet 34 is transported to the reel 24 using carrier fabric 22 and an optional carrier fabric 25. An optional pressurized turning roll 26 may be used to facilitate transfer of the web from carrier fabric 22 to fabric 25. Suitable carrier fabrics for this purpose are Albany International 84M or 94M and Asten 959 or 937, all of which are relatively smooth fabrics having a fine pattern. Although not shown, reel calendering or subsequent off-line calendering may be used to improve the smoothness and softness of the basesheet 34.

In order to improve wet resiliency, the paper web may contain wet resilient fibers, such as high-yield fibers as described above. High-yield fibers include, for instance, thermomechanical pulp, such as bleached chemithermomechanical pulp (BCT&P). The amount of high-yield pulp fibers present in the sheet may vary depending upon the particular application. For instance, the high-yield pulp fibers may be present in an amount of about 5 dry weight percent or greater, or specifically, about 15 dry weight percent or greater, and still more specifically from about 15 to about 30%. In other embodiments, the percentage of high-yield fibers in the web may be greater than any of the following: about 30%, about 50%, about 60%, about 70%, and about 90%.

In one embodiment, the uncreped throughdried web may be formed from multiple layers of a fiber furnish. Both strength and softness are achieved through layered webs, such as those produced from stratified headboxes wherein at least one layer delivered by the headbox comprises softwood fibers while another layer comprises hardwood or other fiber types. Layered structures produced by any means known in the art are within the scope of the present invention.

In one embodiment, for instance, a layered or stratified web is formed that contains high-yield pulp fibers in the center. Because high-yield pulp fibers are generally less soft than other paper making fibers, in some applications it is advantageous to incorporate them in to the middle of the paper web, such as by being placed in the center of a three-layered sheet. The outer layers of the sheet may then be made from softwood fibers and/or hardwood fibers.

In addition to containing high-yield fibers, the paper web may also contain a wet strength agent to improve wet resiliency. In fact, the combination of non-compressive drying to mold a three-dimensional paper web, coupled with wet strength additives and applying wet resilient fibers produces webs that maintain an unusually high bulk when wet, even after being compressed.

"Wet strength agents" are materials used to immobilize the bonds between the fibers in the wet state. Any material that when added to a paper web or sheet results in providing the sheet with either a wet geometric mean tensile strength/dry geometric tensile strength ratio in excess of 0.1 (the GM wet:dry tensile ratio), or a wet tensile strength/dry tensile ratio in the cross-direction in excess of 0.1 (the CD wet:dry ratio), will, for purposes of this invention, be termed a wet strength agent. Typically these materials are termed either as permanent wet strength agents or as "temporary" wet strength agents. For the purposes of differentiating permanent from temporary wet strength, permanent will be defined as those resins which, when incorporated into paper or tissue products, will provide a product that retains more than 50% of its original wet strength after exposure to water for a period of at least five minutes. Temporary wet strength agents are those which show less than 50% of their original wet strength after being saturated with water for five minutes. Both classes of material find application in the present invention, though permanent wet strength agents are believed to offer advantages when a pad of the present invention is to be used in a wet state for a prolonged period of time.

The amount of wet strength agent added to the pulp fibers may be at least about 0.1 dry weight percent, more specifically about 0.2 dry weight percent or greater, and still more specifically from about 0.1 to about 3 dry weight percent based on the dry weight of the fibers.

Permanent wet strength agents will provide a more or less long-term wet resilience to the structure. In contrast, the temporary wet strength agents would provide structures that had low density and high resilience, but would not provide a structure that had long-term resistance to exposure to water. The mechanism by which the wet strength is generated has little influence on the products of this invention as long as the essential property of generating water-resistant bonding at the fiber/fiber bond points is obtained.

Suitable permanent wet strength agents are typically water soluble, cationic oligomeric or polymeric resins that are capable of either crosslinking with themselves (homocrosslinking) or with the cellulose or other constituent of the wood fiber. The most widely used materials for this purpose are the class of polymer known as polyamide-polyamine-epichlorohydrin (PAE) type resins. Examples of these materials have been sold by Hercules, Inc., Wilmington, Del., as KYMENE 557H. Related materials are marketed by Henkel Chemical Co., Charlotte, N.C. and Georgia-Pacific Resins, Inc., Atlanta, Ga.

Polyamide-epichlorohydrin resins are also useful as bonding resins in this invention. Materials developed by Monsanto and marketed under the SANTO RES label are base-activated polyamide-epichlorohydrin resins that may be used in the present invention. Although they are not as commonly used in consumer products, polyethylenimine resins are also suitable for immobilizing the bond points in the products of this invention. Another class of permanent-type wet strength agents is exemplified by the aminoplast resins obtained by reaction of formaldehyde with melamine or urea.

Suitable temporary wet strength resins include, but are not limited to, those resins that have been developed by American Cyanamid and are marketed under the name PAREZ 631 NC (now available from Cytec Industries, West Paterson, N.J.). Other temporary wet strength agents that could find application in this invention include modified starches such as those available from National Starch and marketed as CO-BOND 1000. With respect to the classes and the types of wet strength resins listed, it should be understood that this listing is simply to provide examples and that this is neither meant to exclude other types of wet strength resins, nor is it meant to limit the scope of this invention.

Although wet strength agents as described above find particular advantage for use in connection with this invention, other types of bonding agents may also be used to provide the necessary wet resiliency. They may be applied at the wet end of the basesheet manufacturing process or applied by spraying or printing, etc. after the basesheet is formed or after it is dried.

Wet and dry tensile strengths of the absorbent layer can be measured with an universal testing machine device such as an Instron apparatus, and using a crosshead speed of 10 inches per minute with a 4-inch gage length and a 3-inch jaw width under Tappi standard conditions (samples conditioned 4 hours at 50% relative humidity and 73° F.), The dry tensile strength (taken either in the machine direction, the cross direction, or the geometric mean of the cross and machine directions) of the absorbent layer may be any of the following: about 500 g/3 in or greater, about 1000 g/3 in or greater, about 1500 g/3 in or greater, about 2000 g/3 in or greater, about 2500 g/3 in or greater, and about 3000 g/3 in or greater, such as from about 800 g/3 in to about 3000 g/3 in. The wet tensile strength (taken either in the machine direction, the cross direction, or the geometric mean of the cross and machine directions) of the absorbent layer may be any of the following: about 200 g/3 in or greater, about 500 g/3 in or greater, about 700 g/3 in or greater, about 800 g/3 in or greater, about 1000 g/3 in or greater, about 1500 g/3 in or greater, and about 2000 g/3 in or greater, such as from about 500 g/3 in to about 2500 g/3 in. Optionally, the absorbent layer of the present invention may include a multi-ply paper web, formed of two or more similar or different paper plies. It may be necessary, however, when forming a multi-ply absorbent layer, to provide a secure attachment between the plies to ensure good product performance under expected conditions. For example, an adhesive such as a hot melt adhesive or other known secure attachment means may be used to securely bind the separate plies together to form the absorbent layer of the scrubbing pad. Exemplary hot melt adhesives may include, without limitation, EVA (ethyl vinyl acetate) hot melts (e.g., copolymers of EVA), polyolefin hotmelts, polyamide hotmelts, pressure sensitive hot melts, styrene-isoprene-styrene (SIS) copolymers, styrene-butadiene-styrene (SBS) copolymers; ethylene ethyl acrylate copolymers (EEA); polyurethane reactive (PUR) hotmelts, and the like. In one embodiment, poly(alkyloxazoline) hotmelt compounds may be used. Isocyanates, epoxies, and other known adhesives may also be used. Specific examples of adhesives that may be suitable for some embodiments of the present invention include SUNOCO CP-1500 (an isotactic polypropylene) of Sunoco Chemicals (Philadelphia, Pa.); Eastman C10, Eastman C18, and Eastman P1010 (an amorphous polypropylene) of Eastman Chemical (Longview, Tex.); Findley H1296 and Findley H2525A of Elf Atochem North America (Philadelphia, Pa.); HM-0727, HM-2835Y, and 8151-XZP of H.B. Fuller Company (St. Paul, Minn.); and National Starch 34-1214 and others adhesives of the National Starch 34 series, made by National Starch and Chemical Corp. (Berkeley, Calif.).

When an adhesive compound (including but not limited to hot melt materials) is used to join tissue layers or to join a tissue layer to an abrasive web, the adhesive may be bondable to tissue at a temperature greater than 110° C., greater than 140° C., or greater than 155° C., such as from about 110° C. to about 200° C., or from 135° C. to 185° C. Hot melt adhesives generally comprise a polymer that imparts strength, a tackifying resin, a plasticizer, and optional components such as antioxidants. The adhesive compound may comprise a plasticizer, such as about 10% or greater plasticizer by weight, or less than about 30% plasticizer by weight, and more specifically less than about 25% plasticizer by weight. The tackifying resin likewise may likewise constitute about 10% by weight or greater of the mass of the adhesive, or less than about 25% by weight or less than about 15% by weight of the adhesive.

In one embodiment, the adhesive material may be a bicomponent fiber disposed between two adjacent layers such as a sheath-core bicomponent fiber. In addition to conventional bicomponent binder fibers, a fiber comprising two different varieties of polylactic acid may be used, for polylactic acid may have melting points ranging from about 120° C. to 175° C., allowing one form with a high melting point to serve as the core with a lower melting point variety serving as the sheath.

Latex materials may also serve as the adhesive joining two layers in the product of the present invention. Examples of latex adhesives include latex 8085 from Findley Adhesives. In some embodiments, however, the product is substantially latex free, or may have less than 10 weight percent latex, more specifically less than 5 weight percent latex, and most specifically about 2 weight percent latex or less. The latex referred to for any purpose in the present specification may be any latex, synthetic latex (e.g., a cationic or anionic latex), or natural latex or derivatives thereof.

When hot melt is used as a binder material to join adjacent layers of material, any known device for applying hot melt may be used, including melt blown devices, ink jet printer heads, spray nozzles, and pressurized orifices. Nozzles or other means may be used to apply the adhesive in a random or non-random pattern, such as a spiral pattern or other patterns. Nozzle diameter may be from about 0.1 mm to 2 mm, more specifically from about 0.2 mm to about 0.6 mm, or from 0.65 mm to 1.75 mm. Alternatively, nozzle diameter may be greater than 0.3 mm or greater than 0.6 mm.

Other systems for applying adhesives to bind layers include systems for applying a continuous stream of a hot melt adhesive in a distinctive pattern to a substrate. The method includes a gas-directing mechanism for forming a plurality of gas streams arranged to entrain the material streams to impart a swirling motion to each of the material streams as it moves toward the substrate. Semi-cycloidal patterns of the adhesive on the substrate are achieved while controlling a selected cross-directional positioning of one or more of the deposited patterns. In addition to semi-cycloidal patterns, any known pattern of hot melt may be applied as a continuous stream or in discontinuous pulses or sprays to a tissue web or nonwoven layer to form a laminate according to the present invention. Other exemplary patterns include omega-shaped deposits, sinusoidal deposits, straight lines, zigzag or saw-tooth lines, or top-hat patterns, or combinations thereof. The adhesives may also be applied in an open pattern network of filaments of adhesive as is generally known in the art.

In one embodiment, the absorbent layer of the present invention may include a paper web which is somewhat translucent when wet. In this embodiment, the paper web may have a low degree of opacity such that the absorbent layer has wet translucence, even in those embodiments wherein the dry paper web is opaque. If desired, however, the paper web may also exhibit some translucence when dry. For example, the wet opacity of the paper web may be less than about 98% (wet opacity being 100% for an opaque object and 0% for a transparent object). Specifically, the wet opacity of the paper web may be less than about 80%. More specifically, the wet opacity of the paper web may be less than about 60%.

If desired, the abrasive layer of the web may also be translucent. Due to the open structure of the abrasive layer, many of the open voids, or pores, in the web may extend across the entire depth of the layer, permitting light to pass through the layer unhindered and providing a degree of translucence to the abrasive layer. For example, more than about 30% of the surface area of the abrasive layer may include pores which extend across the axial depth of the layer. More specifically, more than about 50% of the superficial area of the abrasive layer may include pores extending across the layer depth, providing a high degree of translucence to the abrasive layer. Additionally, meltblown abrasive layers may be formed of a translucent polymer, increasing the translucence of the layer.

In those embodiments wherein the scrubbing pad is translucent, the user may visually ensure the cleaning effectiveness of the pad during scrubbing. For example, when scrubbing a colored spot, the user may see visual cues through the translucent pad as to when the spot is removed.

Figure 3:
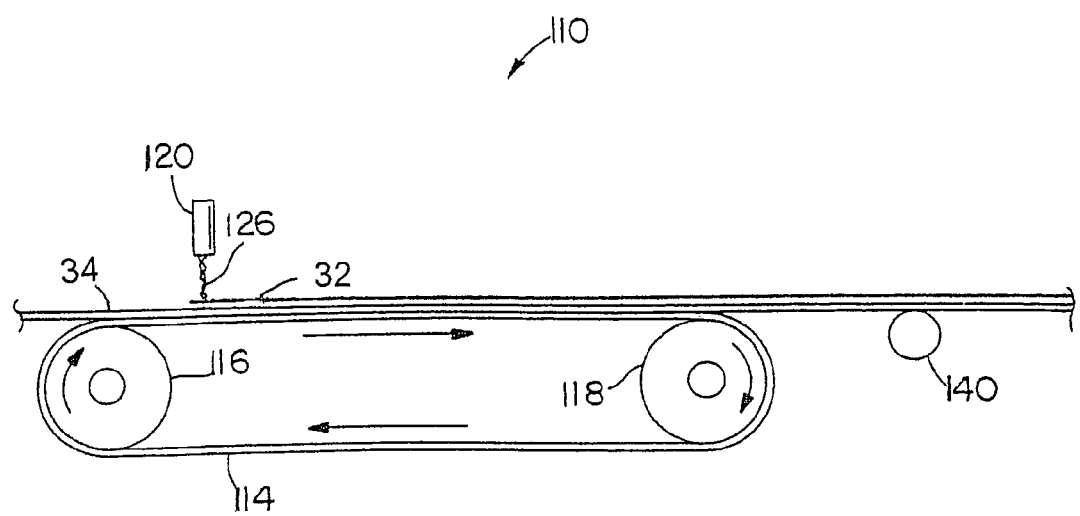
FIG. 3 is a schematic diagram of one embodiment of a process line for making the composite construction of the present invention.

The abrasive layer and the absorbent layer may be combined to form the scrubbing pad of the present invention by any suitable method. FIG. 3 illustrates one possible method of combining the layers wherein a meltblown layer 32 is formed directly on the paper web 34 at forming machine 110. In this embodiment, it may be desired to strengthen the bond between the layers beyond that which is formed when the polymer solidifies on the web. For example, an adhesive could be applied to the paper web 34 prior to deposition of the meltblown layer 32 on the paper web 34. The adhesive could then help to adhere the layers of the scrubbing pad together. Alternatively, after forming the meltblown layer 32 on the paper web 34, heat and optionally pressure could be applied to the composite product to fuse the layers together by a thermal bonding process. For instance, the composite product could be heated to a temperature to soften the fibers of the meltblown layer so as to develop a degree of penetration of a portion of the polymer into the facing surface of the paper web to create a strong, durable bond between the layers.

In an embodiment such as that illustrated in FIG. 3, it may be desirable to maintain an elevated temperature of the meltblown as it hits the tissue such that the meltblown material may bond with the fibers of the tissue layer. Without wishing to be bound by theory, it is believed that for good adhesion of the meltblown layer to the tissue during use, i.e., when the laminate is wet and subjected to scrubbing action, a portion of the meltblown material may be entangled with the fibers of the tissue web or may have penetrated within the porous matrix of the tissue web enough to prevent delamination of the meltblown layer from the tissue when the tissue is wefted. Achieving such results may be done through the use of heated air to carry the meltblown from the meltblown spinnerets to the tissue web, and/or the use of vacuum beneath the tissue web to pull a portion of the viscous meltblown material into the porous matrix of the tissue web. For example, vacuum may be applied in the formation zone to help pull the polymer fibers into the web for better bonding and possible entanglement with the cellulosic fibers. When vacuum is used, however, care should be taken to prevent excessive airflow in the vicinity of the tissue that could solidify the meltblown fibers prior to contacting the tissue. Narrow vacuum boxes, controlled air flow rates, pulsed vacuum, and other means, optionally coupled with radiative heating or other means of temperature control of the materials or fluids (e.g., air), may be used by those skilled in the art to optimize the bonding between the abrasive layer and the absorbent layer.

In one embodiment, the cellulosic web may be preheated or heated as the polymeric fibers are deposited thereon (whether by meltblown or spunbond formation directly on the cellulosic web, or by joining a previously formed layer of polymeric fibers to the cellulosic web). For example, an IR lamp or other heating source may be used to heat the cellulosic web in the vicinity where polymeric fibers contact the cellulosic web. By heating the surface of the cellulosic web, better bonding between the cellulosic web and the polymeric fibers may be achieved, especially when the fibers are newly formed, cooling meltblown fibers. A combination of heating and suction beneath the cellulosic web may be helpful, and either or both operations may further be combined with mechanical pressing (e.g., spot bonding, roll pressing, stamping, etc.) to further bond polymeric fibers to the cellulosic web.

Figure 4:
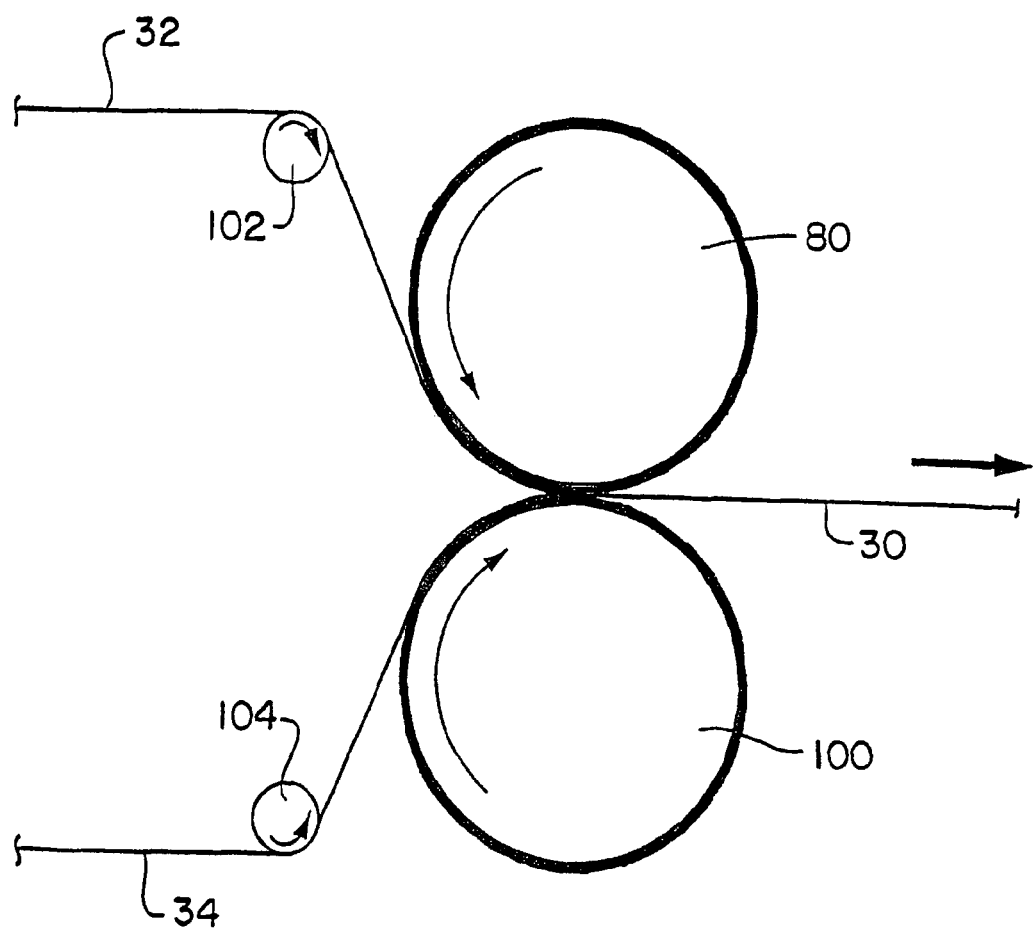
FIG. 4 is an embodiment of a process for combining the layers of the composite construction of the present invention.

Alternatively, the paper web and the abrasive layer of the scrubbing pad may be separately formed, and then attached later, after formation. For example, as illustrated in FIG. 4, paper web 34 and meltblown web 32 may be guided together with guide rolls 102 and 104 and brought in contact between roll 100 and roll 80.

When a thermoplastic-containing abrasive layer has been previously formed and is no longer hot enough to readily bond to the absorbent layer, heat may be applied to cause joining of the abrasive layer with the absorbent layer as the two are brought into contact or after the two are brought into contact. For example, the absorbent layer may be preheated sufficiently to cause partial fusion of the abrasive layer as it touches the paper web, optionally with the assistance of mechanical compression. Alternatively, heat may be applied to the tissue and/or the abrasive layer after the two have been brought into contact to cause at least partial fusion of the meltblown layer with the absorbent layer. The heat may be applied conductively, such as by contacting the tissue layer against a heated surface that heats the tissue sufficiently to cause fusion of parts of the abrasive layer in contact with the tissue, preferably without heating the polymeric layer too much. Radiative heating, radio frequency heating (e.g., microwave heating), inductive heating, convective heating with heated air, steam, or other fluids, and the like may be applied to heat the tissue layer and the polymeric layer while in contact with each other, or to independently heat either layer prior to being joined to the other.

Ultrasonic bonding and pattern bonding may also be applied. For example, a rotary horn activated by ultrasonic energy may compress parts of the abrasive layer against the tissue web and cause fusion of parts of the polymeric layer due to a welding effect driven by the ultrasound. Likewise, a patterned heated plate or drum may compress portions of the abrasive layer in contact with the tissue to cause the compressed portions such that good attachment of the compressed portions to the tissue web is achieved.

Figure 5:
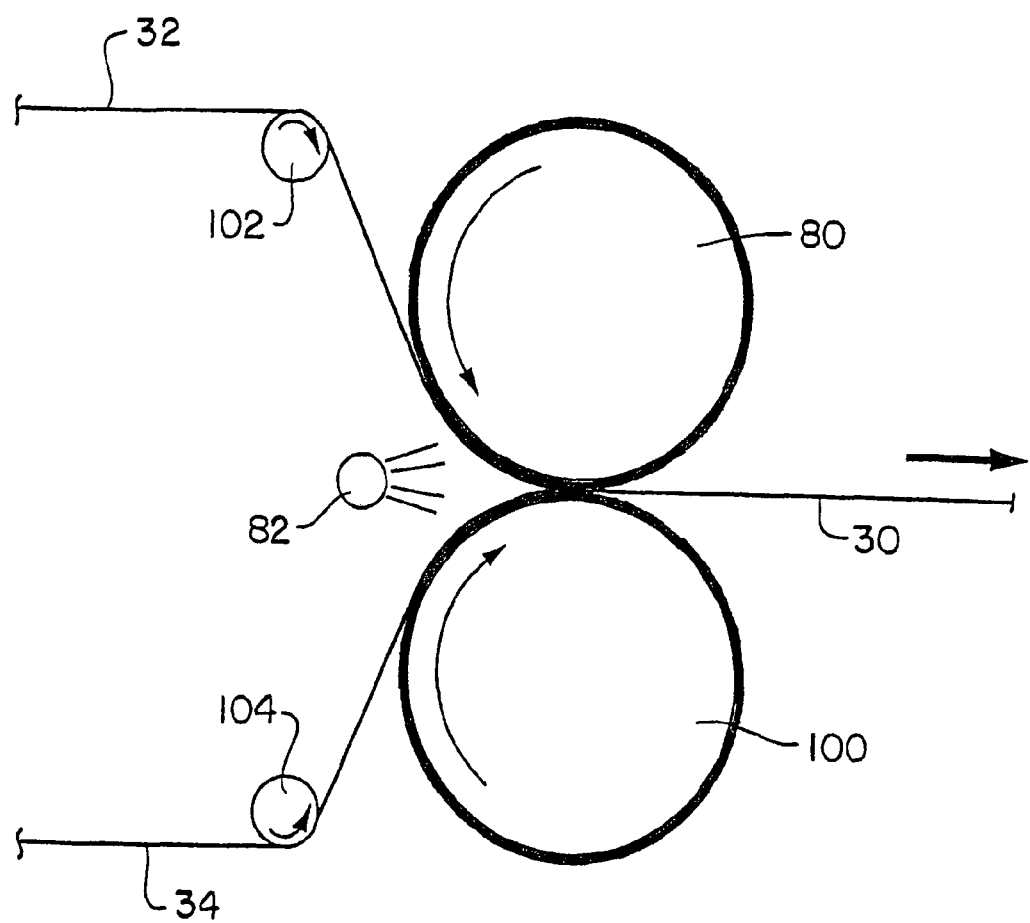
FIG. 5 is another embodiment of a process for combining the layers of the composite construction of the present invention.

In an alternative embodiment, as shown in FIG. 5, the layers of the present invention may be brought together after formation, and an adhesive 82 may be applied to one or both layers of the pad prior to contact which may bond the layers of the pad together. In this embodiment, the layers may be attached through utilization of the adhesive alone, or optionally, heat and/or pressure may also be applied after the layers are brought together, to further enhance the bond between the layers. An adhesive may be applied to one or both of the layers of the scrubbing pad by any method. For example, in addition to a spray method, as illustrated in FIG. 5, an adhesive may be applied through any known, printing, coating, or other suitable transfer method. In addition, the adhesive may be any suitable adhesive which may firmly bond the layers of the pad together. The basis weight of the adhesive may be about 5 gsm or greater, such as from about 10 gsm to about 50 gsm, more specifically about 15 gsm to about 40 gsm. Alternatively, the basis weight of the added adhesive may be less than about 5 gsm.

The most suitable method of joining the layers of the scrubbing pad together may depend at least in part on the textures of the layers. As previously discussed, the meltblown layer and/or the paper web may be formed on relatively smooth forming surfaces and therefore display little three dimensional surface texture, or alternatively, one or both of the layers may be formed on highly texturized surfaces. For instance, FIG. 7 illustrates the cross-section of a scrubbing pad 30 formed of an abrasive layer 32 joined to a paper web 34, both of which are have relatively smooth surface textures. In such an embodiment, any of a number of methods could be used to join the layers together including methods involving adhesives, heat, pressure, or any combination thereof.

In an alternative embodiment, one or both of the layers may exhibit a high degree of surface texture. For example, as illustrated in FIG. 8, the meltblown layer 32 may be a highly textured meltblown layer and the paper web 34 may be relatively flat. In such an embodiment, a spot bonding method may be preferred to firmly bond the layers at those points where the meltblown layer 32 and the paper web 34 contact while maintaining the texture of the meltblown layer 32. Any of a variety of known spot bonding methods may be used, including those methods involving various adhesives and/or heat, without subjecting the composite structure to excessive pressure which could damage the texture of the meltblown layer 34. Of course, the scrubbing pad may optionally be formed of a highly textured paper web bonded to a relatively flat abrasive layer. Alternatively, both of the layers may be highly textured, and may have the same or different texturing patterns.

A variety of alternative methods may also be utilized to join two or more tissue layers, or a tissue layer to an abrasive layer. These methods includes, but are not limited to:

Adding non-tacky binder fibers between two adjacent layers, and subsequently applying heat (e.g., infrared radiation, heated air, contact with heated surfaces, inductive heating, microwave radiation, and the like) to cause at least partial fusion of the binder fibers to join the adjacent layers. The layers may be substantially uncompressed or may be subject to mechanical compression during or after heating while the binder fibers are still hot enough to be capable of bonding. When mechanical compression is used to facilitate bonding, the applied mechanical loads less than any of the following: 100 kPa, 50 kPa, 25 kPa, 10 kPa, 5 kPa, 1 kPa, or loads between about 1 kPa and 20 kPa, or between 10 kPa and 50 kPa).

Applying tacky hot melt material to one or more layers prior to contact with an adjacent layer. The hot melt may be in the form of meltblown fibers entrained in hot air to prevent premature quenching, or sufficiently heated hot melt material that may remain tacky after it contacts the layer to which it is applied, after which a second layer is brought into contact with the hot melt material on the first layer to cause bonding of the two layers. One possible method for laminating two layers includes through-injecting meltblown fibers from a meltblown head between two layers supported on opposing suction rolls which do not join the layers together, followed by a calendar roll or embossing roll which does press the layers together to cause bonding.

Extrusion of a thermoplastic or tacky polymeric foam between the two layers, such as a molten foam precursor with blowing agents that expand after extrusion to create a porous structure in the foam. The foam may be open celled foam with small enough pore sizes (e.g., less than 1 mm, such as from about 10 microns to 50 microns) to cause generation of foam when a wipe comprising the foam is used with soapy water or water containing other foamable cleaning agents, wherein squeezing the product while wet with cleaning solution generates foam as the solution is forced through the absorbent layer, as is often case when using conventional sponges. However, only a thin layer of foam may be needed to achieve both the binding effect and the foam-generating effect when used with certain cleaning solutions. The foam layer may have a thickness of less than 8 mm, such as from about 0.5 mm to 6 mm, or from 1 mm to 3 mm, and may have a basis weight of less than 10 gsm or less than 5 gsm, though higher basis weights may be employed, such as 10 gsm or greater, 20 gsm or greater, 30 gsm or greater, or about 40 gsm or greater, with exemplary ranges of from about 15 gsm to about 60 gsm or from about 20 gsm to about 60 gsm. In one embodiment, a foam layer may be on both sides of the absorbent layer, i.e. between the two primary layers of the scrubbing pad and on the outer surface of the absorbent layer.

Mechanical bonding may also be used, including needling or crimping of adjacent layers to create bonding by mechanical entanglement of fibers. However, some degree of adhesive bonding may still be needed for best results.

Applying binder materials other than thermoplastic binders to join the adjacent layers. Such binder materials may include pressure sensitive adhesives; curable adhesives such as glues; salt sensitive binders that are effective in the presence of a salt-containing solution.

The composite scrubbing pad of the present invention will include both an abrasive layer and an absorbent layer which are usually attached directly to each other, though in certain embodiments an additional layer may be included between the two primary layers. FIG. 7 illustrates the cross-section of one embodiment of a scrubbing pad 30 including an abrasive layer 3 and an absorbent layer 34, both of which have relatively smooth surface textures. In such an embodiment, any of a number of methods may be used to join the layers together including methods involving adhesives, heat pressure, or any combination thereof.

In an alternative embodiment, one or both of the layers may exhibit a high degree of surface texture. For example, as illustrated in FIG. 8, the abrasive layer 32 may be highly textured at the scrubbing surface and the absorbent layer 34 may be relatively flat. In such an embodiment, the method of joining the two layers is limited only in that it should not destroy the surface texture of the layer.

Figure 9:
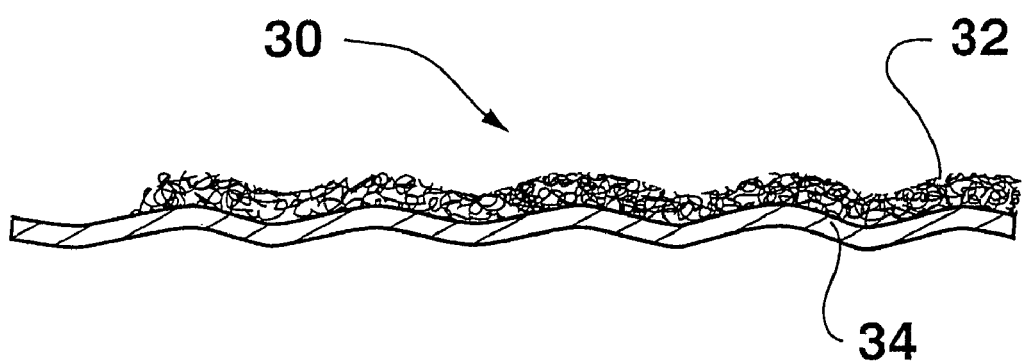
FIG. 9 is a cross-sectional view of another embodiment of the scrubbing pad of the present invention.

FIG. 9 illustrates another embodiment of the scrubbing pad wherein both the absorbent layer 34 and the abrasive layer 32 display a high degree of three-dimensional texture. In the embodiment illustrated in FIG. 9, both layers have the same, nested texturing pattern. Alternatively, the layers may have different texturing patterns. As with the other embodiments, the only limitation in the method of joining the two layers together is that the desired surface texture of a layer not be destroyed in the attachment method. For example, when the two layers display different, overlapping texturing patterns, a spot bonding method may be preferred.

In an embodiment such as that illustrated in FIG. 9, the surface texture in one of the layers may be formed when the two layers are attached together. For example, the absorbent layer 34 may be a highly textured cellulosic fibrous web, such as an uncreped through dried paper web, and the abrasive layer 32 may be formed on or bonded to the absorbent layer and may conform to the texturing pattern of the absorbent layer at the time the two layers are combined. For instance, heat may be applied to the composite article as a part of the bonding process. This may cause the abrasive layer to soften and take on the texturing pattern of the absorbent layer, and the abrasive layer may continue to display the same texture pattern as the absorbent layer after the layers are attached together.

Increasing the surface texture of the abrasive layer in such a manner may increase the overall abrasiveness of the composite product. Thus, a synergy may exist between the two layers, and the overall abrasiveness of the composite scrubbing article at the abrasive surface may be greater than the abrasiveness of either layer prior to the attachment.

Moreover, in those embodiments wherein the absorbent layer of the web can exhibit a high degree of wet resilience, the added texture of the abrasive layer can endure, even after the scrubbing article has been saturated with water or some other cleaning fluid.

The composite scrubbing pad may exhibit a synergy between the layers in other ways as well. For example, the fibers of the two layers may be physically entangled or fused together in the attachment process, such that there is a fairly strong bond between the layers. In such an embodiment, the tensile strength of the composite product may be greater than the sum of the tensile strengths of the two layers prior to attachment, or, alternatively, greater than the tensile strength measured when the two layers are coextensively disposed adjacent to one another but not bonded together, and tested together for combined tensile strength.

The composite scrubbing pads of the present invention may exhibit desired cleaning characteristics, such as good abrasiveness and wet resiliency, for example while requiring less raw material and having good flexibility for easy handling. For example, in one embodiment, the scrubbing pads of the present invention may have an overall basis weight of less than 150 gsm. The scrubbing pads of the present invention may also be less than about 7 mm in thickness. More particularly, the scrubbing pads may be less than about 4 mm in thickness. The abrasive layer may have a thickness of about 0.5 mm or greater, as measured with the equipment used in the Thickness Variation test, or the thickness may be any of the following values: about 1 mm or greater, about 2 mm or greater, about 3 mm or greater, about 4 mm or greater, about 5 mm or greater, such as from about 0.5 mm to 10 mm, or from about 1 mm to 5 mm. Alternatively, the thickness of the abrasive layer can be less than 3 mm.

Additional layers may also be included in the scrubbing pad of the present invention, if desired. For instance, the scrubbing pad of the present invention may include two abrasive layers on opposite surfaces of the pad, both attached to one or more absorbent layers which are sandwiched in the middle of the pad.

In one embodiment of the present invention, a barrier layer formed of a barrier material or sizing agent may be included in or on either side of the absorbent layer. This may be useful when small quantities of a cleaning compound are used (e.g., a furniture polish, a window washer, or a harsh agent such as an oven cleaning agent), wherein wetting the entire pad is undesirable. For example, a barrier layer may be between the absorbent layer and the abrasive layer, or, alternatively, may be on the outer surface of the absorbent layer. In one embodiment, the barrier material may be removable. For example, in one embodiment of the present invention a barrier layer may include a water impervious barrier material on the outer surface of the absorbent layer that may allow the hand to remain dry during use.

The barrier material, in one embodiment, may be a hydrophobic film. It should be understood, however, that any suitable water impermeable material may be used. For instance, suitable moisture barrier materials include films, wovens, nonwovens, laminates, or the like. The barrier material may be a liquid impermeable web or sheet of plastic film such as polyethylene, polypropylene, polyvinylchloride or similar material. Moreover, the barrier material may occupy only a portion of the surface area of the paper web or may substantially cover an entire surface of the paper web.

In addition to the paper web and the abrasive layer, the scrubbing pad of the present invention may also contain additional materials within either layer as well as additional functional layers or components. For example, a portion of the pad may provide a soap, detergent, waxes or polishing agents such as furniture polish, metal cleaners, leather and vinyl cleaning or restoration agents, stain removers for rubbing on clothing, laundry pre-treatment solutions, enzymatic solutions for improved cleaning or fabric conditioning, odor control agents such as the active ingredients of Fabreze® odor removing compound (Procter and Gamble, Cincinnati, Ohio), water proofing compounds, shoe polish, dyes, glass cleaner, antimicrobial compounds, wound care agents, lotions and emollients, and the like. Other possible additives that may be added to the scrubbing pad include buffering agents, antimicrobials, skin wellness agents such as lotions, medications (i.e. anti-acne medications), or hydrophobic skin barriers, odor control agents, surfactants, mineral oil, glycerin and the like.

The active ingredients may be present in a solution on the wipe as it is packaged or in a solution that is added to the wipe prior to use. Active ingredients can also be present as a dry powder attached to fibers in the wipe, or as a dry compound impregnated in the fibers or in void spaces between the fibers of the wipe, or encapsulated in water-soluble capsules, encapsulated in waxy or lipid-rich shells to permit escape upon mechanical compression or shear, or in a container attached to or cooperatively associated with the wipe that may be opened during use or prior to use.

Application of the additives may be by any suitable method, such as:

Direct addition to a fibrous slurry prior to formation of the paper web.

A spray applied to a layer or the composite pad. For example, spray nozzles may be mounted over the moving paper web or the meltblown web to apply a desired dose of a solution to the layer that may be moist or substantially dry.

Printing onto the web, such as by offset printing, gravure printing, flexographic printing, ink jet printing, digital printing of any kind, and the like.

Coating onto one or both surfaces of a layer, such as blade coating, air knife coating, short dwell coating, cast coating, and the like.

Extrusion from a die head of an agent in the form of a solution, a dispersion or emulsion, or a viscous mixture such as one comprising a wax, softener, debonder, oil, polysiloxane compound or other silicone agent, an emollient, a lotion, an ink, or other additive.

Application to individualized fibers. For example, prior to deposit on the forming surface, the meltblown fibers may be entrained in an air stream combined with an aerosol or spray of the compound to treat individual fibers prior to incorporation into the meltblown layer.

Impregnation of the wet or dry paper web with a solution or slurry, wherein the compound penetrates a significant distance into the thickness of the web, such as more than 20% of the thickness of the web, more specifically at least about 30% and most specifically at least about 70% of the thickness of the web, including completely penetrating the web throughout the full extent of its thickness.

Foam application of an additive to a layer (e.g., foam finishing), either for topical application or for impregnation of the additive into the paper web under the influence of a pressure differential (e.g., vacuum-assisted impregnation of the foam).

Padding of a chemical agent in solution into an existing fibrous web.

Roller fluid feeding of the additive for application to the web.

Application of the agent by spray or other means to a moving belt or fabric which in turn contacts the layer to apply the chemical to the layer.

The application level of an additive may generally be from about 0.1 weight % to about 10 weight % solids relative to the dry mass of the layer to which it is applied. More specifically, the application level may be from about 0.1% to about 4%, or from about 0.2% to about 2%. Higher and lower application levels are also within the scope of the present invention. In some embodiments, for example, application levels of from 5% to 50% or higher may be considered.

Printing, coating, spraying, or otherwise transferring a chemical agent or compound on one or more sides of the pad, or of any layer or material in the pad may be done uniformly or heterogeneously, as in a pattern, using any known agent or compound (e.g., a silicone agent, a quaternary ammonium compound, an emollient, a skin-wellness agent such as aloe vera extract, an antimicrobial agent such as citric acid, an odor-control agent, a pH control agent, a sizing agent; a polysaccharide derivative, a wet strength agent, a dye, a fragrance, and the like). Any known method may be used for application of such additives.

In one embodiment, the scrubbing pad may be provided and the desired additive compound may be held in a separate container or dispenser. In this embodiment, the additive may be applied to the pad by the consumer in the desired amount at the time of use.

Figure 6:
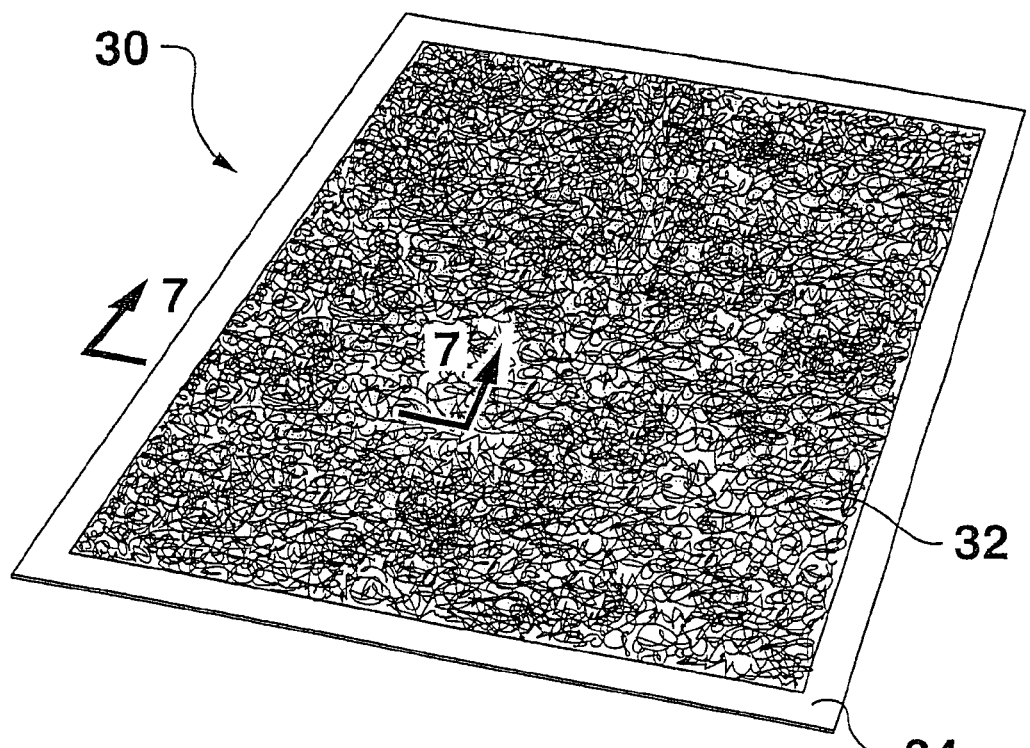
FIG. 6 is a perspective view of one embodiment of a scrubbing pad of the present invention.

The layers of the scrubbing pad of the present invention may be combined to form a product of any desired size or shape and suited for any particular purpose. For example, FIG. 6 illustrates one embodiment of the present invention wherein a meltblown layer 32 substantially covers the surface of a paper web 34 to form a rectangular scrubbing pad such as may be held in the hand during use. In such an embodiment, the scrubbing pad may be reversed to provide both abrasive and non-abrasive type cleaning.

Alternatively, the meltblown layer may only partially cover the surface of the paper web, creating a single scrubbing surface on a scrubbing pad which may have both a coarse abrasive region and a smooth, absorbent region. Thus, the user may control the abrasiveness of the cleaning action during cleaning by, for instance, adjusting the angle of the pad or the region of the pad to which pressure is applied and may have different levels of scrubbing action on the same side of a single scrubbing pad.

The scrubbing pads of the present invention may be provided in any shape or orientation. For example, the pads may be square, circular, rectangular, or the like. They may be formed into mitts, such as hand-shaped mitts for scrubbing with the hand or foot-shaped covers for the feet. The pads may be packaged and sold in either a wet or dry form, and may optionally be shaped to be attached to a handle or gripper to form a convenient cleaning tool such as a wiper with a squeegee, a mop, a toilet cleaning tool, a dishwashing wipe, a scouring pad, a scrubbing tool for cleaning metal, ceramic, or concrete surfaces, a polishing or sanding tool, and the like.

Figure 10:
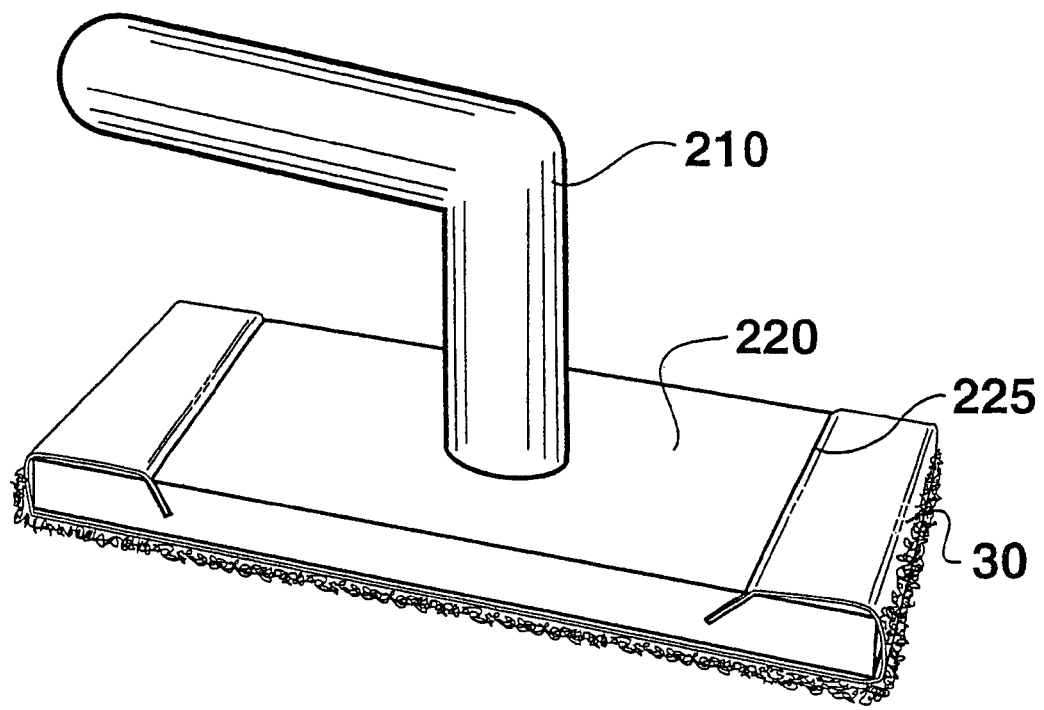
FIG. 10 is a perspective view of one embodiment of a cleaning tool of the present invention wherein the scrubbing pad is held on a rigid gripping device.

For example, one embodiment of the invention, as illustrated in FIG. 10, shows the scrubbing pad of the present invention 30 shaped so as to be attachable to a base 220 of a rigid gripping device. The base 220 is attached to a handle 210 shaped to be comfortably held by a user, such as is found on a mop or smaller, hand-held scrubbing device. The scrubbing pad 30 may be held onto the base 220 by any method that can firmly hold the pad, yet, in one embodiment, can release the pad for replacement quickly and easily. For example, the pad 30 may be held onto base 220 at gripping slots 225. In another embodiment, the scrubbing pad 30 may be permanently attached to the base 220, and the entire cleaning tool 10 can be disposable.

The cleaning tool of the present invention can be used to clean or scrub many different surfaces, and can be designed for a specific use. For example, the cleaning tool can have a handle including a long wand and be used to clean floors, walls, ceilings, ceiling fans, light fixtures, windows and the like. In certain embodiments, such as when the cleaning tool is used to clean windows, for example, the cleaning tool can have a squeegee attachment, such as a rubber material squeegee attached to a surface as is generally known in the art. In other embodiments, the abrasive layer on the cleaning tool can be used for sanding or polishing a surface to be cleaned.

Test Methods

"Gurley Stiffness" refers to measurements of the stiffness of a web made with a Gurley™ Bending Resistance Tester, Model 4171-D (Precision Instruments, Troy, N.Y.). Tests are made with samples conditioned for at least four hours under Tappi conditions (50% relative humidity, 23° C.). A suitable method for determining Gurley stiffness values follows that set forth in TAPPI Standard Test T 543 OM-94, but modified to use sample lengths of 1.5 inches instead of 2 inches, and sample widths of 1.0 inches instead of 2 inches. Using a 1-inch wide sample that is 1.5 inches long, the formula to convert the Gurley reading to Gurley Stiffness with units of milligrams is:

Stiffness=Gurley reading*11.1 mg*(inches from center/1 inch)*(weight/5 g).

Thus, a Gurley reading of 8 taken when a 25 g weight was used 2 inches from center would be converted to a stiffness of 8*11.1 mg*2*(25 g/5 g)=888 mg.

The abrasive layers of the present invention and/or the laminated products of the present invention may have a Gurley stiffness of about 2500 mg or less, specifically about 1500 mg or less, more specifically about 800 mg or less, more specifically still about 400 mg or less, and most specifically about 200 mg or less, such as from about 40 mg to 350 mg or from about 80 mg to about 400 mg. These stiffness values may be the maximum value obtainable for measurements in any direction of the web or product (the maximum stiffness), or in the machine direction or cross-direction (MD or CD stiffness, respectively).

"Thickness Variation" refers to the nonuniformity of the thickness of an abrasive layer. The measurement involves taking spaced apart measurements of sample thickness with a TMI Model 49-62 Precision Micrometer (Testing Machines, Inc., Amityville, N.Y.) having a 0.63-inch diameter foot that applies a pressure of 7.3 psi (50 kPa). Testing is done after the instrument has warmed up for one hour and is done under Tappi standard conditions. Strips of the material to be tested are measured at spots on one-inch centers to provide multiple measurements per strip. At least 3 strips of material are used, and at least 9 readings per strip are taken. The thickness variation is the standard deviation of the thickness results, reported in millimeters.

"Wet Opacity" and "Dry Opacity" refer to measurements of the optical opacity of a sample in the dry or wet state, respectively, using a Technibrite™ Micro TB-1C device (Technidyne Corp., New Albany, Ind.), according to manufacturer directions for ISO opacity, with testing done for samples with the abrasive layer up. Testing is done under Tappi standard conditions. Wet Opacity is the measurement of opacity of a sample that has been wetted by immersing and soaking the sample for one minute deionized water at 23° C. The sample is then removed from the water, holding it by one corner to allow drain excess water to drain for three seconds. The sample is then placed on dry blotter paper for 20 seconds, then turned over and placed on another dry blotter and allowed to sit for another 20 seconds, then immediately tested for opacity.

In some embodiments, the articles of the present invention have a relatively low Wet Opacity, such that the user can observe the presence of spots or other objects through the wetted article during cleaning. Conventional sponges and other cleaning articles tend to be substantially opaque, but the translucent nature of the articles in some embodiments of the present invention may be of use in some cleaning situations. Thus, the articles of the present invention may have a Wet Opacity less than about any of the following: 95%, 90%, 80%, 70%, 60%, 50%, and 40%, with exemplary ranges of from 30% to 95%, or from 50% to 90%, or from 40% to 80%. Dry Opacity may be greater than 96%, such as about 100%, or may be less than 96%, such as from 80% to about 95%, or from 50% to 90%, or from 40% to 85%.

"Overall Surface Depth". A three-dimensional basesheet or web is a sheet with significant variation in surface elevation due to the intrinsic structure of the sheet itself. As used herein, this elevation difference is expressed as the "Overall Surface Depth." The basesheets useful for this invention may possess three-dimensionality and may have an Overall Surface Depth of about 0.1 mm. or greater, more specifically about 0.3 mm. or greater, still more specifically about 0.4 mm. or greater, still more specifically about 0.5 mm. or greater, and still more specifically from about 0.4 to about 0.8 mm. However, products made substantially flat tissue are within the scope of certain embodiments of the present invention as well.

The three-dimensional structure of a largely planar sheet may be described in terms of its surface topography. Rather than presenting a nearly flat surface, as is typical of conventional paper, three-dimensional sheets useful in producing the present invention have significant topographical structures that, in one embodiment, may derive in part from the use of sculptured through-drying fabrics such as those taught by Chiu et al. in U.S. Pat. No. 5,429,686, previously incorporated by reference. The resulting basesheet surface topography typically comprises a regular repeating unit cell that is typically a parallelogram with sides between about 2 and 20 mm in length. For wetlaid materials, these three-dimensional basesheet structures be created by molding the moist sheet or may be created prior to drying, rather than by creping or embossing or other operations after the sheet has been dried. In this manner, the three-dimensional basesheet structure is more likely to be well retained upon wetting, helping to provide high wet resiliency and to promote good in-plane permeability. For air-laid basesheets, the structure may be imparted by thermal embossing of a fibrous mat with binder fibers that are activated by heat. For example, an air-laid fibrous mat containing thermoplastic or hot melt binder fibers may be heated and then embossed before the structure cools to permanently give the sheet a three-dimensional structure.

In addition to the regular geometrical structure imparted by the sculptured fabrics and other fabrics used in creating a basesheet, additional fine structure, with an in-plane length scale less than about 1 mm, may be present in the basesheet. Such a fine structure may stem from microfolds created during differential velocity transfer of the web from one fabric or wire to another prior to drying. Some of the materials of the present invention, for example, appear to have fine structure with a fine surface depth of 0.1 mm or greater, and sometimes 0.2 mm or greater, when height profiles are measured using a commercial moiré interferometer system. These fine peaks have a typical half-width less than 1 mm. The fine structure from differential velocity transfer and other treatments may be useful in providing additional softness, flexibility, and bulk. Measurement of the surface structures is described below.

An especially suitable method for measurement of Overall Surface Depth is moiré interferometry, which permits accurate measurement without deformation of the surface. For reference to the materials of the present invention, surface topography should be measured using a computer-controlled white-light field-shifted moiré interferometer with about a 38 mm field of view. The principles of a useful implementation of such a system are described in Bieman et al. (L. Bieman, K. Harding, and A. Boehnlein, "Absolute Measurement Using Field-Shifted Moiré," SPIE Optical Conference Proceedings, Vol. 1614, pp. 259-264, 1991). A suitable commercial instrument for moiré interferometry is the CADEYES® interferometer produced by Medar, Inc. (Farmington Hills, Mich.), constructed for a nominal 35-mm field of view, but with an actual 38-mm field-of-view (a field of view within the range of 37 to 39.5 mm is adequate). The CADEYES® system uses white light which is projected through a grid to project fine black lines onto the sample surface. The surface is viewed through a similar grid, creating moiré fringes that are viewed by a CCD camera. Suitable lenses and a stepper motor adjust the optical configuration for field shifting (a technique described below). A video processor sends captured fringe images to a PC computer for processing, allowing details of surface height to be back calculated from the fringe patterns viewed by the video camera.

In the CADEYES moiré interferometry system, each pixel in the CCD video image is said to belong to a moiré fringe that is associated with a particular height range. The method of field-shifting, as described by Bieman et al. (L. Bieman, K. Harding, and A. Boehnlein, "Absolute Measurement Using Field-Shifted Moiré," SPIE Optical Conference Proceedings, Vol. 1614, pp. 259-264, 1991) and as originally patented by Boehnlein (U.S. Pat. No. 5,069,548, herein incorporated by reference), is used to identify the fringe number for each point in the video image (indicating which fringe a point belongs to). The fringe number is needed to determine the absolute height at the measurement point relative to a reference plane. A field-shifting technique (sometimes termed phase-shifting in the art) is also used for sub-fringe analysis (accurate determination of the height of the measurement point within the height range occupied by its fringe). These field-shifting methods coupled with a camera-based interferometry approach allows accurate and rapid absolute height measurement, permitting measurement to be made in spite of possible height discontinuities in the surface. The technique allows absolute height of each of the roughly 250,000 discrete points (pixels) on the sample surface to be obtained, if suitable optics, video hardware, data acquisition equipment, and software are used that incorporates the principles of moiré interferometry with field shifting. Each point measured has a resolution of approximately 1.5 microns in its height measurement.

The computerized interferometer system is used to acquire topographical data and then to generate a grayscale image of the topographical data, said image to be hereinafter called "the height map." The height map is displayed on a computer monitor, typically in 256 shades of gray and is quantitatively based on the topographical data obtained for the sample being measured. The resulting height map for the 38-mm square measurement area should contain approximately 250,000 data points corresponding to approximately 500 pixels in both the horizontal and vertical directions of the displayed height map. The pixel dimensions of the height map are based on a 512×512 CCD camera which provides images of moiré patterns on the sample which can be analyzed by computer software. Each pixel in the height map represents a height measurement at the corresponding x- and y-location on the sample. In the recommended system, each pixel has a width of approximately 70 microns, i.e. represents a region on the sample surface about 70 microns long in both orthogonal in-plane directions). This level of resolution prevents single fibers projecting above the surface from having a significant effect on the surface height measurement. The z-direction height measurement must have a nominal accuracy of less than 2 microns and a z-direction range of at least 1.5 mm. (For further background on the measurement method, see the CADEYES Product Guide, Integral Vision (formerly Medar, Inc.), Farmington Hills, Mich., 1994, or other CADEYES manuals and publications of Medar, Inc.)

The CADEYES system can measure up to 8 moiré fringes, with each fringe being divided into 256 depth counts (sub-fringe height increments, the smallest resolvable height difference). There will be 2048 height counts over the measurement range. This determines the total z-direction range, which is approximately 3 mm in the 38-mm field-of-view instrument. If the height variation in the field of view covers more than eight fringes, a wrap-around effect occurs, in which the ninth fringe is labeled as if it were the first fringe and the tenth fringe is labeled as the second, etc. In other words, the measured height will be shifted by 2048 depth counts. Accurate measurement is limited to the main field of 8 fringes.

The moiré interferometer system, once installed and factory calibrated to provide the accuracy and z-direction range stated above, can provide accurate topographical data for materials such as paper towels. (Those skilled in the art may confirm the accuracy of factory calibration by performing measurements on surfaces with known dimensions.) Tests are performed in a room under Tappi conditions (73° F., 50% relative humidity). The sample must be placed flat on a surface lying aligned or nearly aligned with the measurement plane of the instrument and should be at such a height that both the lowest and highest regions of interest are within the measurement region of the instrument.

Once properly placed, data acquisition is initiated using CADEYES® PC software and a height map of 250,000 data points is acquired and displayed, typically within 30 seconds from the time data acquisition was initiated. (Using the CADEYES® system, the "contrast threshold level" for noise rejection is set to 1, providing some noise rejection without excessive rejection of data points.) Data reduction and display are achieved using CADEYES® software for PCs, which incorporates a customizable interface based on Microsoft Visual Basic Professional for Windows (version 3.0), running under Windows 3.1. The Visual Basic interface allows users to add custom analysis tools.

The height map of the topographical data may then be used by those skilled in the art to identify characteristic unit cell structures (in the case of structures created by fabric patterns;

these are typically parallelograms arranged like tiles to cover a larger two-dimensional area) and to measure the typical peak to valley depth of such structures. A simple method of doing this is to extract two-dimensional height profiles from lines drawn on the topographical height map which pass through the highest and lowest areas of the unit cells. These height profiles may then be analyzed for the peak to valley distance, if the profiles are taken from a sheet or portion of the sheet that was lying relatively flat when measured. To eliminate the effect of occasional optical noise and possible outliers, the highest 10% and the lowest 10% of the profile should be excluded, and the height range of the remaining points is taken as the surface depth. Technically, the procedure requires calculating the variable which we term "P10," defined at the height difference between the 10% and 90% material lines, with the concept of material lines being well known in the art, as explained by L. Mummery, in Surface Texture Analysis: The Handbook, Hommelwerke GmbH, Mühlhausen, Germany, 1990. In this approach, which will be illustrated with respect to FIG. 7, the surface 31 is viewed as a transition from air 32 to material 33. For a given profile 30, taken from a flat-lying sheet, the greatest height at which the surface begins—the height of the highest peak—is the elevation of the "0% reference line" 34 or the "0% material line," meaning that 0% of the length of the horizontal line at that height is occupied by material. Along the horizontal line passing through the lowest point of the profile, 100% of the line is occupied by material, making that line the "100% material line" 35. In between the 0% and 100% material lines (between the maximum and minimum points of the profile), the fraction of horizontal line length occupied by material will increase monotonically as the line elevation is decreased. The material ratio curve 36 gives the relationship between material fraction along a horizontal line passing through the profile and the height of the line. The material ratio curve is also the cumulative height distribution of a profile. (A more accurate term might be "material fraction curve.")

Once the material ratio curve is established, one may use it to define a characteristic peak height of the profile. The P10 "typical peak-to-valley height" parameter is defined as the difference 37 between the heights of the 10% material line 38 and the 90% material line 39. This parameter is relatively robust in that outliers or unusual excursions from the typical profile structure have little influence on the P10 height. The units of P10 are mm. The Overall Surface Depth of a material is reported as the P10 surface depth value for profile lines encompassing the height extremes of the typical unit cell of that surface. "Fine surface depth" is the P10 value for a profile taken along a plateau region of the surface which is relatively uniform in height relative to profiles encompassing a maxima and minima of the unit cells. Measurements are reported for the most textured side of the basesheets of the present invention, which is typically the side that was in contact with the through-drying fabric when airflow is toward the through-dryer.

Overall Surface Depth is intended to examine the topography produced in the tissue web, especially those features created in the sheet prior to and during drying processes, but is intended to exclude "artificially" created large-scale topography from dry converting operations such as embossing, perforating, pleating, etc. Therefore, the profiles examined should be taken from unembossed regions if the tissue web has been embossed, or should be measured on an unembossed tissue web. Overall Surface Depth measurements should exclude large-scale structures such as pleats or folds which do not reflect the three-dimensional nature of the original basesheet itself. It is recognized that sheet topography may be reduced by calendering and other operations which affect the entire basesheet. Overall Surface Depth measurement may be appropriately performed on a calendered basesheet.

The CADEYES® system with a 38-mm field of view may also be used to measure the height of material on an abrasive layer relative to the underlying tissue web, when there are openings in the abrasive layer that permit optical access to and measurement of the surface of the tissue web. When the abrasive layer comprises a translucent material, obtaining good optical measurements of the surface topography may require application of white spray paint to the surface to increase the opacity of the surface being measured.

Test for Abrasive Index

As used herein, the "Abrasiveness Index" is a measure of the ability of an abrasive layer to abrade away material from a block of a foam that is moved over the surface of the abrasive layer in a prescribed manner under a fixed load. The Abrasiveness Index is reported as the lost mass in grams per foot of travel of a weighted foam block, multiplied by 100, when the foam is moved through a complete sixteen-inch test cycle. The procedure used is a modified form of ASTM F1015, "Standard Test Method for Relative Abrasiveness of Synthetic Turf Playing Surfaces." A higher Abrasiveness Index is taken to be indicative of a more abrasive surface.

To prepare for measurement of the Abrasiveness Index, foam test blocks are cut from a phenolic foam material to have dimensions of 1 inch by 1 inch by 1.25 inches. The foam is a well known commercial green foam marketed as "Dry Floral Foam," product code 665018/63486APP, manufactured by Oasis Floral Products, a division of Smithers-Oasis Company of Kent, Ohio (UPC 082322634866), commonly used for floral arrangements for silk flowers and dried flowers.

A sample is cut from the material to be tested and taped to a flat, rigid table surface using two-sided Manco® Indoor/Outdoor Carpet Tape, marketed by Manco, Inc. of the Henkel Group of Avon, Ohio (UPC 075353071984). The tape is first placed on the table surface, avoiding overlapping of tape segments to ensure that a substantially uniform adhesive surface is provided having dimensions of at least 4 inches by 4 inches. The sample is then centered over the taped region and gently pressed into place. A 3-inch by 3-inch square plastic block with a thickness of 1-inch and mass of 168 grams is placed on the sample to define a test area that is centered within at least a 4-inch by 4-inch region of the table having the double-sided tape. A brass cylinder, 2-inches in diameter with a mass of 1 kg is centered on the plastic block and allowed to reside for 10 seconds to secure the sample to the taped region. A marker is used to trace around the border of the plastic block to draw the test area. The block and weight are removed from the sample. The sides of the drawn square (3-inches by 3-inches) should be aligned with the machine-direction and cross-direction of the material being tested, when such directions are defined (e.g., the shute direction for a woven abrasive layer).

Figure 25:
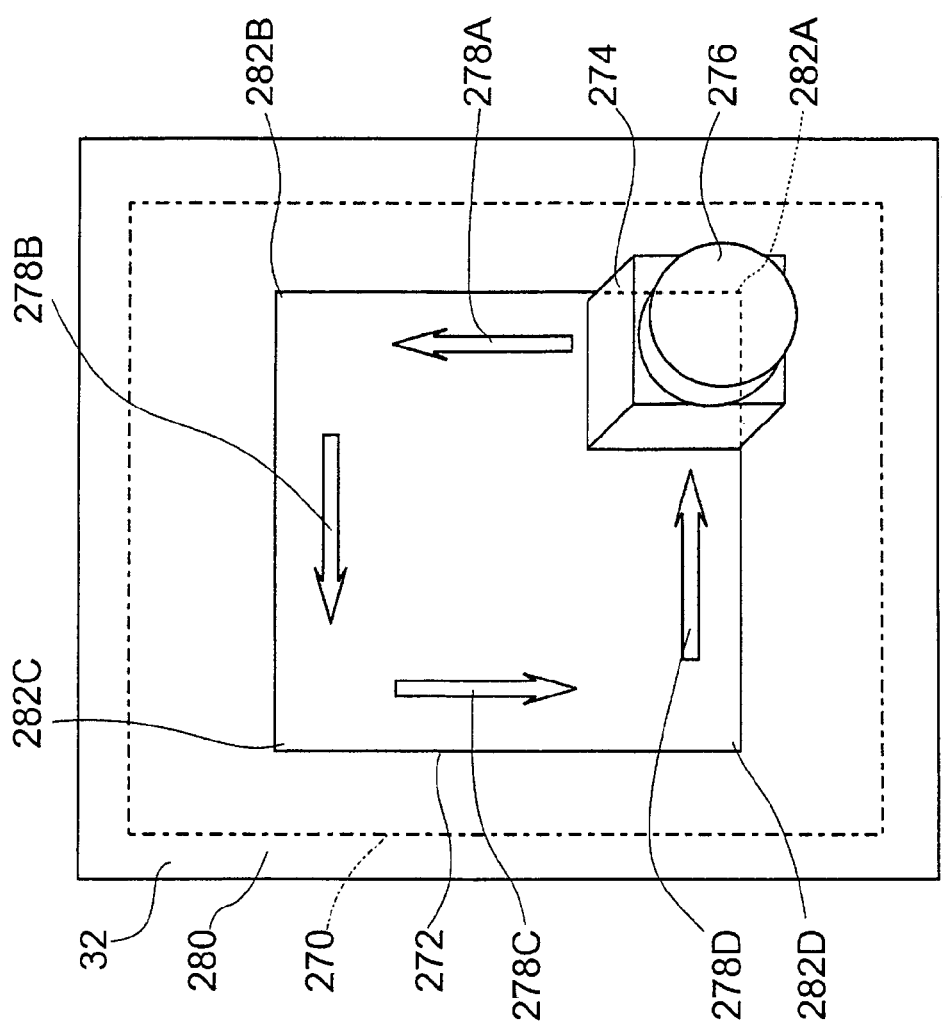
FIG. 25 depicts a starting point for an Abrasive Index Test.

FIG. 25 is a schematic of the set-up for the Abrasiveness Index test for the sample 280 to be tested. The sample 280 may have an upwardly facing abrasive layer 32 which may be joined to an underlying tissue web (not shown). Double-sided tape 270 joins the sample 280 to a table surface (not shown). A foam block 274 is placed in the lower right-hand corner 282A of the square test region 272 marked on the upper surface of the sample 280. The dimensions of the surface of the foam block 274 contacting the sample 280 are 1-inch by 1-inch. On top of the foam block 274 is placed a 100 g brass weight 276 having a circular footprint 1-inch in diameter. Two sides of the foam block 274 on the sample 280 are substantially superimposed over the inside boundary of the corner 282A of the marked test region 272.

To conduct the test, the foam block 274 is steadily moved by hand from the lower right-hand corner 282A (the initial corner) to the upper right-hand corner 282B of the test region 272, and then to the other corners 282C, 282D, and back to 282A again, ensuring that the foam block 274 travels along but not outside of the boundaries of the marked test area 272. Care is taken not to apply downward or upward force by hand, but to apply only steady lateral force to move the foam block 274 successively from one corner to another as indicated by the arrows 278A-278D. Both hands of the operator may be used as necessary to maintain the uprightness of the weighted foam block 274. The block is moved at a steady rate of about 5 seconds per side (a side being the path from one corner to the next corner). The path traced by the foam block 274 defines a square, ending at the initial corner 282A.

To achieve a smooth, steady motion, one finger (e.g., the thumb) should be on the "rear" vertical surface of the foam block 274 to push the block in the desired direction, and another finger should be on the "forward" vertical surface to maintain a steady position of the foam block 274.

After the block 274 has returned to the initial corner 282A, the path is reversed, again without lifting the weighted block 274. The block 274 thus follows the same path it once traced but in reverse order, going from the initial corner 282A to the lower left-hand corner 282D to the upper left-hand corner 282C to the upper right-hand corner 282B back to the initial lower right-hand corner 282A, being moved by steady lateral pressure and maintaining a rate of 5 seconds per side.

During this process, a portion of the foam block 274 will have been removed by abrasion during the 16-inch total path it travels (two eight-inch cycles). The 100-gram weight 276 is removed and the foam block 274 is then weighed and the amount of the foam block 274 removed by abrasion is determined by difference and recorded. This process is repeated two more times, using new materials (new double-sided tape 270, new samples 280 of the same material being tested, and new foam blocks 274), allowing the lost mass to be determined three times. The average of the three measurements is taken and converted to mass lost per 12 inches by multiplication with the correction factor of 12/16 (i.e., normalized to a path of 12 inches), and then multiplied by 100. The resulting parameter is reported as the Abrasiveness Index for the material being tested.

The abrasive layers of the present invention may have an Abrasiveness Index of about 1 or greater, about 2 or greater, about 3 or greater, about 4 or greater, or about 5 or greater, such as from about 1.5 to 10, or from about 2 to about 7.

Example 1

Preparation of an Uncreped Through Dried Basesheet

To demonstrate an example of a textured, wet resilient absorbent web with improved dry feel, a suitable basesheet was prepared. The basesheet was produced on a continuous tissue-making machine adapted for uncreped through-air drying. The machine comprises a Fourdrinier forming section, a transfer section, a through-drying section, a subsequent transfer section and a reel. A dilute aqueous slurry at approximately 1% consistency was prepared from 100% bleached chemithermomechanical pulp (BCTMP), pulped for 45 minutes at about 4% consistency prior to dilution. The BCTMP is commercially available as Millar-Western 500/80/00 (Millar-Western, Meadow Lake, Saskatchewan, Canada). Kymene 557LX wet strength agent, manufactured by Hercules, Inc. (Wilmington, Del.) was added to the aqueous slurry at a dosage of about 16 kg of Kymene per ton of dry fiber, as was carboxymethylcellulose at a dose of 1.5 kg per ton of dry fiber. The slurry was then deposited on a fine forming fabric and dewatered by vacuum boxes to form a web with a consistency of about 12%. The web was then transferred to a transfer fabric (Lindsay Wire T-807-1) using a vacuum shoe at a first transfer point with no significant speed differential between the two fabrics, which were traveling at about 5.0 meters per second (980 feet per minute). The web was further transferred from the transfer fabric to a woven through-drying fabric at a second transfer point using a second vacuum shoe. The through drying fabric used was a Lindsay Wire T-116-3 design (Lindsay Wire Division, Appleton Mills, Appleton, Wis.). The T-116-3 fabric is well suited for creating molded, three-dimensional structures. At the second transfer point, the through-drying fabric was traveling more slowly than the transfer fabric, with a velocity differential of 27%. The web was then passed into a hooded through dryer where the sheet was dried. The dried sheet was then transferred from the through-drying fabric to another fabric, from which the sheet was reeled. The basis weight of the dry basesheet was approximately 30 gsm (grams per square meter). The sheet had a thickness of about 1 mm, an Overall Surface Depth of about 0.4 mm, a geometric mean tensile strength of about 1000 grams per 3 inches (measured with a 4-inch jaw span and a 10-inch-per minute crosshead speed at 50% relative humidity and 22.8° C.), a wet:dry tensile ratio of 45% in the cross-direction, an MD:CD tensile ratio of 1.25, and 17% MD stretch, 8.5% CD stretch.

The Air Permeability of the web was measured at 440 CFM.

Example 2

A Laminate with a First Meltblown Polypropylene Web

High molecular weight isotactic polypropylene, Achieve 3915 manufactured by ExxonMobil Chemical Comp. (Houston, Tex.) was used in a pilot meltblown facility to make a polymer network by meltblown fiberization. The molecular weight range of the polymer is about 130,000 to 140,000. According to the manufacturer, the melt flow rate of the polymer according to ASTM D1238 is 70 g/10 min, which is believed to be below the range of melt flow rates for polymers typically used in a meltblown operation; the polymer is normally used for a spunbond operation or other applications other than meltblowing. (For example, a typical meltblown polymer such as polypropylene PP3546G of ExxonMobil Chemical Corp. has a melt flow rate of 1200 g/10 min, measured according to ASTM D1238, and polypropylene PP3746G of the same manufacturer has a melt flow rate of 1500 g/10 min.) The high viscosity material was found to be surprisingly useful for producing the a coarse meltblown web according to the present invention.

The polypropylene was extruded through a meltblown die at 485° F. on a porous Teflon conveyor web with an underlying vacuum. The web speed was 10 ft/min. A meltblown polypropylene network with a basis weight of 85 to 120 gsm was generated by adjusting the temperature, air pressure, and the distance between the blown head to the forming table, as well as the flow rate of the polymer.

Figure 12:
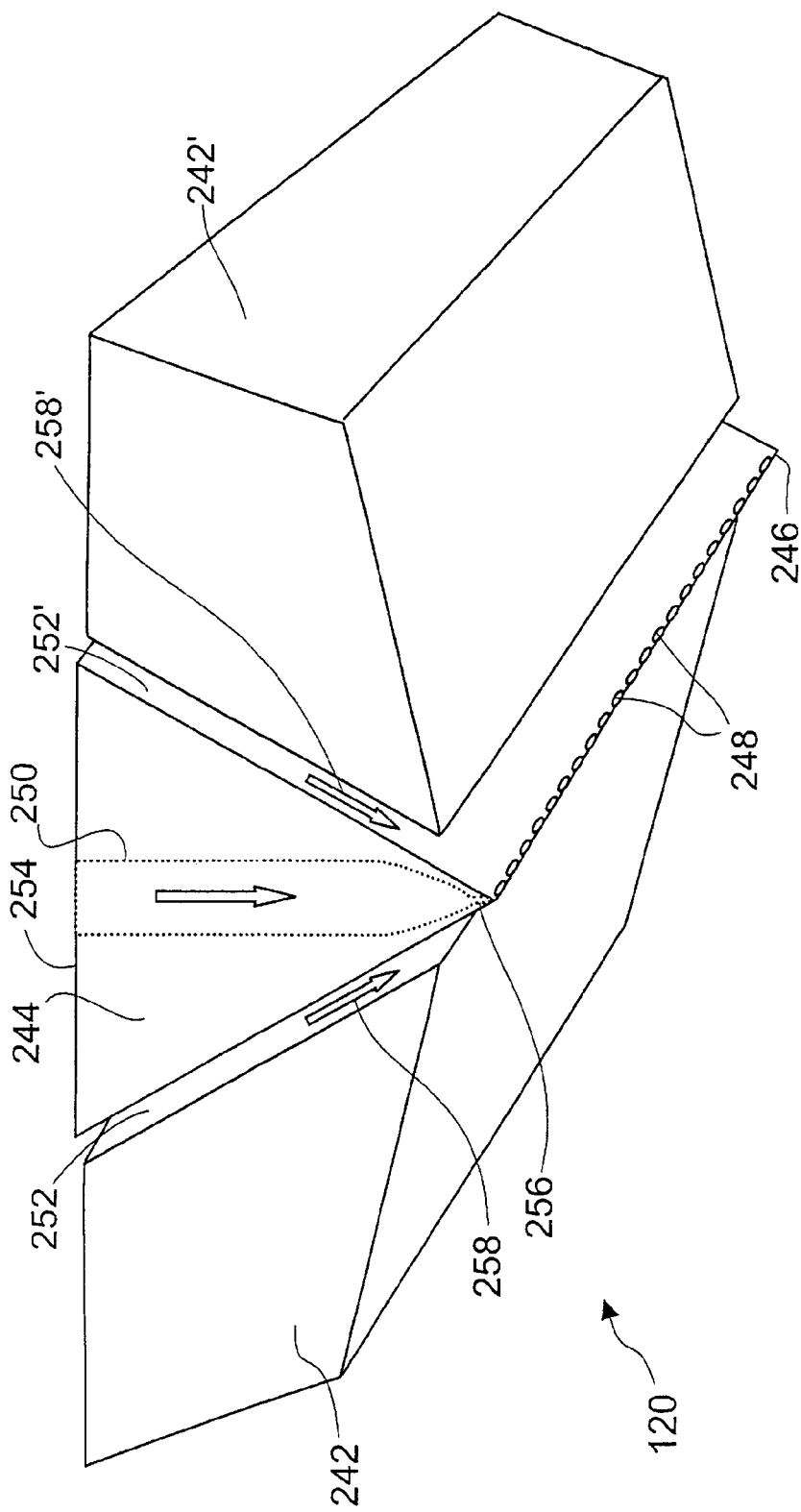
FIG. 12 depicts a cut-away portion of a meltblown die.

FIG. 12 is a schematic drawing of a central cutaway portion of the meltblown die 120 drawn according to the meltblown die used in this Example. The primary portion of the die comprises two side blocks 242, 242', and a triangular central feed block 244 through which polymer is injected into an internal chamber 250. The central feed block 244 is substantially an isosceles triangle in cross-section, converging to an apex 246 at a 60-degree angle. Along the apex 246 are drilled a series of evenly spaced holes 248 in fluid communication with the internal chamber 250. The internal chamber 250 is also in fluid communication with a pressurized source of molten polymer (not shown) which forces molten polymer through the holes 248 of the central feed block 244 to form strands of polymer (not shown). Air jets 258, 258' flow through the gaps 252, 252', respectively, between the side blocks 242, 242' and the central feed block 244. The gaps 252, 252' are in fluid communication with a source of pressurized air (not shown) which generates the flow of the air jets 258, 258' toward the apex 246 of the central feed block 244. The air in the jets 258, 258' is typically heated well above the melting point of the polymer to prevent premature cooling of the polymer strands. For this Example, the air temperature was about 480° F. In conventional meltblown operation, the air jets 258, 258' provide a high level of shear that may cause extensional thinning of the polymer strands and also provide a high level of turbulence to separate the strands and create isolated, randomly positioned fibers. For purposes of the present invention, however, the air flow rate may be decreased to reduce turbulence, allowing some adjacent polymer strands from adjacent holes 248 to coalesce into multifilamentary aggregates, which still provide enough air flow and turbulence to deposit the polymer strands as a network of fibers on an underlying carrier web (not shown).

The holes 248 have a diameter of 0.015 inches and were drilled at 30 per inch. The width of the active region of the die 120 (the region provided with holes 248 for formation of polymer strands) was 11.5 inches. The entire die 120 was 14 inches wide. The gaps 252, 252' had a width of 0.055 inches, determined by shims placed between the central feed block 244 and the side blocks 242, 242' at the outside ends of the die 120 (not shown), away from the active region. The drill depth 256 of the holes 248 is the distance into the central feed block 244 that had to be penetrated during drilling to each the central chamber 250. In this case, the drill depth was about 4 mm. The height of the central feed block 244 (the distance from the base 254 to the apex 246) was 52 mm, and the depth of the internal chamber 250 (the height of the central feed block 244 minus the drill depth 256) was about 48 mm.

Not shown is a backing plate for the die block 120 through which pressurized polymer melt was injected, the air injection lines, and supporting structures for the die. Such features are well known and easily provided by those skilled in the art. (It should be recognized that numerous alternatives to the meltblown die of FIG. 12 are still within the scope of the present invention, such as a die with two or more rows of holes 248 that may be arranged in a staggered array, parallel lines, and the like, or dies in which annular jets or air surround the exiting polymer strand.)

In producing the meltblown web with coarse multifilamentary aggregates, it was found that the "normal" elevation of the meltblown die relative to the carrier wire, namely, 11 inches, was too high for the modified run conditions according to the present invention. At this normal height, the strands had become too cool when they hit the wire for good fiber to fiber bonding (here the term "fiber" encompasses multifilamentary aggregates), and the resulting web lacked integrity. The head was then lowered several inches, allowing good fiber-fiber bonding to occur. The distance from the die's apex to the carrier wire was about 7 inches. In practice, the optimum height for a given polymer will be a function of web speed (and thus the flow rate of the polymer) and the temperatures of both the polymer and the heated air.

For the system shown in FIG. 12, conventional meltblown operation is achieved when the pressurized air source applied to the air gaps 252, 252' is about 40 to 50 psig. For the present Example, however, when lower airflow rates were desired to produce coarser fibers, the pressurized air source was set to about 12 psig to 20 psig during the runs to yield a durable abrasive network with good material properties for the purposes of the present invention. Thus, less than about half the air flow rate of conventional meltblown operation was used.

A micrometer (Fowler Precision Tools, Model S2-550-020) was used to measure the diameter of the polypropylene fibers in the meltblown material. Twenty fibers were randomly selected and measured. A range of 70 microns to 485 microns was obtained, with a mean of 250 microns and a standard deviation of 130 microns. Multifilamentary aggregates formed a significant portion of the meltblown web.

Testing of Thickness Variation, as previously described, in one set of samples (measured basis weight of 120 gsm) gave a standard deviation of 0.25 mm (mean thickness was 1.18 mm) for the meltblown web. By way of comparison, a more conventional meltblown web produced at Kimberly-Clark for commercial with a basis weight of 39 gsm was measured to have a standard deviation of 0.03 mm (mean thickness was 0.29 mm).

Gurley stiffness measurements of the meltblown web gave an average MD stiffness of 138.8 mg, with a standard deviation of 35.9 mg. The CD stiffness was 150 mg, with a standard deviation of 34.0 mg. The basis weight of the measured samples was 120 gsm.

The Air Permeability of the meltblown web with multifilamentary aggregates was measured at 1130 CFM (mean of 6 samples). When two layers of the meltblown were superimposed, the Air Permeability for the two layers together was measured at 797 CFM (mean of three measurement locations).

The meltblown web was joined to the uncreped tissue web of Example 1. In a first run (Run 2-A), the meltblown web was joined to a cut section of the uncreped through-dried tissue web to make a first laminate using a hot melt adhesive (NS-5610, National Starch Chemical Company of Berkeley, Calif.) applied in a swirl spray pattern at 320° F. with a hot melt applicator. The meltblown web showed excellent adhesion and performed well in scrubbing (high scratch resistance).

In a second run (Run 2-B), the meltblown web was joined to the tissue web to make a second laminate using thermal bonding achieved with a Sunbeam® Model 3953-006 1200 Watt iron on the highest ("linen") heat setting. The tissue web, cut to three-inches by six-inches, was placed over a meltblown web cut to the same size, and the iron was placed on the tissue web and pressed with mild pressure (ca. 10 lbs of force) for about two to three seconds, then lifted and placed on an adjacent spot. This was repeated several times, with each spot of the tissue typically being contacted with the iron for two or three times, until the meltblown web became well bonded with the tissue without the meltblown web losing its abrasive characteristics. (In practice, temperature, application pressure, and duration of heating may all be optimized for the particular product being made.)

The Air Permeability of a cut sample of the laminate was measured at 316 CFM.

The surface topography of the second laminate was measured using moiré interferometry, as previously described. A 38-mm field of view optical head (nominally 35-mm) was used. To improve the opacity of the polypropylene fibers, the sample was lightly played with a flat white spray paint, using a can of Krylon® 1502 flat white paint (Sherwin-Williams, Cleveland, Ohio), sprayed from a distance of about 6 inches with a sweeping motion and about 2 seconds of residence time for most portions of the painted laminate. The applied paint did not appear to fill or block pores that were visible to the eye on the tissue, and did not appear to significantly modify the topography of the surface. The Air Permeability of the lightly painted laminate was measured at 306 CFM.

Figure 13:
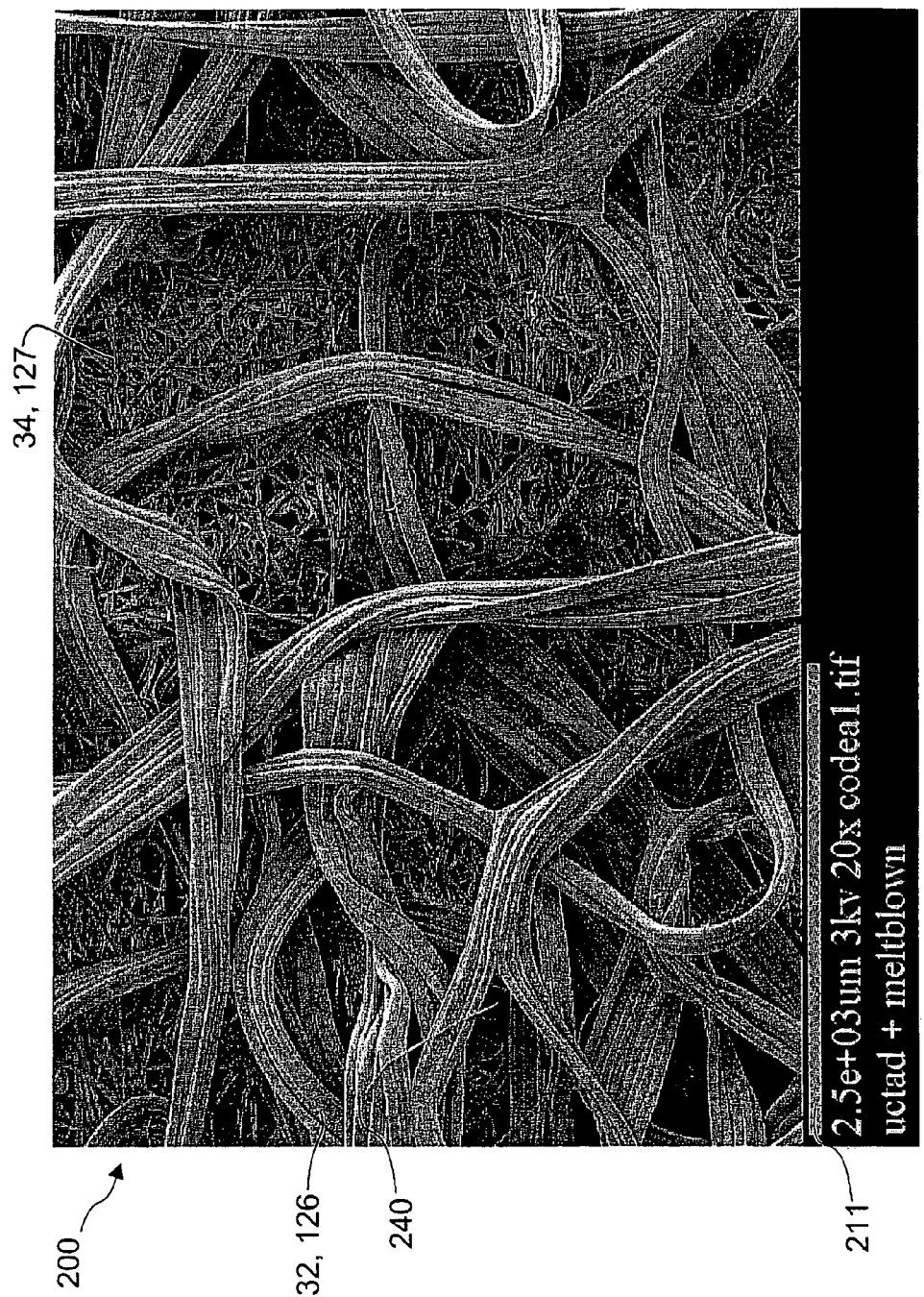
FIG. 13 is a plan-view micrograph of a meltblown-tissue laminate according to the present invention.

FIG. 13 is a micrograph of the unpainted meltblown-tissue laminate 200 of Run 2-B taken from above (the plan view). The micrograph shows the thermoplastic polymeric fibers 126 of an abrasive meltblown layer 32 above a paper web 34 comprising papermaking fibers 127 of substantially smaller diameter and smaller length than the thermoplastic polymeric fibers 126. The meltblown layer 32 appears to consist almost entirely of multifilamentary aggregates 240 having more than two polymeric strands joined together in ribbon-like structures disposed somewhat randomly on the paper web 34. The length scale is indicated by the gray bar 211 which has a length of 2500 microns (2.5 mm) on the micrograph. It can be seen that the multifilamentary aggregates have widths ranging from about 100 to about 500 microns.

Several of the multifilamentary aggregates 240 in FIG. 13 twist 180 degrees or more over a short distance. Without wishing to be bound by theory, it is believed that the common twisting of the multifilamentary aggregates 240 presents a more abrasive surface than if the multifilamentary aggregates 240 remains substantially flat (relative to the paper web) and untwisted. In one embodiment, a region of 3 centimeters square (3 cm×3 cm) will have, on the average (based on sampling at least 20 representative 3 cm square regions), at least one multifilamentary aggregate making a twist of at least 180 degrees about its axis. More specifically, there may be at least 5, at least 10, at least 15, or at least 50 multifilamentary aggregates that each undergo a twist along their respective axes of at least 180 degrees, and in one embodiment, at least 360 degrees or at least 720 degrees. In one embodiment, at least one multifilamentary aggregate in the 3 cm square area has a helically twisted structure such that a 360 twist occurs within a distance of no more than 3 cm, more specifically no more than 1 cm, along the length of the fiber (following the path of the fiber).

FIG. 14A is a micrograph of the cross-section of the meltblown-tissue laminate 200 of Run 2-B showing the abrasive meltblown layer 32 comprising multifilamentary aggregates 240 disposed above the paper web 34. Fused regions 260 may be seen in the meltblown layer 32 apparently caused by heating of the paper web 34 with an iron during the attachment process. In the paper web 34, an elevated region 262 may be seen due to molding of the paper web 34 during through drying. Such topographical structures, formed during non-compressive drying of the web, are remarkably wet resilient since the hydrogen bonds between the papermaking fibers 127 are formed in the three-dimensional state, not a flat, dense state as in creping. When a creped web is wetted, the bulky structure added in the form of kinks and microcompressions to dry fibers during creping become relaxed as the moist fibers swell, so the creped web thus tends to return to a flat, dense state upon wetting. But when an uncreped, through-dried three-dimensional web is wetted, the structure is largely maintained. Further, the molded, three-dimensional topography of the paper web 34 in FIG. 14A may also contribute to the topography of the meltblown layer 32, improving the abrasiveness of the meltblown layer 32 and improving the ability of the meltblown-tissue laminate 200 to clean or wipe.

Unlike embossed webs, the uncreped, through dried paper web 34 in FIG. 14A has a three-dimensional structure having substantially uniform density.

Some of the multifilamentary aggregates 240 shown have a ribbon like structure with multiple strands substantially aligned, but others show a staggered structure or have strands that vary in position relative to one another. The multifilamentary aggregates 240 have three or more strands 238, and based on FIG. 14A it appears that multifilamentary aggregates 240 with four or more strands 238 comprise well over 50 weight % (e.g., perhaps over 90 weight %) of the meltblown layer 32.

FIG. 14B is a micrograph of a cross-section of the meltblown-tissue laminate 200 of Run 2-B that has been very lightly sprayed with white spray paint (the Krylon© paint described above). The multifilamentary aggregate 240 labeled as "J" executes a twist of about 180 degrees relative to its axis (an axial twist) over a fiber path length of about 1 mm. In other words, the side of the multifilamentary aggregate 240 labeled as "J" that was away from the paper web 34 after the twist is then facing the paper web 34.

Figure 15:
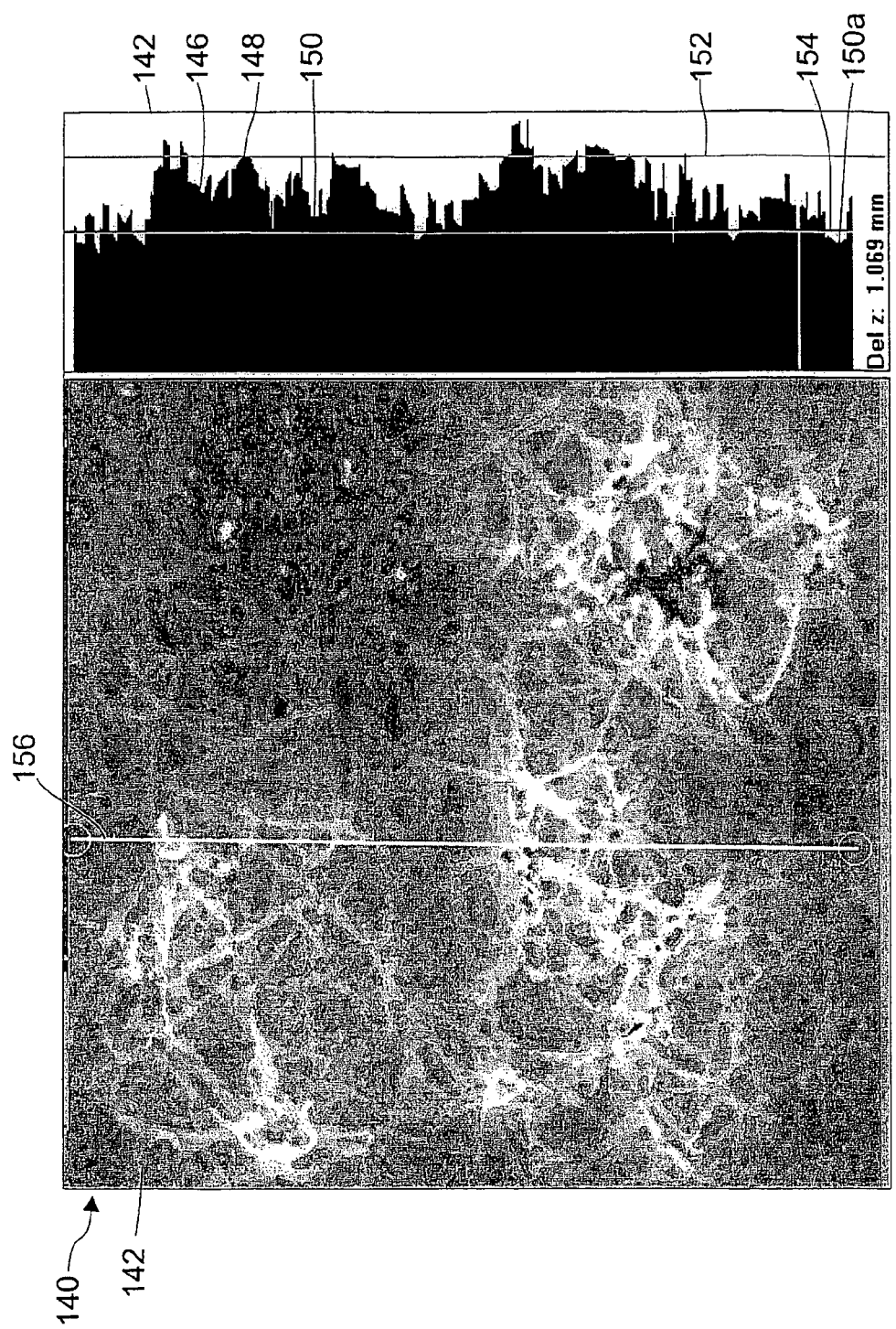
FIG. 15 is a display of topographical data in a height map for a meltblown-tissue laminate also showing a profile line extracted from the height map.

For the laminate of Run 2-B, the measured topography of the abrasive layer on the underlying uncreped through-dried tissue may be seen graphically in FIG. 15, which shows a screen shot 140 of topographical data for the meltblown-tissue laminate generated by the CADEYES® system, customized to show a 512×512 pixel height map 142 with a profile display box 144 to the right of the height map 142 showing a profile 146 corresponding to the height profile along a profile line 156 on the height map 142. The profile shows a variety of peaks 148 and valleys 150 corresponding to elevated and depressed regions, respectively, along the profile line 156. In the approximately 38-mm square region depicted in the height map 142, the lightest regions correspond to the highest height measurements and the darkest regions correspond to lowest heights of the measured surface. In the profile box 144, the 10% material line 152 and the 90% material line 154 are shown, and the gap in height between the two lines 152, 154 is reported as 1.456 mm, meaning that the surface depth along the profile line 156 across the height map 142 is 1.456 mm.

Some portions of the profile 146, such as the valley 150a, correspond with the surface of the tissue web beneath the meltblown abrasive layer. Thus, there are portions of the surface area of the meltblown abrasive layer occupied by openings that extend through to the underlying surface of the tissue web, allowing the tissue web to be seen when viewed from above. Additional openings to the tissue web are visible under a microscope at low (10×) magnification. With the resolution of the CADEYES® device in a 38-mm field of view, it is sometimes difficult to distinguish small openings that extend to the tissue below.

In the upper right hand portion of the height map 142, some non-fibrous regions appear unusually white in an otherwise depressed region. This is believed to be due to optical noise since the signal strength in this region was low, causing a step discontinuity in the fringe to which the data was assigned. There are also scattered pixels for which no measurement was possible, but in general the fibrous nature of the meltblown web was captured by the moiré interferometry measurement.

Figure 16:
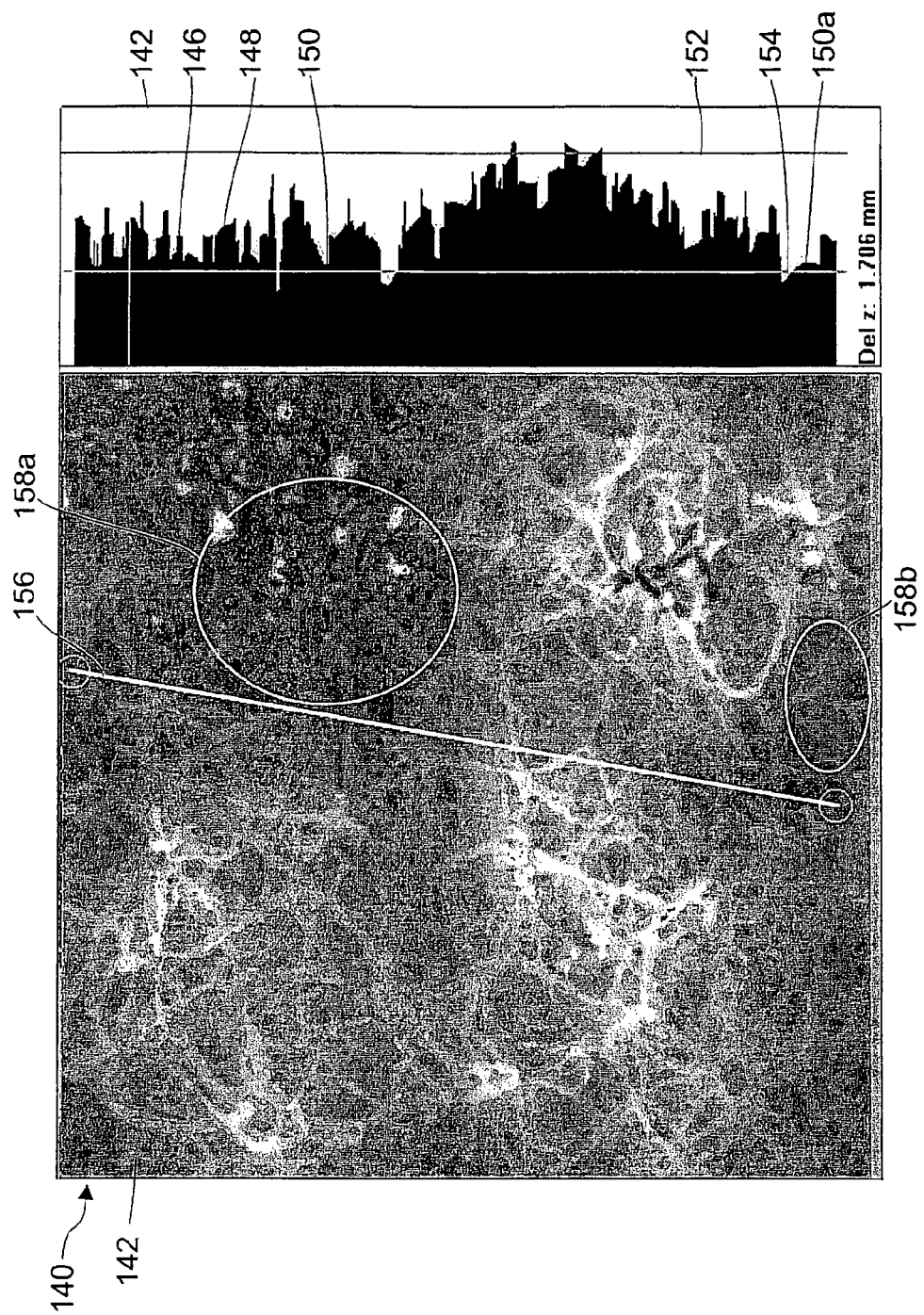
FIG. 16 is a display of topographical data from the same height map shown in FIG. 15 but displaying a different profile line.

FIG. 16 provides a screen shot 140 of the same height map 142, but with a different profile line 156 selected to provide a different profile 146 extracted from the height map data. Here the lines 152 and 154 were manually selected and do not necessarily correspond to the 10% and 90% material lines, but reflect an attempt to identify characteristic peak and valley heights on the profile 146, showing a depth of about 1.7 mm.

The valley 150a corresponds to a portion of the underlying tissue web, suggesting that the thickness of the abrasive layer on the tissue web is roughly 1.7 mm.

In regions 158a and 158b, the meltblown web is thin enough that horizontal bands from the texture of the underlying three-dimensional tissue can be seen. Thus, the meltblown web has regions of high and low concentration of fibers (high and low basis weight), such that regions of the underlying tissue can be seen that are greater in size than 1 mm by 2 mm or greater than 2 mm by 4 mm (i.e., regions with such dimensions are substantially free of abrasive polymeric fibers).

Ten samples made from Run 2-B were tested for Wet and Dry Opacity. Average Dry Opacity was 67.65% (standard deviation 1.14%), and the average Wet Opacity was 53.97% (standard deviation 3.1%), with an average of 1.60 grams of water per gram of fiber in the wetted samples (standard deviation 0.15 grams of water per gram of fiber). By way of comparison, a Chore Boy® Golden Fleece™ Scouring Cloth (UPC # 0 26600 30316 7), marketed by Reckitt & Colman Inc. Wayne, N.J., showed Dry Opacity of 95.1% for three samples, a Wet Opacity of 95.83%, and a water pickup of 0.54 grams of water per gram of solid (standard deviation of 0.16 gram of water per gram of solid).

In a third run (Run 2-C), the meltblown web was thermally bonded to plain white SCOTT® Towel (UPC 054000173431—core code JE2 11 290 01) produced by Kimberly-Clark Corp. (Dallas, Tex.) by ironing, as described for Run 2-B above. The Air Permeability was measured at 118 CFM, while two samples of the SCOTT® Towel tissue alone taken from different rolls were measured at 140 CFM and 135 CFM. A sample of the meltblown web simply placed on top of the SCOTT® Towel tissue sample with an Air Permeability value of 135 CFM, overlaid without thermal bonding of the two layers, yielded an Air Permeability of 134 CFM, suggesting that the process of thermal bonding causes obstruction of some pores in the tissue web to slightly reduce the Air Permeability relative to an unbonded combination of the tissue and the abrasive layer.

Figure 17:
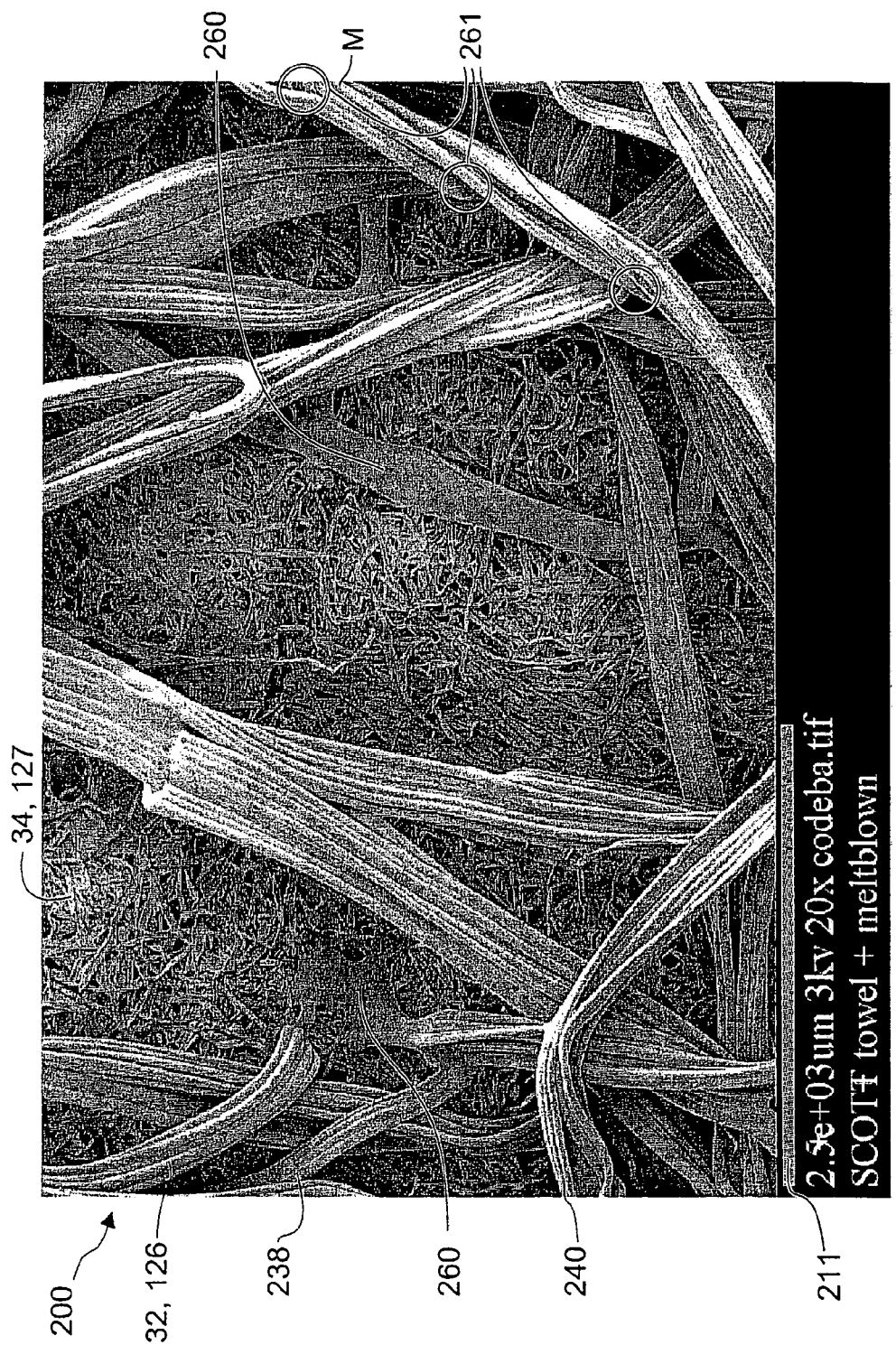
FIG. 17 is a plan-view micrograph of meltblown-tissue laminate showing multifilamentary aggregates.

FIG. 17 is a plan-view micrograph of meltblown-tissue laminate 200 of Run 2-C showing the abrasive meltblown layer 32 comprising polymeric fibers 126 primarily in the form of multifilamentary aggregates 240 disposed above a paper web 34 (SCOTT® Towel). Fused regions 260 of the meltblown layer 32 can be seen joined to the paper web 34.

Some of the multifilamentary aggregates 240 shown have a ribbon like structure with multiple strands 238 that are substantially parallel for a distance, after which some of the strands 238 may separate. One example is provided by the multifilamentary aggregate 240 labeled "M." Three circles indicate the location of apparent forks 261 where a portion of a multifilamentary aggregate 240 departs from the remainder of the multifilamentary aggregate 240 and follows a different direction. In one embodiment, a 3 cm square region of a meltblown web 32 having multifilamentary aggregates 240 may comprise, on the average (based on an average of at least 20 sections measured), at least 3 forked regions 261 in the multifilamentary aggregates 240, and more specifically at least 10 forked regions in the multifilamentary aggregates 240, and most specifically at least 30 forked regions in the multifilamentary aggregates 240.

Figure 18:
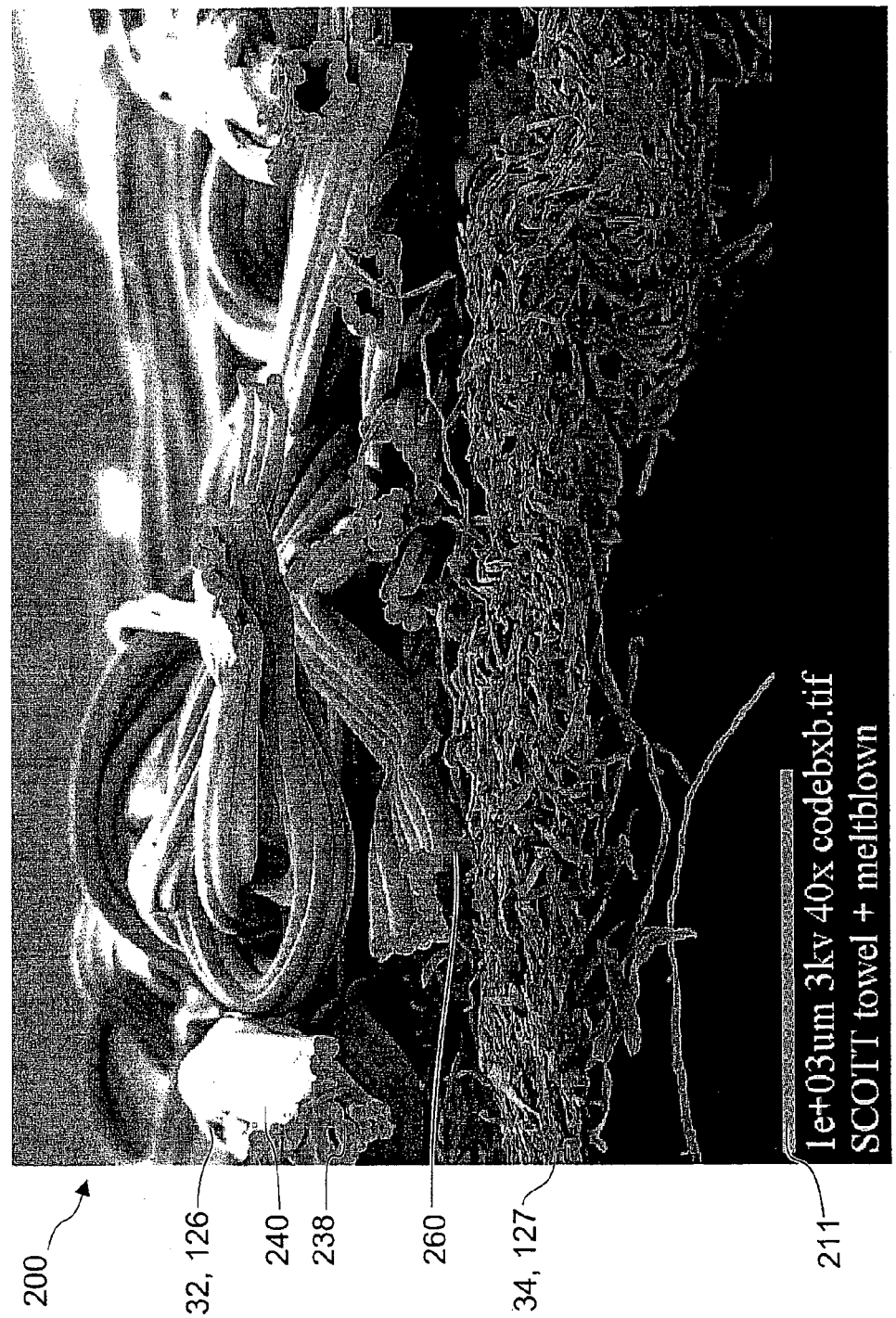
FIG. 18 is a micrograph of the cross-section of the meltblown-tissue laminate of FIG. 17.

FIG. 18 is a micrograph of the cross-section of the meltblown-tissue laminate 200 of Run 2-C. A fused region 260 beneath one multifilamentary aggregate 240 appears to be joined to the paper web 34. Numerous strands 138 are evident in the multifilamentary aggregates 240, with strand counts on the order of about 10 being present.

In a fourth run (Run 2-D), the meltblown web was thermally bonded to commercially available VIVA® towel, produced by Kimberly-Clark Corp. (Dallas, Tex.) by ironing, as described for Run 2-B above. The Air Permeability was measured at 97.1 CFM.

Figure 19:
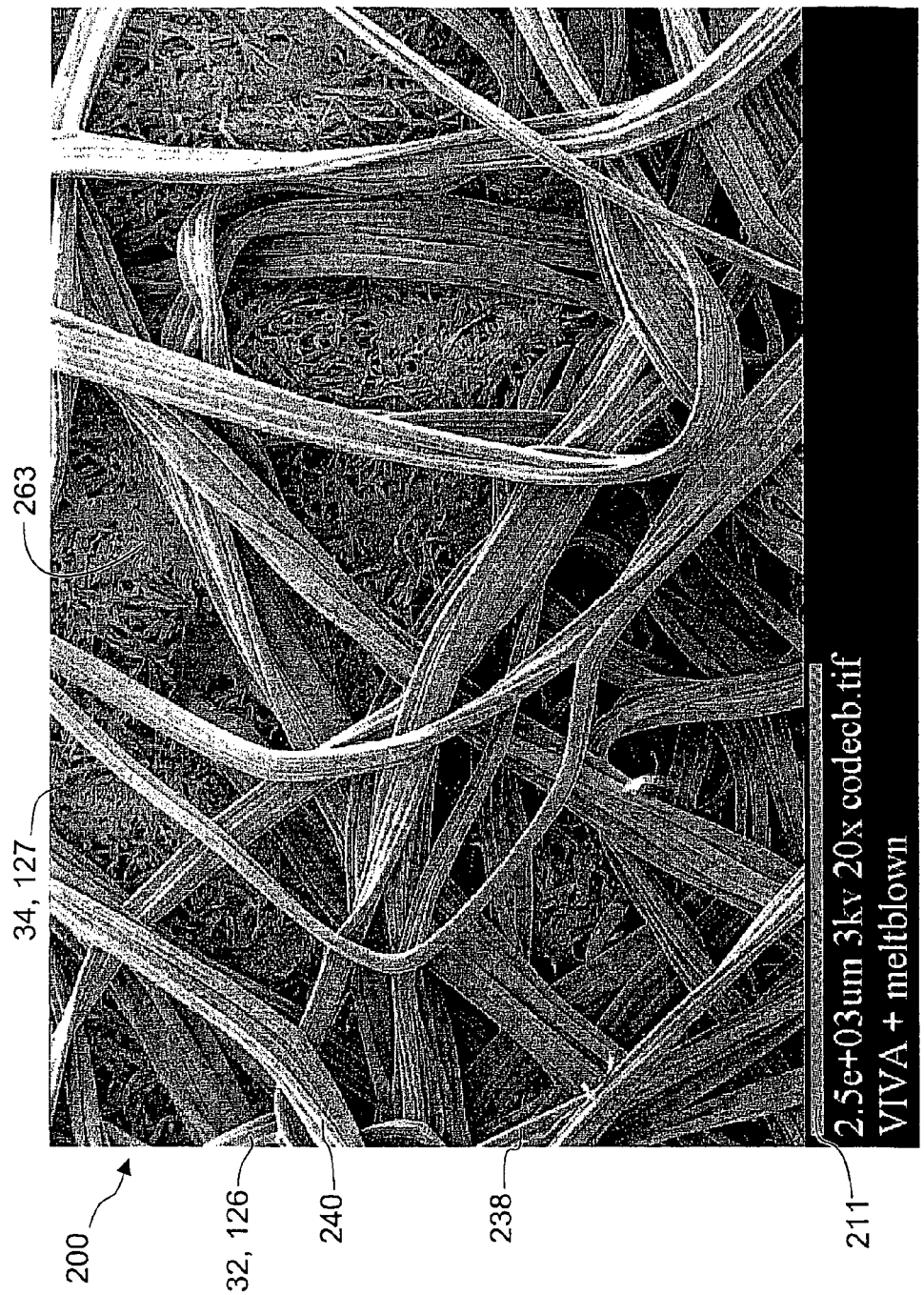
FIG. 19 is a plan-view micrograph of a meltblown-tissue laminate.

FIG. 19 is a plan-view micrograph of a meltblown-tissue laminate 200 of Run 2-D showing the abrasive meltblown layer 32 comprising polymeric fibers 126 primarily in the form of multifilamentary aggregates 240 disposed above a paper web 34 (VIVA® Towel). Latex-bonded regions 263 in the paper web 34 can seen, which are a result of the double recreped manufacturing process for this web.

In a related trial, a similar polymer was used to create another meltblown polymer web according to the methods described in this Example. Instead of Achieve 3915 polypropylene by ExxonMobil Chemical Corp., Achieve 3825 polypropylene was used to produce a meltblown web with similar properties to that obtained with the Achieve 3915 polymer. The Achieve 3825 polypropylene is a metallocene grade polypropylene having a melt flow rate of 32 g/10 min. Multifilamentary aggregates were also produced with similar characteristics to those obtained with the Achieve 3915 polymer. Higher back pressure was required to extrude the molten Achieve 3825 polymer, requiring about 400 psig in comparison to 280 psig for the Achieve 3915, due to the lower melt flow rate.

Example 3

A Second Meltblown Polypropylene Web

Bassell PF015 polypropylene manufactured by Bassell North America (Wilmington, Del.) having a nominal processing temperature of about 221° C. was used to produce a second meltblown polypropylene web to be used in making laminates with tissue. A pilot facility distinct from that of Example 2 was used. The meltblown web was produced through a meltblown tip (30 holes per inch, hole diameter 0.0145 inches) producing 4 pounds per inch of machine width per hour (4 PIH). Coarseness in the fiber was achieved by progressively lowering processing temperatures and primary air pressure while targeting basis weights varying between about 50 gsm and 100 gsm. For 50 gsm meltblown, the line speed was 78 feet per minute, and for 100 gsm meltblown, the line speed was 39 feet per minute. Initial processing temperatures of about 500° F. (260° C.) were lowered to between about 392° F. (200° C.) to about 410° F. (210° C.), with the die tip at 410° F. (210° C.). Primary air pressure was lowered from the normal range of 3.5-4 psig to less than 0.5 psig. Dietip and spinpump pressures were about 170-190 psig and 340-370 psig, respectively. These settings were reached iteratively in order to obtain a coarse meltblown web, with good abrasiveness by virtue of being molded against the carrier wire. In conventional operation, meltblown fibers are relatively solidified when they land on the carrier wire and are not molded to a significant degree against the carrier wire, but in this case the meltblown fibers were still soft enough that they could conform to the texture of the carrier wire such that the meltblown web received a molded, abrasive texture.

The meltblown was formed at basis weights of about 50 gsm and at about 100 gsm as a stand-alone product, and also deposited directly on the UCTAD tissue of Example 1 and on commercial VIVA® paper towels. The meltblown web alone was measured to have an average MD Gurley Stiffness value of 113.7 mg (standard deviation of 34.5 mg) and an average CD Gurley Stiffness value of 113.0 mg (standard deviation of 41.9 mg). The tested samples had a basis weight of 100 gsm.

Testing of Thickness Variation, as previously described, in one set of high-basis weight samples (measured basis weight of 100 gsm) gave a standard deviation of 0.07 mm (mean thickness was 0.99 mm) for the meltblown web.

Measurement of Air Permeability for a single layer of the meltblown gave a value in excess of 1500 CFM. Two superimposed plies of the meltblown web gave an Air Permeability of 1168 CFM (mean of measurements at six locations).

Figure 20:
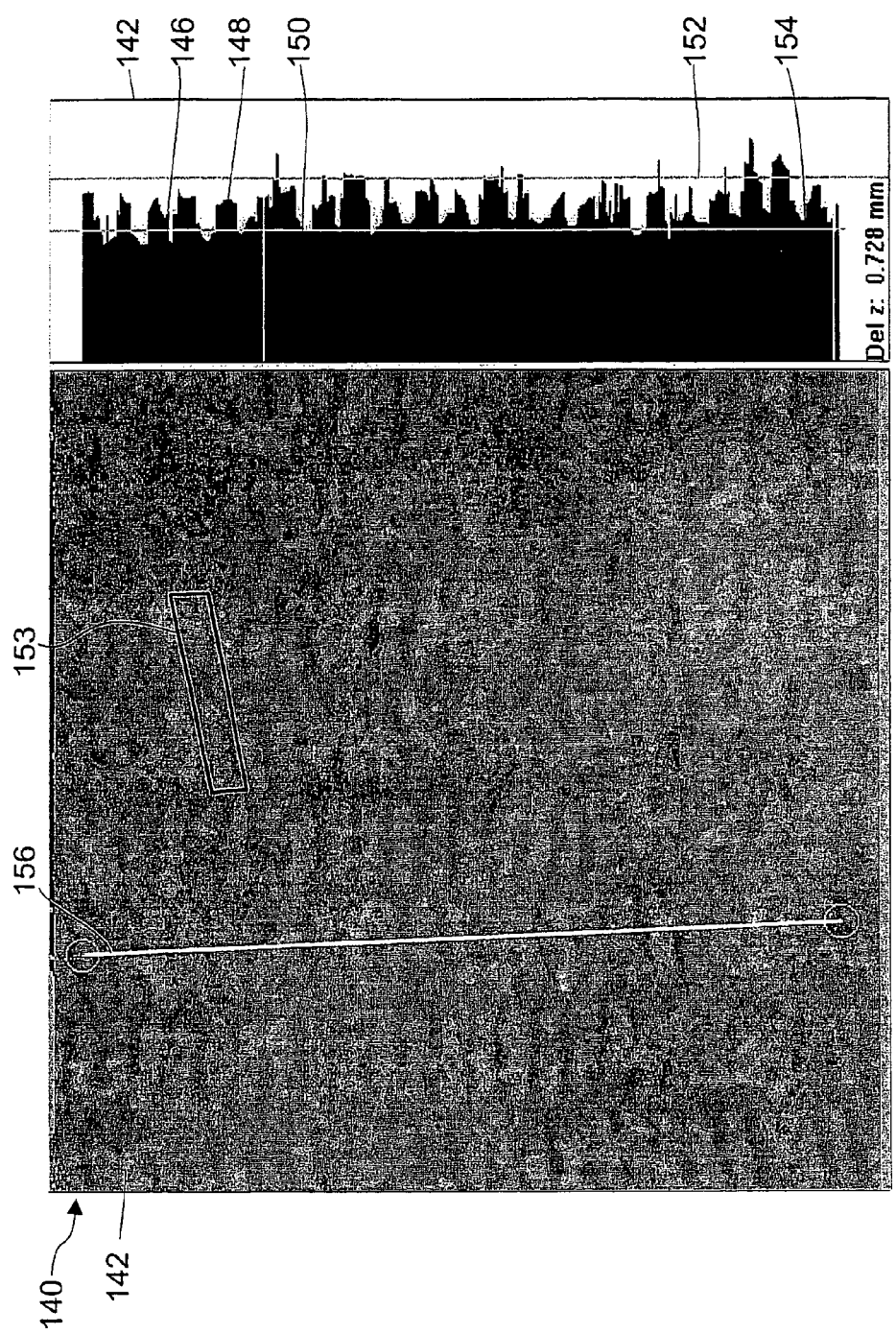
FIG. 20 is a display of topographical data in a height map for another meltblown-tissue laminate according to the present invention.

In one run (Run 3-A), the same uncreped through-dried tissue made in Example 1 was used, with 50 gsm meltblown being formed directly on the tissue web. FIG. 20 shows a height map 142 of the laminate with the meltblown layer up. A profile 146 taken along a profile line 156 from the height map 142 yields Surface Depth of about 0.728 mm (the difference in height between the 10% material line 152 and the 90% material line 154). A repeating structure can be seen corresponding with the topography of the carrier wire against which the meltblown web was molded during formation. A unit cell 153 of the repeating structure is indicated, which is a parallelogram having sides of about 9.5 mm and 1.5 mm.

Figure 21:
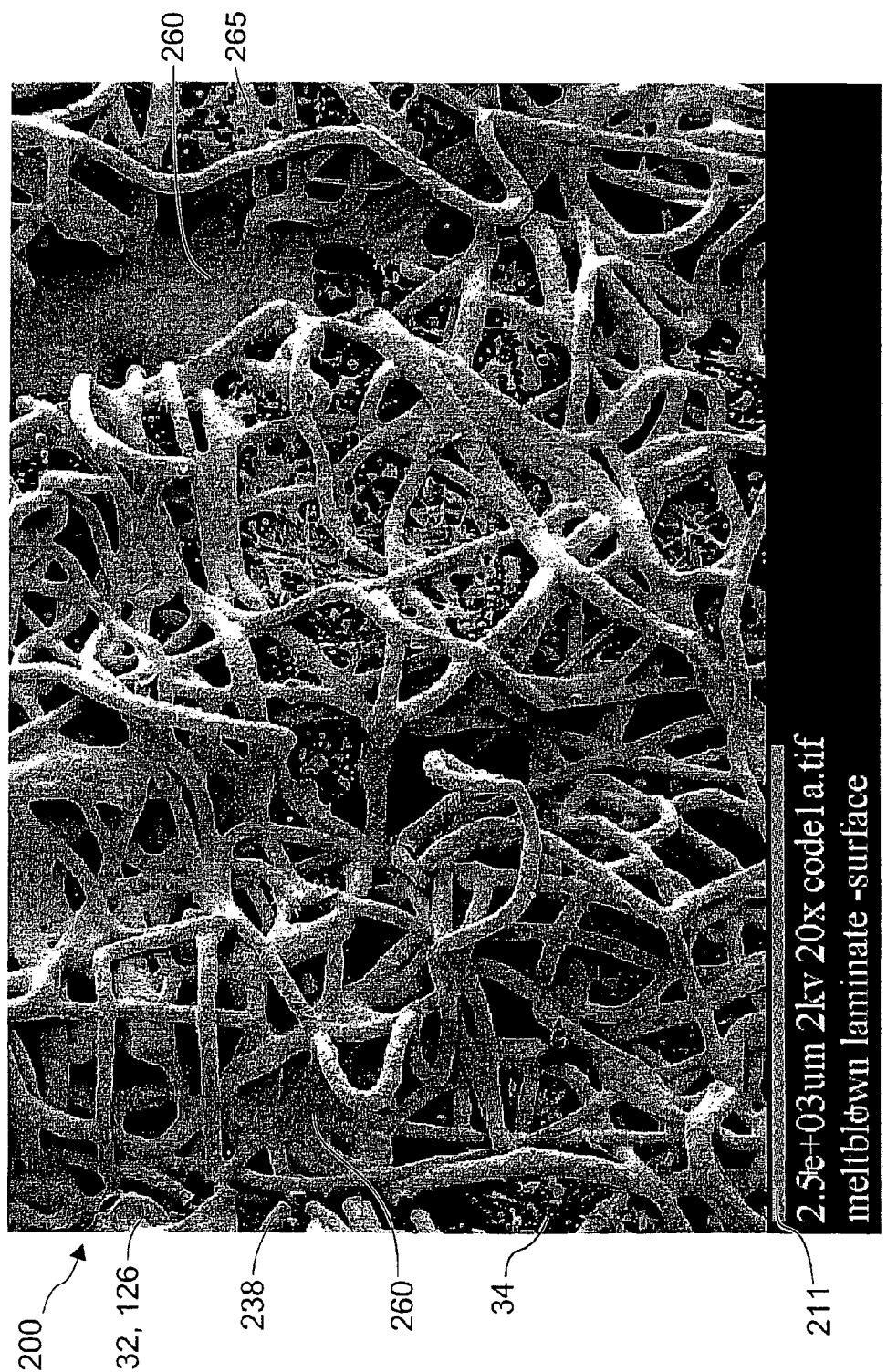
FIG. 21 is a plan-view micrograph of a meltblown-tissue laminate corresponding to that shown in FIG. 20.

FIG. 21 is a plan-view micrograph of the meltblown-tissue laminate 200 of Run 3-A that was sprayed lightly with white spray paint (Krylon® 1502 flat white paint of Sherwin-Williams, Cleveland, Ohio), demonstrating that particulate matter 265 may be bonded to the polymeric fibers 126 if desired. The coarse polymeric fibers 126 in this embodiment are generally single strands 238. Fused regions 260 of the meltblown layer 32 can be seen joined to the paper web 34.

Figure 22:
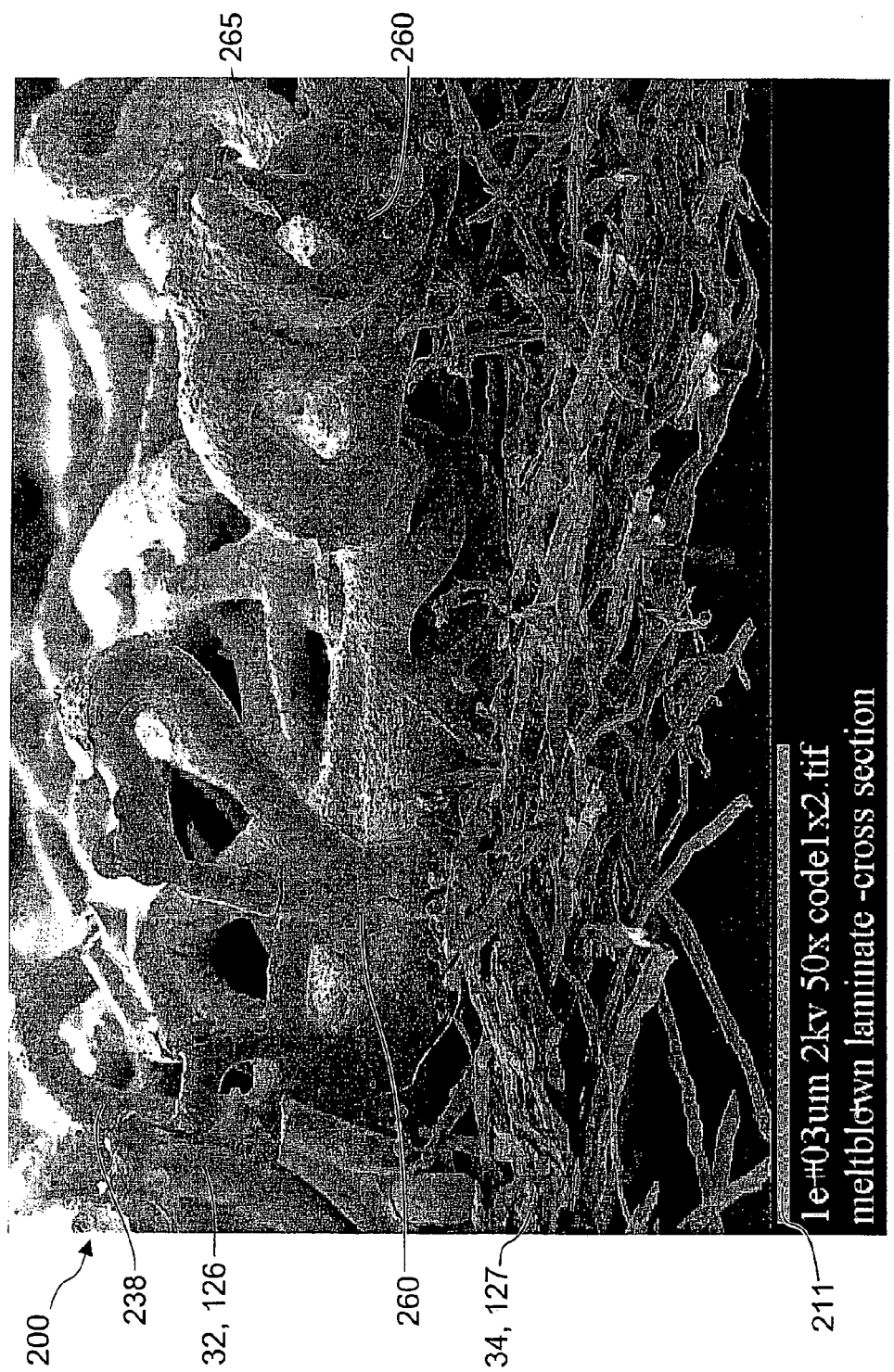
FIG. 22 is a micrograph of the cross-section of the meltblown-tissue laminate of FIG. 21.

FIG. 22 is a micrograph of the cross-section of the meltblown-tissue laminate 200 of Run 3-A.

The laminate had an Air Permeability measured at 381 CFM (mean of measurements at six locations).

Some runs were also conducted by inverting the web after the meltblown layer had been formed on one surface, and again applying a meltblown layer to the opposing surface such that the tissue had an abrasive layer on both sides.

Another set of samples (Run 3-B) were prepared by ironing the meltblown web with the tissue of Example 1, following the ironing procedures given in Example 2. Eight samples were tested for Wet and Dry Opacity. Average Dry Opacity was 64.0% (standard deviation 0.82%), and the average Wet Opacity was 47.2% (standard deviation 2.2%), with an average of 1.59 grams of water per gram of fiber in the wetted samples (standard deviation 0.10 grams of water per gram of fiber).

Another laminate (Run 3-C) was produced by forming the meltblown web directly on a VIVA® paper towel.

Laminates were also made by joining the abrasive layer to a hydroentangled wiper using a hotmelt adhesive applied in a swirl pattern. The wiper, manufactured by Kimberly-Clark Corporation (Dallas, Tex.), was WypAll® Teri® wipes, whose package is marked with U.S. Pat. No. 5,284,703, issued Feb. 8, 1994 to Everhart et al., which discloses a composite fabric containing more than about 70 percent, by weight, pulp fibers which are hydraulically entangled into a continuous filament substrate (e.g., a spunbond web).

Example 4

Variation of the Second Meltblown Web

A meltblown web was made according to Example 3, but with several variations such that little molding against the carrier wire could occur (lower air temperature and larger distance from the die tip to the carrier wire, allowing the meltblown fibers to cool more quickly). Though fibers were still coarser than conventional meltblown fibers, the abrasive character of the meltblown web was tangibly reduced due to the lack of large-scale topography imparted to the meltblown web. (The meltblown web appeared to be free of multifilamentary aggregates, which, it is believed, if present, would have contributed to a higher abrasive characteristic regardless of the macroscopic topography imparted by molding against a carrier wire.)

Example 5

Synergistic Material Properties

To demonstrate the Strength Synergy and Stretch Synergy of several embodiments of the present invention, tensile testing was done of laminates and unbonded layers using the first meltblown web of Example 2. Results are shown in Table 1 below, where tests are reported as averages for multiple samples (five samples per measurement). The meltblown web alone had a mean tensile strength of 3393 grams per 3 inches (measured with a 4-inch gage length and 10-in-per-minute crosshead speed with an Instron Universal Testing Machine). When placed adjacent to a sample of Scott® towel (a commercial uncreped through-air dried tissue web comprising about 25% high-yield pulp fibers and wet strength resins) but not bonded thereto (the two webs were superimposed and tested together), the tensile strength was 3707 g/3-in. When the meltblown web was thermally bonded (as described in Example 2) to the Scott® towel, the tensile strength increased to 5385 g/3-in, an increase of 45%, giving a Strength Synergy of 1.45. The Stretch Synergy was 2.06.

In another run, the meltblown web was tested together with the uncreped through-air dried tissue web of Example 1 (labeled as "30 gsm UCTAD"), giving an average tensile strength of 3565 g/3-in when the two webs were unbonded, but an average tensile strength 3915 g/3-in for webs that were thermally bonded, for a Strength Synergy of about 1.10. The Stretch Synergy was 1.36.

In a third run, VIVA® towel was used as the tissue. The Strength Synergy was 1.22, and the Stretch Synergy was 1.44.

TABLE 1

Measurements of Strength and Stretch Synergy

| Sample Description | Basis Wt., gsm | Tensile Strength, g/3 in. | St. Dev | Strength Synergy | Stretch, % | St. Dev | Stretch Synergy |
|---|---|---|---|---|---|---|---|
| Meltblown (MB) alone | 120 | 3393 | 461 | — | 3.26 | 0.51 | — |
| SCOTT ® Towel | 43.5 | 2763 | 65 | — | 18.65 | 0.56 | — |
| Towel + MB, Unbonded | 163.5 | 3707 | 750 | — | 3.18 | 0.80 | — |

TABLE 1-continued

Measurements of Strength and Stretch Synergy

| Sample Description | Basis Wt., gsm | Tensile Strength, g/3 in. | St. Dev | Strength Synergy | Stretch, % | St. Dev | Stretch Synergy |
|---|---|---|---|---|---|---|---|
| Towel + MB, Bonded | 163.5 | 5385 | 1099 | 1.45 | 6.54 | 0.88 | 2.06 |
| 30 gsm UCTAD | 32.5 | 1136 | 36 | — | 17.19 | 0.72 | — |
| UCTAD + MB, Unbonded | 152.5 | 3565 | 787 | — | 2.94 | 0.53 | — |
| UCTAD + MB, Bonded | 152.5 | 3915 | 575 | 1.10 | 4.00 | 0.49 | 1.36 |
| VIVA ® Towel | 67 | 2092 | 60 | — | 26.66 | 0.28 | — |
| VIVA + MB, Unbonded | 187 | 3460 | 1092 | — | 3.27 | 0.86 | — |
| VIVA + MB, Bonded | 187 | 4228 | 838 | 1.22 | 4.72 | 1.2 | 1.44 |

Example 6

Abrasive Properties

To illustrate the abrasiveness of products of the present invention and commercially available scrubbing materials, Abrasive Index tests were conducted for a variety of samples made according to the present invention, as described in Examples 2 through 4, as well as for five commercial products marketed for scrubbing and cleaning, the products each comprising an abrasive layer of material.

The five commercial products were: A) the O-Cel-O™ Heavy Duty Scrub Pad (UPC 053200072056), marketed by 3M Home Care Products (St. Paul, Minn.); B) Scotch Brite™ Heavy Duty Scrub Pad (UPC 051131502185), also marketed by 3M Home Care Products (St. Paul, Minn.), a product having a dark maroon-colored reticulated polymeric material believed to comprise polypropylene and other materials, C) the Scotch Brite™ Delicate Duty Scrub Sponge (UPC 021200000027), also marketed by 3M Home Care Products (St. Paul, Minn.)—the abrasive layer of this product was detached from the sponge for testing; D) Chore Boy™ Golden Fleece™ Scouring Cloth (UPC 026600313167), marketed by Reckitt & Colman, Inc. (Wayne, N.J.)., and E) a Sani-Tuff™ wiper, marketed by Kimberly-Clark Corp. (Houston, Tex.), which comprises a green colored meltblown layer on asynthetic polymer web (a heavier meltblown web), with a basis weight of about 33 gsm. The dry Sani-Tuff™ wiper had an Air Permeability of 98.5 CFM (mean of three measurements).

Table 2 displays the Abrasive Index results. Interestingly, the meltblown web of Example 2, comprising a significant number of multifilamentary aggregates, displayed the highest Abrasiveness Index (about 5.5). The material of Run 2-D, wherein the meltblown web of Example 2 had been ironed onto a relatively smooth VIVA® paper towel, displayed a high Abrasiveness Index as well (about 4.25). The slightly lower Abrasiveness Index compared to the isolated meltblown web itself may be due to a slight decrease in surface depth of the meltblown caused by the attachment process.

The isolated meltblown web of Example 3 displayed a high Abrasiveness Index (about 4.5), though not as high as the meltblown web of Example 2 with multifilamentary aggregates. This abrasive material had a macroscopic topography imparted by a coarse carrier fabric, which, it is believed, contributed to its abrasiveness. For Run 3-A, the meltblown web was no longer able to receive texture from the carrier wire, for it was formed directly on the tissue of Example 1. However, the highly textured tissue is believed to have provided a macroscopic topography to the meltblown web that provided good abrasiveness nevertheless, possibly accounting for the high Abrasiveness Index (about 4) for the material of Run 3-A. However, when the meltblown web in Example 2 was formed on a relatively smooth VIVA® paper towel, which lacks the distinctive topography and high surface depth of the UCTAD tissue, the resulting Abrasiveness Index was relatively low (about 1.25), thus pointing to the importance of the topography of the meltblown web, wherein useful topographical features may be imparted by effective molding against a suitable carrier wire, or by formation of the meltblown web directly on a tissue web having good topography (e.g., a surface depth of about 0.2 mm or greater, and optionally having a repeating pattern of peaks and valleys with a characteristic unit cell having an area of about 5 square millimeters or greater, or about 8 square millimeters or greater).

The isolated meltblown web of Example 4 was formed on the same carrier wire as in Example 3, but under conditions that did not effectively mold the meltblown web against the topography of the carrier wire, resulting a relatively flat meltblown structure. This is believed to account for the relatively low Abrasiveness Index (about 1) found for the meltblown web of Example 4. This meltblown web yielded an Air Permeability of 973 CFM (mean of 6 measurements on different locations of the web).

The well-known abrasive features of commercial products A, B, and D are reflected in relatively high Abrasiveness Index values. Commercial product E, though intended for wiping purposes, employs a meltblown layer lacking the coarseness or abrasive properties of many embodiments of the present invention, and displayed a relatively low Abrasiveness Index of about 0.75.

TABLE 2

Comparative Abrasive Index Values

| Sample | Foam Weight, g | | Abrasiveness Index | |
|---|---|---|---|---|
| | Initial | Final | Specimen | Avg. |
| Meltblown of Example 2 | 0.68 | 0.61 | 5.25 | 5.5 |
| | 0.69 | 0.62 | 5.25 | |
| | 0.68 | 0.6 | 6 | |
| Ex. 2 Meltblown on VIVA (Run 2-D) | 0.68 | 0.62 | 4.5 | 4.25 |
| | 0.67 | 0.6 | 5.25 | |

TABLE 2-continued

Comparative Abrasive Index Values

| Sample | Foam Weight, g | | Abrasiveness Index | |
|---|---|---|---|---|
| | Initial | Final | Specimen | Avg. |
| | 0.68 | 0.64 | 3 | |
| Meltblown of Example 3 | 0.63 | 0.58 | 3.75 | 4.5 |
| | 0.62 | 0.55 | 5.25 | |
| | 0.68 | 0.62 | 4.5 | |
| Ex. 3 Meltblown on UCTAD | 0.58 | 0.53 | 3.75 | 4 |
| (Run 3-A) | 0.65 | 0.59 | 4.5 | |
| | 0.67 | 0.62 | 3.75 | |
| Ex. 3 Meltblown on VIVA ® | 0.63 | 0.62 | 0.75 | 1.25 |
| (Run 3-C) | 0.57 | 0.55 | 1.5 | |
| | 0.62 | 0.6 | 1.5 | |
| Meltblown of Example 4 | 0.64 | 0.63 | 0.75 | 1 |
| | 0.65 | 0.64 | 0.75 | |
| | 0.64 | 0.62 | 1.5 | |
| Commercial Product A | 0.69 | 0.63 | 4.5 | 4.75 |
| | 0.65 | 0.58 | 5.25 | |
| | 0.66 | 0.6 | 4.5 | |
| Commercial Product B | 0.64 | 0.57 | 5.25 | 4 |
| | 0.65 | 0.6 | 3.75 | |
| | 0.74 | 0.7 | 3 | |
| Commercial Product C | 0.66 | 0.63 | 2.25 | 2.5 |
| | 0.66 | 0.62 | 3 | |
| | 0.64 | 0.61 | 2.25 | |
| Commercial Product D | 0.66 | 0.59 | 5.25 | 5 |
| | 0.64 | 0.58 | 4.5 | |
| | 0.67 | 0.6 | 5.25 | |
| Commercial Product E | 0.65 | 0.64 | 0.75 | 0.75 |
| | 0.67 | 0.66 | 0.75 | |
| | 0.66 | 0.65 | 0.75 | |

Example 7

Prophetic Examples

Figure 23:
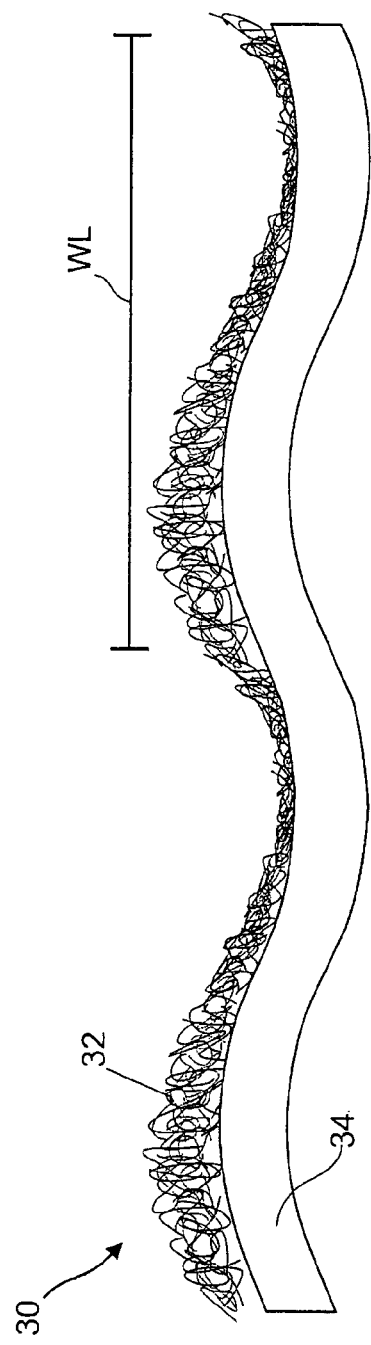
FIG. 23 depicts a cross-section of one embodiment of an article according to the present invention having heterogeneous properties in the abrasive layer.

FIG. 23 depicts a prophetic example showing a cross-section of a scrubby pad 30 comprising an abrasive layer 32 having nonuniform height relative to the surface of an underlying absorbent fibrous layer 34, which also has a nonuniform thickness. In this embodiment, the thickness of the abrasive layer 32 is greatest in regions where the height of the underlying absorbent fibrous layer 34 is greatest, though other permutations (not shown) are possible, including one permutation in which the abrasive layer has a relatively lower thickness when the underlying fibrous web 34 has greater thickness, height, or local basis weight than the average for the web, or permutations in which the thickness or basis weight variations of the abrasive layer vary somewhat independently of structural variations in the absorbent fibrous web 34.

In the depicted embodiment of FIG. 23, the height and thickness variations of the abrasive layer 32 (which may correspond to variations in basis weight or bulk or both of the abrasive layer 32, as well as variations in other properties such as opacity and pore volume) have a characteristic wavelength "WL" in the cross-section shown, which may be taken in the machine-direction, the cross-direction, or other in-plane directions of significance to a particular product such as directions at 45-degree angles to the machine direction. In this case, the wavelength "WL" also corresponds with the wavelength of height variation in the underlying absorbent fibrous layer 34.

The portions of the abrasive layer 32 over the depressed regions of the absorbent fibrous layer 34 may represent regions that have been thermally bonded for increased strength, causing higher density, or may be regions of lower basis weight, or higher density produced during manufacturing, or may be regions that have been apertured to remove material prior to joining to the absorbent fibrous web 34.

Figure 24:
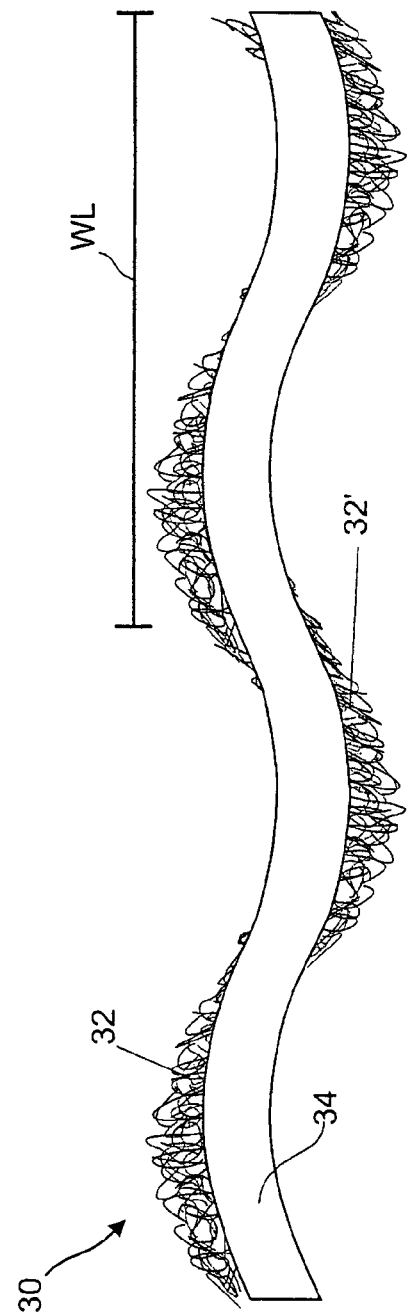
FIG. 24 depicts a cross-section of an article according to the present invention having nonuniform properties in each of two abrasive layers on opposing sides of the fibrous absorbent layer.

A related hypothetical example is shown in FIG. 24, where the fibrous web 34 has a first scrubby abrasive layer 32 on one side and a second abrasive layer 32' on the opposing side. Here both abrasive layers 32, 32' have nonuniform height and optionally density values that vary with the topography of the absorbent fibrous layer 34. In this case, the two abrasive layers 32, 32' vary out of phase with each other, such that apertures or regions with no abrasive material on a first side of the absorbent web 34 are complemented by the presence of the abrasive material on the opposing side directly opposite to the region with no abrasive material on the absorbent web 34.

More than one layer of tissue or other absorbent fibrous webs may be used in any of the laminates of the present invention.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. An abrasive cleaning product comprising;
   a scrubbing pad including an abrasive layer and an absorbent layer, said abrasive layer defining an outer surface of the scrubbing pad, said abrasive layer containing aggregate fibers comprising a first polymer strand and a second polymer strand, said aggregate fibers defining a fiber length, said first and second polymer strands being adhered together for at least about 5 mm of the fiber length, said first and second polymer strands each having an average cross sectional diameter of between about 15 microns and about 500 microns, said aggregate fibers defining a non-circular cross section; said absorbent layer comprising a fibrous cellulosic web.

2. The abrasive cleaning product of claim 1, wherein the aggregate fibers comprise more than two polymer strands aligned side by side in a substantially parallel array.

3. The abrasive cleaning product of claim 2, wherein the aspect ratio of the aggregate fibers is greater than about 2.

4. The abrasive cleaning product of claim 2, wherein the aspect ratio of the aggregate fibers is between about 3 and about 12.

5. The abrasive cleaning product of claim 1 wherein the aggregate fibers comprise between 2 and about 50 polymer strands.

6. The abrasive cleaning product of claim 1, further defining splits in the aggregate fibers along a portion of the fiber length, wherein the splits in the aggregate fibers are parallel to the polymer strands.

7. The abrasive cleaning product of claim 1, wherein at least some of the aggregate fibers are twisted along the length of the aggregate fiber.

8. The abrasive cleaning product of claim 7, wherein the aggregate fibers define at least about 180° of helical twist along the length of the aggregate fiber.

9. The abrasive cleaning product of claim 7, wherein the aggregate fibers define at least about 360° of helical twist along the length of the aggregate fiber.

10. The abrasive cleaning product of claim 7, wherein the aggregate fibers define at least about 360° of helical twist along about a 3 cm length of the aggregate fiber.

11. The abrasive cleaning product of claim 1, wherein said first and second polymer strands individually define a substantially circular cross section prior to being adhered in a side by side arrangement, said first and second polymer strands maintaining elements of said individual substantially circular cross-section in said aggregate fiber.

12. The abrasive cleaning product of claim 1, wherein the first and second polymer strands are adhered together in a side-by-side arrangement for a length of at least about 15 mm.

13. The abrasive cleaning product of claim 1, wherein both of said polymer strands comprise a thermoplastic polymer having a melting point of about 120° C. or greater.

14. The abrasive cleaning product of claim 13, wherein said thermoplastic polymer is selected from the group consisting of polypropylene, polyethylene, polyesters, high-density polypropylene, polystyrene, polyamides, polyvinylidenes, polyurethane, polyurea, and copolymers thereof.

15. The abrasive cleaning product of claim 14, wherein said thermoplastic polymer comprises polypropylene.

16. The abrasive cleaning product of claim 1, wherein said polymer strands are multi-component polymer strands.

17. The abrasive cleaning product of claim 1, wherein said fiber length is greater than about 1 cm.

18. The abrasive cleaning product of claim 1, wherein said fiber length is greater than about 2 cm.

19. The abrasive cleaning product of claim 1, wherein said fiber length is greater than about 5 cm.

20. The abrasive cleaning product of claim 1, wherein both of the polymer strands comprise a metallocene polymer.

21. The abrasive cleaning product of claim 1, wherein both of the polymer strands comprise a polymer having a melt flow rate of about 2000 g/10 min or less.

22. The abrasive cleaning product of claim 1, wherein both of the polymer strands comprise a polymer having a melt flow rate of about 500 g/10 min or less.

23. The abrasive cleaning product of claim 1, wherein both of the polymer strands comprise a polymer having a melt flow rate of about 200 g/10 min or less.

24. The abrasive cleaning product of claim 1, wherein both of the polymer strands comprise a polymer having a melt flow rate of about 100 g/10 min or less.

25. The abrasive cleaning product of claim 1, wherein the major axis of the cross section of at least some of the aggregate fibers is greater than about 30 microns.

26. The abrasive cleaning product of claim 1, wherein the major axis of the cross section of at least some of the aggregate fibers is between about 40 microns and about 400 microns.

27. The abrasive cleaning product of claim 1, wherein the polymer strands are translucent.

28. The abrasive cleaning product of claim 1, wherein the first and second polymer strands each have an average cross sectional diameter of greater than about 20 microns.

29. The abrasive cleaning product of claim 1, wherein the first and second polymer strands each have an average cross sectional diameter of greater than about 30 microns.

30. The abrasive cleaning product of claim 1, wherein the first and second polymer strands each have an average cross sectional diameter of greater than about 40 microns.

31. The abrasive cleaning product of claim 1, wherein the first and second polymer strands each have an average cross sectional diameter of greater than about 50 microns.

32. A meltblown web comprising abrasive polymeric fibers in a planar substrate, the abrasive polymeric fibers being arranged in a non-uniform distribution such that the thickness of the meltblown web varies across the width of the meltblown web, the meltblown web having a thickness variation of about 0.2 mm or greater, said meltblown web having an open, porous structure with an Air Permeability greater than about 100, said meltblown web being attached to a fibrous cellulosic web.

33. The meltblown web of claim 32, wherein the meltblown web is substantially latex free.

34. The meltblown web of claim 32, wherein the meltblown web has a thickness variation of about 0.5 mm or greater.

35. The meltblown web of claim 32, wherein the meltblown web has a thickness variation of about 1 mm or greater.

36. The meltblown web of claim 32, wherein said abrasive fibers comprise thermoplastic polymer fibers having a melting point of about 120° C. or greater.

37. The meltblown web of claim 36, wherein said thermoplastic polymer is selected from the group consisting of polypropylene, polyethylene, polyesters, high-density polypropylene, polystyrene, polyamides, polyvinylidenes, polyurethane, polyurea, and copolymers thereof.

38. The meltblown web of claim 37, wherein said thermoplastic polymer fibers comprise polypropylene.

39. The meltblown web of claim 37, wherein said meltblown web comprises two or more different thermoplastic polymer fibers.

40. The meltblown web of claim 39, wherein said different thermoplastic polymer fibers are substantially homogeneously distributed within said meltblown web.

41. The meltblown web of claim 39, wherein said different thermoplastic polymer fibers are heterogeneously distributed within said meltblown web.

42. The meltblown web of claim 32, wherein said abrasive polymeric fibers have a mean diameter greater than about 40 microns.

43. The meltblown web of claim 32, wherein said abrasive polymeric fibers comprise multi-component fibers.

44. The meltblown web of claim 32, wherein said abrasive polymeric fibers are greater than about 1 cm in length.

45. The meltblown web of claim 32, wherein said abrasive polymeric fibers are greater than about 2 cm in length.

46. The meltblown web of claim 32, wherein said meltblown web has an average thickness greater than about 0.5 mm.

47. The meltblown web of claim 32, wherein said meltblown web has an average thickness greater than about 2 mm.

48. The meltblown web of claim 32, wherein said meltblown web has an average thickness between about 0.5 and about 10 mm.

49. The meltblown web of claim 32, wherein said meltblown web further comprises particulate matter, said particulate matter increasing the abrasiveness of said meltblown web.

50. The meltblown web of claim 32, wherein said meltblown web has a basis weight greater than about 10 gsm.

51. The meltblown web of claim 32, wherein about 5% or more of the superficial area of a surface of the meltblown web includes pores extending through the axial depth of said meltblown web.

52. The meltblown web of claim 32, wherein about 10% or more of the superficial area of a surface of the meltblown web includes pores extending through the axial depth of said meltblown web.

53. The meltblown web of claim 32, wherein about 30% or more of the superficial area of a surface of the meltblown web includes pores extending through the axial depth of said meltblown web.

54. The meltblown web of claim 32, wherein about 50% or more of the superficial area of a surface of the meltblown web includes pores which extend through the axial depth of said meltblown web.

55. The meltblown web of claim 32, further comprising a plurality of aggregate fibers defining a substantially non-circular cross section, an aggregate fiber comprising two or more of the abrasive polymeric fibers joined in a side-by-side arrangement along at least about 5 mm of the length of the aggregate fiber.

56. The meltblown web of claim 55, wherein the plurality of aggregate fibers each define a cross-section having an aspect ratio of about three or greater.

57. The meltblown web of claim 55, wherein said aggregate fibers comprise about 5% or greater of the mass of said meltblown web.

58. The meltblown web of claim 55, wherein said aggregate fibers comprise about 20% or greater of the mass of said meltblown web.

59. The meltblown web of claim 55, wherein said aggregate fibers comprise about 40% or greater of the mass of said meltblown web.

60. The meltblown web of claim 55, wherein said plurality of aggregate fibers include forked aggregate fibers.

61. The meltblown web of claim 55, wherein said plurality of aggregate fibers include twisted aggregate fibers.

62. The meltblown web of claim 55, comprising aggregate fibers having a length of about 5 cm or greater.

63. The meltblown web of claim 32, wherein the polymeric fibers comprise a metallocene polymer.

64. The meltblown web of claim 32, wherein the meltblown web comprises a polymer having a melt flow rate of about 2000 g/10 min or less.

65. The meltblown web of claim 32, wherein the meltblown web comprises a polymer having a melt flow rate of about 500 g/10 min or less.

66. The meltblown web of claim 32, wherein the meltblown web comprises a polymer having a melt flow rate of about 200 g/10 min or less.

67. The meltblown web of claim 32, wherein the meltblown web comprises a polymer having a melt flow rate of about 100 g/10 min or less.

68. The meltblown web of claim 32, wherein the meltblown web has been molded against a three-dimensional surface to impart a repeating pattern of unit cells having elevated regions, the unit cells having an area of about 5 square millimeters or greater.

69. The meltblown web of claim 32, wherein the meltblown web has an Abrasiveness Index of about 1 or greater.

70. The meltblown web of claim 32, wherein the meltblown web has an Abrasiveness Index of about 2 or greater.

71. The meltblown web of claim 32, wherein the meltblown web has an Abrasiveness Index of about 3 or greater.

72. The meltblown web of claim 32, wherein the meltblown web has an Abrasiveness Index of about 4 or greater.

73. The meltblown web of claim 32, wherein the meltblown web has an Abrasiveness Index of about 5 or greater.

74. The meltblown web of claim 32, wherein said meltblown web is a scouring pad.

75. The meltblown web of claim 32, wherein said meltblown web is a polishing pad.

76. The meltblown web of claim 32, wherein said meltblown web is a sanding pad.

77. The meltblown web of claim 32, wherein said meltblown web is a personal cleansing pad.

78. The meltblown web of claim 77, wherein said cleansing pad is an exfoliating pad.

79. The meltblown web of claim 32, wherein said abrasive polymeric fibers have a mean diameter between about 40 and about 500 microns.

80. The meltblown web of claim 32, wherein the Air Permeability of said meltblown web is greater than about 100 CFM.

81. The meltblown web of claim 32, wherein the Air Permeability of said meltblown web is greater than about 200 CFM.

82. The meltblown web of claim 32, wherein the meltblown web has an Air Permeability greater than about 500 CFM.

83. The meltblown web of claim 32, wherein the Air Permeability of said meltblown web is between about 250 and about 1,500 CFM.

84. The meltblown web of claim 32, wherein said meltblown web has a basis weight greater than about 50 gsm.

85. The meltblown web of claim 32, wherein said meltblown web has a basis weight between about 25 gsm and about 100 gsm.

\* \* \* \* \*